US012406441B2

(12) United States Patent
McKinnon et al.

(10) Patent No.: US 12,406,441 B2
(45) Date of Patent: *Sep. 2, 2025

(54) WIDE AREA AUGMENTED REALITY LOCATION-BASED SERVICES

(71) Applicant: Nant Holdings IP, LLC, Culver City, CA (US)

(72) Inventors: David McKinnon, San Francisco, CA (US); Kamil Wnuk, Playa del Rey, CA (US); Jeremi Sudol, New York, NY (US); Matheen Siddiqui, Culver City, CA (US); John Wiacek, Los Angeles, CA (US); Bing Song, La Canada, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/378,977

(22) Filed: Oct. 11, 2023

(65) Prior Publication Data
US 2024/0037857 A1    Feb. 1, 2024

Related U.S. Application Data

(63) Continuation of application No. 17/587,183, filed on Jan. 28, 2022, now Pat. No. 12,008,719, which is a
(Continued)

(51) Int. Cl.
G06T 19/00    (2011.01)
G06F 16/29    (2019.01)
(Continued)

(52) U.S. Cl.
CPC ............ G06T 19/003 (2013.01); G06F 16/29 (2019.01); G06F 16/50 (2019.01); G06F 16/58 (2019.01);
(Continued)

(58) Field of Classification Search
CPC .................................................. G06T 19/006
See application file for complete search history.

(56) References Cited

U.S. PATENT DOCUMENTS 3,050,870 A    8/1962    Heilig
5,255,211 A    10/1993   Redmond
(Continued)

FOREIGN PATENT DOCUMENTS

CA    2 311 319 C    6/1999
CA    2235030 A1    8/1999
(Continued)

OTHER PUBLICATIONS

International Search Report and Written Opinion issued in International Application No. PCT/US2012/032204 dated Oct. 29, 2012.
(Continued)

Primary Examiner — Charles Tseng
(74) Attorney, Agent, or Firm — Maschoff Brennan; Andrew A. Noble

(57) ABSTRACT

Apparatus, methods and systems of providing AR content are disclosed. Embodiments of the inventive subject matter can obtain an initial map of an area, derive views of interest, obtain AR content objects associated with the views of interest, establish experience clusters and generate a tile map tessellated based on the experience clusters. A user device could be configured to obtain and instantiate at least some of the AR content objects based on at least one of a location and a recognition.

39 Claims, 6 Drawing Sheets

Related U.S. Application Data continuation of application No. 16/864,075, filed on Apr. 30, 2020, now Pat. No. 11,392,636, which is a continuation of application No. 16/168,419, filed on Oct. 23, 2018, now Pat. No. 10,664,518, which is a continuation of application No. 15/794,993, filed on Oct. 26, 2017, now Pat. No. 10,140,317, which is a continuation of application No. 15/406,146, filed on Jan. 13, 2017, now Pat. No. 9,817,848, which is a continuation of application No. 14/517,728, filed on Oct. 17, 2014, now Pat. No. 9,582,516.

(60) Provisional application No. 61/892,238, filed on Oct. 17, 2013.

(51) Int. Cl.
| | |
|---|---|
| *G06F 16/50* | (2019.01) |
| *G06F 16/58* | (2019.01) |
| *G06F 16/583* | (2019.01) |
| *G06F 16/9535* | (2019.01) |
| *G06T 15/20* | (2011.01) |

(52) U.S. Cl.
CPC ...... *G06F 16/5854* (2019.01); *G06F 16/5866* (2019.01); *G06F 16/9535* (2019.01); *G06T 15/20* (2013.01); *G06T 19/006* (2013.01); *G06T 2219/024* (2013.01)

(56) References Cited

U.S. PATENT DOCUMENTS

| | | | |
|---|---|---|---|
| 5,446,833 A | 8/1995 | Miller et al. |
| 5,625,765 A | 4/1997 | Ellenby et al. |
| 5,682,332 A | 10/1997 | Ellenby et al. |
| 5,742,521 A | 4/1998 | Ellenby et al. |
| 5,748,194 A | 5/1998 | Chen |
| 5,751,576 A | 5/1998 | Monson |
| 5,759,044 A | 6/1998 | Redmond |
| 5,815,411 A | 9/1998 | Ellenby et al. |
| 5,848,373 A | 12/1998 | Delorme et al. |
| 5,884,029 A | 3/1999 | Brush, II et al. |
| 5,991,827 A | 11/1999 | Ellenby et al. |
| 6,031,545 A | 2/2000 | Ellenby et al. |
| 6,037,936 A | 3/2000 | Ellenby et al. |
| 6,052,125 A | 4/2000 | Gardiner et al. |
| 6,064,398 A | 5/2000 | Ellenby et al. |
| 6,064,749 A | 5/2000 | Hirota et al. |
| 6,081,278 A | 6/2000 | Chen |
| 6,092,107 A | 7/2000 | Eleftheriadis et al. |
| 6,097,393 A | 8/2000 | Prouty, IV et al. |
| 6,098,118 A | 8/2000 | Ellenby et al. |
| 6,130,673 A | 10/2000 | Pulli et al. |
| 6,161,126 A | 12/2000 | Wies et al. |
| 6,169,545 B1 | 1/2001 | Gallery et al. |
| 6,173,239 B1 | 1/2001 | Ellenby |
| 6,215,498 B1 | 4/2001 | Filo et al. |
| 6,226,669 B1 | 5/2001 | Huang et al. |
| 6,240,360 B1 | 5/2001 | Phelan |
| 6,242,944 B1 | 6/2001 | Benedetti et al. |
| 6,256,043 B1 | 7/2001 | Aho et al. |
| 6,278,461 B1 | 8/2001 | Ellenby et al. |
| 6,307,556 B1 | 10/2001 | Ellenby et al. |
| 6,308,565 B1 | 10/2001 | French et al. |
| 6,336,098 B1 | 1/2002 | Fortenberry et al. |
| 6,339,745 B1 | 1/2002 | Novik et al. |
| 6,346,938 B1 | 2/2002 | Chan et al. |
| 6,396,475 B1 | 5/2002 | Ellenby et al. |
| 6,414,696 B1 | 7/2002 | Ellenby et al. |
| 6,512,844 B2 | 1/2003 | Bouguet et al. |
| 6,522,292 B1 | 2/2003 | Ellenby et al. |
| 6,529,331 B2 | 3/2003 | Massof et al. |
| 6,535,210 B1 | 3/2003 | Ellenby et al. |
| 6,552,729 B1 | 4/2003 | Bernardo et al. |
| 6,552,744 B2 | 4/2003 | Chen |
| 6,553,310 B1 | 4/2003 | Lopke |
| 6,557,041 B2 | 4/2003 | Mallart |
| 6,559,813 B1 | 5/2003 | DeLuca et al. |
| 6,563,489 B1 | 5/2003 | Latypov et al. |
| 6,563,529 B1 | 5/2003 | Jongerius |
| 6,577,714 B1 | 6/2003 | Darcie et al. |
| 6,631,403 B1 | 10/2003 | Deutsch et al. |
| 6,672,961 B1 | 1/2004 | Uzun |
| 6,690,370 B2 | 2/2004 | Ellenby et al. |
| 6,691,032 B1 | 2/2004 | Irish et al. |
| 6,746,332 B1 | 6/2004 | Ing et al. |
| 6,751,655 B1 | 6/2004 | Deutsch et al. |
| 6,757,068 B2 | 6/2004 | Foxlin |
| 6,767,287 B1 | 7/2004 | Mcquaid et al. |
| 6,768,509 B1 | 7/2004 | Bradski et al. |
| 6,774,869 B2 | 8/2004 | Biocca et al. |
| 6,785,667 B2 | 8/2004 | Orbanes et al. |
| 6,804,726 B1 | 10/2004 | Ellenby et al. |
| 6,822,648 B2 | 11/2004 | Furlong et al. |
| 6,853,398 B2 | 2/2005 | Malzbender et al. |
| 6,854,012 B1 | 2/2005 | Taylor |
| 6,882,933 B2 | 4/2005 | Kondou et al. |
| 6,922,155 B1 | 7/2005 | Evans et al. |
| 6,930,715 B1 | 8/2005 | Mower |
| 6,965,371 B1 | 11/2005 | MacLean et al. |
| 6,968,973 B2 | 11/2005 | Uyttendaele et al. |
| 7,016,532 B2 | 3/2006 | Boncyk et al. |
| 7,031,875 B2 | 4/2006 | Ellenby et al. |
| 7,073,129 B1 | 7/2006 | Robarts et al. |
| 7,076,505 B2 | 7/2006 | Campbell |
| 7,113,618 B2 | 9/2006 | Junkins et al. |
| 7,116,326 B2 | 10/2006 | Soulchin et al. |
| 7,116,342 B2 | 10/2006 | Dengler et al. |
| 7,142,209 B2 | 11/2006 | Uyttendaele et al. |
| 7,143,258 B2 | 11/2006 | Bae |
| 7,168,042 B2 | 1/2007 | Braun et al. |
| 7,174,301 B2 | 2/2007 | Florance et al. |
| 7,206,000 B2 | 4/2007 | Zitnick, III et al. |
| 7,245,273 B2 | 7/2007 | Eberl et al. |
| 7,269,425 B2 | 9/2007 | Valkó et al. |
| 7,271,795 B2 | 9/2007 | Bradski |
| 7,274,380 B2 | 9/2007 | Navab et al. |
| 7,280,697 B2 | 10/2007 | Perona et al. |
| 7,301,536 B2 | 11/2007 | Ellenby et al. |
| 7,353,114 B1 | 4/2008 | Rohlf et al. |
| 7,369,668 B1 | 5/2008 | Huopaniemi et al. |
| 7,395,507 B2 | 7/2008 | Robarts et al. |
| 7,406,421 B2 | 7/2008 | Odinak et al. |
| 7,412,427 B2 | 8/2008 | Zitnick et al. |
| 7,454,361 B1 | 11/2008 | Halavais et al. |
| 7,477,780 B2 | 1/2009 | Boncyk et al. |
| 7,511,736 B2 | 3/2009 | Benton |
| 7,529,639 B2 | 5/2009 | Rasanen et al. |
| 7,532,224 B2 | 5/2009 | Bannai |
| 7,564,469 B2 | 7/2009 | Cohen |
| 7,565,008 B2 | 7/2009 | Boncyk et al. |
| 7,641,342 B2 | 1/2010 | Eberl et al. |
| 7,650,616 B2 | 1/2010 | Lee |
| 7,680,324 B2 | 3/2010 | Boncyk et al. |
| 7,696,905 B2 | 4/2010 | Ellenby et al. |
| 7,710,395 B2 | 5/2010 | Rodgers et al. |
| 7,714,895 B2 | 5/2010 | Pretlove et al. |
| 7,729,946 B2 | 6/2010 | Chu |
| 7,734,412 B2 | 6/2010 | Shi et al. |
| 7,768,534 B2 | 8/2010 | Pentenrieder et al. |
| 7,774,180 B2 | 8/2010 | Joussemet et al. |
| 7,796,155 B1 | 9/2010 | Neely, III et al. |
| 7,817,104 B2 | 10/2010 | Ryu et al. |
| 7,822,539 B2 | 10/2010 | Akiyoshi et al. |
| 7,828,655 B2 | 11/2010 | Uhlir et al. |
| 7,844,229 B2 | 11/2010 | Gyorfi et al. |
| 7,847,699 B2 | 12/2010 | Lee et al. |
| 7,847,808 B2 | 12/2010 | Cheng et al. |
| 7,887,421 B2 | 2/2011 | Tabata |
| 7,889,193 B2 | 2/2011 | Platonov et al. |
| 7,899,915 B2 | 3/2011 | Reisman |
| 7,904,577 B2 | 3/2011 | Taylor |
| 7,907,128 B2 | 3/2011 | Bathiche et al. |

(56) References Cited

U.S. PATENT DOCUMENTS

| | | |
|---|---|---|
| 7,908,462 B2 | 3/2011 | Sung |
| 7,916,138 B2 | 3/2011 | John et al. |
| 7,962,281 B2 | 6/2011 | Rasmussen et al. |
| 7,978,207 B1 | 7/2011 | Herf et al. |
| 8,046,408 B2 | 10/2011 | Torabi |
| 8,118,297 B2 | 2/2012 | Izumichi |
| 8,130,242 B2 | 3/2012 | Cohen |
| 8,130,260 B2 | 3/2012 | Krill et al. |
| 8,160,994 B2 | 4/2012 | Ong et al. |
| 8,170,222 B2 | 5/2012 | Dunko |
| 8,189,959 B2 | 5/2012 | Szeliski et al. |
| 8,190,749 B1 | 5/2012 | Chi et al. |
| 8,204,299 B2 | 6/2012 | Arcas et al. |
| 8,218,873 B2 | 7/2012 | Boncyk et al. |
| 8,223,024 B1 | 7/2012 | Petrou et al. |
| 8,223,088 B1 | 7/2012 | Gomez et al. |
| 8,224,077 B2 | 7/2012 | Boncyk et al. |
| 8,224,078 B2 | 7/2012 | Boncyk et al. |
| 8,246,467 B2 | 8/2012 | Huang et al. |
| 8,251,819 B2 | 8/2012 | Watkins, Jr. et al. |
| 8,291,346 B2 | 10/2012 | Kerr et al. |
| 8,315,432 B2 | 11/2012 | Lefevre et al. |
| 8,321,527 B2 | 11/2012 | Martin et al. |
| 8,374,395 B2 | 2/2013 | Lefevre et al. |
| 8,417,261 B2 | 4/2013 | Huston et al. |
| 8,427,508 B2 | 4/2013 | Mattila et al. |
| 8,438,110 B2 | 5/2013 | Calman et al. |
| 8,472,972 B2 | 6/2013 | Nadler et al. |
| 8,488,011 B2 | 7/2013 | Blanchflower et al. |
| 8,489,993 B2 | 7/2013 | Tamura et al. |
| 8,498,814 B2 | 7/2013 | Irish et al. |
| 8,502,835 B1 | 8/2013 | Meehan |
| 8,509,483 B2 | 8/2013 | Inigo |
| 8,519,844 B2 | 8/2013 | Richey et al. |
| 8,527,340 B2 | 9/2013 | Fisher et al. |
| 8,531,449 B2 | 9/2013 | Lynch et al. |
| 8,537,113 B2 | 9/2013 | Weising et al. |
| 8,558,759 B1 | 10/2013 | Gomez et al. |
| 8,576,276 B2 | 11/2013 | Bar-Zeev et al. |
| 8,576,756 B2 | 11/2013 | Ko et al. |
| 8,585,476 B2 | 11/2013 | Mullen et al. |
| 8,605,141 B2 | 12/2013 | Dialameh et al. |
| 8,606,657 B2 | 12/2013 | Chesnut et al. |
| 8,633,946 B2 | 1/2014 | Cohen |
| 8,645,220 B2 | 2/2014 | Harper et al. |
| 8,660,369 B2 | 2/2014 | Llano et al. |
| 8,660,951 B2 | 2/2014 | Calman et al. |
| 8,675,017 B2 | 3/2014 | Rose et al. |
| 8,686,924 B2 | 4/2014 | Braun et al. |
| 8,700,060 B2 | 4/2014 | Huang |
| 8,706,170 B2 | 4/2014 | Jacobsen et al. |
| 8,706,399 B2 | 4/2014 | Irish et al. |
| 8,711,176 B2 | 4/2014 | Douris et al. |
| 8,727,887 B2 | 5/2014 | Mahajan et al. |
| 8,730,156 B2 | 5/2014 | Weising et al. |
| 8,743,145 B1 | 6/2014 | Price et al. |
| 8,743,244 B2 | 6/2014 | Vartanian et al. |
| 8,744,214 B2 | 6/2014 | Snavely et al. |
| 8,745,494 B2 | 6/2014 | Spivack |
| 8,751,159 B2 | 6/2014 | Hall |
| 8,754,907 B2 | 6/2014 | Tseng |
| 8,762,047 B2 | 6/2014 | Sterkel et al. |
| 8,764,563 B2 | 7/2014 | Toyoda |
| 8,786,675 B2 | 7/2014 | Deering et al. |
| 8,803,917 B2 | 8/2014 | Meehan |
| 8,810,598 B2 | 8/2014 | Soon-Shiong |
| 8,814,691 B2 | 8/2014 | Haddick et al. |
| 8,855,719 B2 | 10/2014 | Jacobsen et al. |
| 8,872,851 B2 | 10/2014 | Choubassi et al. |
| 8,893,164 B1 | 11/2014 | Teller |
| 8,913,085 B2 | 12/2014 | Anderson et al. |
| 8,933,841 B2 | 1/2015 | Valaee et al. |
| 8,938,464 B2 | 1/2015 | Bailly et al. |
| 8,958,979 B1 | 2/2015 | Levine et al. |
| 8,965,741 B2 | 2/2015 | McCulloch et al. |
| 8,968,099 B1 | 3/2015 | Hanke et al. |
| 8,994,645 B1 | 3/2015 | Meehan |
| 9,001,252 B2 | 4/2015 | Hannaford |
| 9,007,364 B2 | 4/2015 | Bailey |
| 9,024,842 B1 | 5/2015 | Gomez et al. |
| 9,024,972 B1 | 5/2015 | Bronder et al. |
| 9,026,940 B2 | 5/2015 | Jung et al. |
| 9,037,468 B2 | 5/2015 | Osman |
| 9,041,739 B2 | 5/2015 | Latta et al. |
| 9,047,609 B2 | 6/2015 | Ellis et al. |
| 9,071,709 B2 | 6/2015 | Wither et al. |
| 9,098,905 B2 | 8/2015 | Rivlin et al. |
| 9,122,053 B2 | 9/2015 | Geisner et al. |
| 9,122,321 B2 | 9/2015 | Perez et al. |
| 9,122,368 B2 | 9/2015 | Szeliski et al. |
| 9,122,707 B2 | 9/2015 | Wither et al. |
| 9,128,520 B2 | 9/2015 | Geisner et al. |
| 9,129,644 B2 | 9/2015 | Gay et al. |
| 9,131,208 B2 | 9/2015 | Jin |
| 9,143,839 B2 | 9/2015 | Reisman et al. |
| 9,167,386 B2 | 10/2015 | Valaee et al. |
| 9,177,381 B2 | 11/2015 | McKinnon |
| 9,178,953 B2 | 11/2015 | Theimer et al. |
| 9,182,815 B2 | 11/2015 | Small et al. |
| 9,183,560 B2 | 11/2015 | Abelow |
| 9,230,367 B2 | 1/2016 | Stroila |
| 9,240,074 B2 | 1/2016 | Berkovich et al. |
| 9,245,387 B2 | 1/2016 | Poulos et al. |
| 9,262,743 B2 | 2/2016 | Heins et al. |
| 9,264,515 B2 | 2/2016 | Ganapathy et al. |
| 9,280,258 B1 | 3/2016 | Bailly et al. |
| 9,311,397 B2 | 4/2016 | Meadow et al. |
| 9,317,133 B2 | 4/2016 | Korah et al. |
| 9,345,957 B2 | 5/2016 | Geisner et al. |
| 9,377,862 B2 | 6/2016 | Parkinson et al. |
| 9,384,737 B2 | 7/2016 | Lamb et al. |
| 9,389,090 B1 | 7/2016 | Levine et al. |
| 9,396,589 B2 | 7/2016 | Soon-Shiong |
| 9,466,144 B2 | 10/2016 | Sharp et al. |
| 9,480,913 B2 | 11/2016 | Briggs |
| 9,482,528 B2 | 11/2016 | Baker et al. |
| 9,495,591 B2 | 11/2016 | Visser et al. |
| 9,495,760 B2 | 11/2016 | Swaminathan et al. |
| 9,498,720 B2 | 11/2016 | Geisner et al. |
| 9,503,310 B1 | 11/2016 | Hawkes et al. |
| 9,536,251 B2 | 1/2017 | Huang et al. |
| 9,552,673 B2 | 1/2017 | Hilliges et al. |
| 9,558,557 B2 | 1/2017 | Jiang et al. |
| 9,573,064 B2 | 2/2017 | Kinnebrew et al. |
| 9,582,516 B2 | 2/2017 | McKinnon et al. |
| 9,602,859 B2 | 3/2017 | Strong |
| 9,662,582 B2 | 5/2017 | Mullen |
| 9,678,654 B2 | 6/2017 | Wong et al. |
| 9,782,668 B1 | 10/2017 | Golden et al. |
| 9,805,385 B2 | 10/2017 | Soon-Shiong |
| 9,817,848 B2 | 11/2017 | McKinnon et al. |
| 9,824,501 B2 | 11/2017 | Soon-Shiong |
| 9,891,435 B2 | 2/2018 | Boger et al. |
| 9,942,420 B2 | 4/2018 | Rao et al. |
| 9,972,208 B2 | 5/2018 | Levine et al. |
| 10,002,337 B2 | 6/2018 | Siddique et al. |
| 10,007,928 B2 | 6/2018 | Graham et al. |
| 10,062,213 B2 | 8/2018 | Mount et al. |
| 10,068,381 B2 | 9/2018 | Blanchflower et al. |
| 10,115,122 B2 | 10/2018 | Soon-Shiong |
| 10,127,733 B2 | 11/2018 | Soon-Shiong |
| 10,133,342 B2 | 11/2018 | Mittal et al. |
| 10,140,317 B2 | 11/2018 | McKinnon et al. |
| 10,147,113 B2 | 12/2018 | Soon-Shiong |
| 10,217,284 B2 | 2/2019 | Das et al. |
| 10,304,073 B2 | 5/2019 | Soon-Shiong |
| 10,339,717 B2 | 7/2019 | Weisman et al. |
| 10,403,051 B2 | 9/2019 | Soon-Shiong |
| 10,509,461 B2 | 12/2019 | Mullen |
| 10,565,828 B2 | 2/2020 | Amaitis et al. |
| 10,614,477 B2 | 4/2020 | Soon-Shiong |
| 10,664,518 B2 | 5/2020 | McKinnon et al. |
| 10,675,543 B2 | 6/2020 | Reiche, III |
| 10,828,559 B2 | 11/2020 | Mullen |

(56) References Cited

U.S. PATENT DOCUMENTS

| | | |
|---|---|---|
| 10,838,485 B2 | 11/2020 | Mullen |
| 11,004,102 B2 | 5/2021 | Soon-Shiong |
| 11,107,289 B2 | 8/2021 | Soon-Shiong |
| 11,263,822 B2 | 3/2022 | Weisman et al. |
| 11,270,114 B2 | 3/2022 | Park et al. |
| 11,514,652 B2 | 11/2022 | Soon-Shiong |
| 11,521,226 B2 | 12/2022 | Soon-Shiong |
| 11,645,668 B2 | 5/2023 | Soon-Shiong |
| 11,854,036 B2 | 12/2023 | Soon-Shiong |
| 11,854,153 B2 | 12/2023 | Soon-Shiong |
| 11,869,160 B2 | 1/2024 | Soon-Shiong |
| 2001/0045978 A1 | 11/2001 | McConnell et al. |
| 2002/0044152 A1 | 4/2002 | Abbott, III et al. |
| 2002/0077905 A1 | 6/2002 | Arndt et al. |
| 2002/0080167 A1 | 6/2002 | Andrews et al. |
| 2002/0086669 A1 | 7/2002 | Bos et al. |
| 2002/0107634 A1 | 8/2002 | Luciani |
| 2002/0133291 A1 | 9/2002 | Hamada et al. |
| 2002/0138607 A1 | 9/2002 | Rourke et al. |
| 2002/0158873 A1 | 10/2002 | Williamson |
| 2002/0163521 A1 | 11/2002 | Ellenby et al. |
| 2003/0004802 A1 | 1/2003 | Callegari |
| 2003/0008619 A1 | 1/2003 | Werner |
| 2003/0027634 A1 | 2/2003 | Matthews, III |
| 2003/0060211 A1 | 3/2003 | Chern et al. |
| 2003/0069693 A1 | 4/2003 | Snapp et al. |
| 2003/0177187 A1 | 9/2003 | Levine et al. |
| 2003/0195022 A1 | 10/2003 | Lynch et al. |
| 2003/0212996 A1 | 11/2003 | Wolzien |
| 2003/0224855 A1 | 12/2003 | Cunningham |
| 2003/0234859 A1 | 12/2003 | Malzbender et al. |
| 2004/0002843 A1 | 1/2004 | Robarts et al. |
| 2004/0058732 A1 | 3/2004 | Piccionelli |
| 2004/0104935 A1 | 6/2004 | Williamson et al. |
| 2004/0110565 A1 | 6/2004 | Levesque |
| 2004/0164897 A1 | 8/2004 | Treadwell et al. |
| 2004/0193441 A1 | 9/2004 | Altieri |
| 2004/0203380 A1 | 10/2004 | Hamdi et al. |
| 2004/0221053 A1 | 11/2004 | Codella et al. |
| 2004/0223190 A1 | 11/2004 | Oka |
| 2004/0246333 A1 | 12/2004 | Steuart, III |
| 2004/0248653 A1 | 12/2004 | Barros et al. |
| 2005/0004753 A1 | 1/2005 | Weiland et al. |
| 2005/0024501 A1 | 2/2005 | Ellenby et al. |
| 2005/0043097 A1 | 2/2005 | March et al. |
| 2005/0047647 A1 | 3/2005 | Rutishauser et al. |
| 2005/0049022 A1 | 3/2005 | Mullen |
| 2005/0060377 A1 | 3/2005 | Lo et al. |
| 2005/0143172 A1 | 6/2005 | Kurzweil |
| 2005/0192025 A1 | 9/2005 | Kaplan |
| 2005/0197767 A1 | 9/2005 | Nortrup |
| 2005/0202877 A1 | 9/2005 | Uhlir et al. |
| 2005/0208457 A1 | 9/2005 | Fink et al. |
| 2005/0223031 A1 | 10/2005 | Zisserman et al. |
| 2005/0285878 A1 | 12/2005 | Singh et al. |
| 2005/0289590 A1 | 12/2005 | Cheok et al. |
| 2006/0010256 A1 | 1/2006 | Heron et al. |
| 2006/0025229 A1 | 2/2006 | Mahajan et al. |
| 2006/0038833 A1 | 2/2006 | Mallinson et al. |
| 2006/0047704 A1 | 3/2006 | Gopalakrishnan |
| 2006/0105838 A1 | 5/2006 | Mullen |
| 2006/0160619 A1 | 7/2006 | Skoglund |
| 2006/0161379 A1 | 7/2006 | Ellenby et al. |
| 2006/0166740 A1 | 7/2006 | Sufuentes |
| 2006/0190812 A1 | 8/2006 | Ellenby et al. |
| 2006/0223635 A1 | 10/2006 | Rosenberg |
| 2006/0223637 A1 | 10/2006 | Rosenberg |
| 2006/0249572 A1 | 11/2006 | Chen et al. |
| 2006/0259361 A1 | 11/2006 | Barhydt et al. |
| 2006/0262140 A1 | 11/2006 | Kujawa et al. |
| 2007/0035562 A1 | 2/2007 | Azuma et al. |
| 2007/0038944 A1 | 2/2007 | Carignano et al. |
| 2007/0060408 A1 | 3/2007 | Schultz et al. |
| 2007/0066358 A1 | 3/2007 | Silverbrook et al. |
| 2007/0070069 A1 | 3/2007 | Samarasekera et al. |
| 2007/0087828 A1 | 4/2007 | Robertson et al. |
| 2007/0099703 A1 | 5/2007 | Terebilo |
| 2007/0109619 A1 | 5/2007 | Eberl et al. |
| 2007/0146391 A1 | 6/2007 | Pentenrieder et al. |
| 2007/0162341 A1 | 7/2007 | McConnell et al. |
| 2007/0167237 A1 | 7/2007 | Wang et al. |
| 2007/0173265 A1 | 7/2007 | Gum |
| 2007/0182739 A1 | 8/2007 | Platonov et al. |
| 2007/0265089 A1 | 11/2007 | Robarts et al. |
| 2007/0271301 A1 | 11/2007 | Klive |
| 2007/0288332 A1 | 12/2007 | Naito |
| 2008/0024594 A1 | 1/2008 | Ritchey |
| 2008/0030429 A1 | 2/2008 | Hailpern et al. |
| 2008/0071559 A1 | 3/2008 | Arrasvuori |
| 2008/0081638 A1 | 4/2008 | Boland et al. |
| 2008/0106489 A1 | 5/2008 | Brown et al. |
| 2008/0125218 A1 | 5/2008 | Collins et al. |
| 2008/0129528 A1 | 6/2008 | Guthrie |
| 2008/0132251 A1 | 6/2008 | Altman et al. |
| 2008/0147325 A1 | 6/2008 | Maassel et al. |
| 2008/0154538 A1 | 6/2008 | Stathis |
| 2008/0157946 A1 | 7/2008 | Eberl et al. |
| 2008/0198159 A1 | 8/2008 | Liu et al. |
| 2008/0198222 A1 | 8/2008 | Gowda |
| 2008/0211813 A1 | 9/2008 | Jamwal et al. |
| 2008/0261697 A1 | 10/2008 | Chatani et al. |
| 2008/0262910 A1 | 10/2008 | Altberg et al. |
| 2008/0268876 A1 | 10/2008 | Gelfand et al. |
| 2008/0291205 A1 | 11/2008 | Rasmussen et al. |
| 2008/0319656 A1 | 12/2008 | Irish |
| 2009/0003662 A1 | 1/2009 | Joseph et al. |
| 2009/0013052 A1 | 1/2009 | Robarts et al. |
| 2009/0037103 A1 | 2/2009 | Herbst et al. |
| 2009/0061901 A1 | 3/2009 | ArrasVuori et al. |
| 2009/0081959 A1 | 3/2009 | Gyorfi et al. |
| 2009/0102859 A1 | 4/2009 | Athsani et al. |
| 2009/0144148 A1 | 6/2009 | Jung et al. |
| 2009/0149250 A1 | 6/2009 | Middleton |
| 2009/0167787 A1 | 7/2009 | Bathiche et al. |
| 2009/0167919 A1 | 7/2009 | Anttila et al. |
| 2009/0176509 A1 | 7/2009 | Davis et al. |
| 2009/0187389 A1 | 7/2009 | Dobbins et al. |
| 2009/0193055 A1 | 7/2009 | Kuberka et al. |
| 2009/0195650 A1 | 8/2009 | Hanai et al. |
| 2009/0209270 A1 | 8/2009 | Gutierrez et al. |
| 2009/0210486 A1 | 8/2009 | Lim |
| 2009/0213114 A1 | 8/2009 | Dobbins et al. |
| 2009/0219224 A1 | 9/2009 | Elg et al. |
| 2009/0222742 A1 | 9/2009 | Pelton et al. |
| 2009/0237546 A1 | 9/2009 | Bloebaum et al. |
| 2009/0248300 A1 | 10/2009 | Dunko et al. |
| 2009/0271160 A1 | 10/2009 | Copenhagen et al. |
| 2009/0271715 A1 | 10/2009 | Tumuluri |
| 2009/0284553 A1 | 11/2009 | Seydoux |
| 2009/0285483 A1 | 11/2009 | Guven et al. |
| 2009/0287587 A1 | 11/2009 | Bloebaum et al. |
| 2009/0289956 A1 | 11/2009 | Douris et al. |
| 2009/0293012 A1 | 11/2009 | Alter et al. |
| 2009/0319902 A1 | 12/2009 | Kneller et al. |
| 2009/0322671 A1 | 12/2009 | Scott et al. |
| 2009/0325607 A1 | 12/2009 | Conway et al. |
| 2010/0008255 A1 | 1/2010 | Khosravy et al. |
| 2010/0023878 A1 | 1/2010 | Douris et al. |
| 2010/0045933 A1 | 2/2010 | Eberl et al. |
| 2010/0048242 A1 | 2/2010 | Rhoads et al. |
| 2010/0087250 A1 | 4/2010 | Chiu |
| 2010/0113157 A1 | 5/2010 | Chin et al. |
| 2010/0138294 A1 | 6/2010 | Bussmann et al. |
| 2010/0162149 A1 | 6/2010 | Sheleheda et al. |
| 2010/0185504 A1 | 7/2010 | Rajan et al. |
| 2010/0188638 A1 | 7/2010 | Eberl et al. |
| 2010/0189309 A1 | 7/2010 | Rouzes et al. |
| 2010/0194782 A1 | 8/2010 | Gyorfi et al. |
| 2010/0208033 A1 | 8/2010 | Edge et al. |
| 2010/0211506 A1 | 8/2010 | Chang et al. |
| 2010/0217855 A1 | 8/2010 | Przybysz et al. |
| 2010/0241628 A1 | 9/2010 | Levanon |
| 2010/0246969 A1 | 9/2010 | Winder et al. |
| 2010/0257252 A1 | 10/2010 | Dougherty et al. |

(56) References Cited

U.S. PATENT DOCUMENTS

| | | |
|---|---|---|
| 2010/0287485 A1 | 11/2010 | Bertolami et al. |
| 2010/0302143 A1 | 12/2010 | Spivack |
| 2010/0306120 A1 | 12/2010 | Ciptawilangga |
| 2010/0309097 A1 | 12/2010 | Raviv et al. |
| 2010/0315418 A1 | 12/2010 | Woo |
| 2010/0321389 A1 | 12/2010 | Gay et al. |
| 2010/0321540 A1 | 12/2010 | Woo et al. |
| 2010/0325154 A1 | 12/2010 | Schloter et al. |
| 2011/0018903 A1 | 1/2011 | Lapstun et al. |
| 2011/0028220 A1 | 2/2011 | Reiche, III |
| 2011/0034176 A1 | 2/2011 | Lord et al. |
| 2011/0038634 A1 | 2/2011 | DeCusatis et al. |
| 2011/0039622 A1 | 2/2011 | Levenson et al. |
| 2011/0055049 A1 | 3/2011 | Harper et al. |
| 2011/0093326 A1 | 4/2011 | Bous et al. |
| 2011/0134108 A1 | 6/2011 | Hertenstein |
| 2011/0142016 A1 | 6/2011 | Chatterjee |
| 2011/0145051 A1 | 6/2011 | Paradise et al. |
| 2011/0148922 A1 | 6/2011 | Son et al. |
| 2011/0151955 A1 | 6/2011 | Nave |
| 2011/0153186 A1 | 6/2011 | Jakobson |
| 2011/0183754 A1 | 7/2011 | Alghamdi |
| 2011/0202460 A1 | 8/2011 | Buer et al. |
| 2011/0205242 A1 | 8/2011 | Friesen |
| 2011/0212762 A1 | 9/2011 | Ocko et al. |
| 2011/0216060 A1 | 9/2011 | Weising et al. |
| 2011/0221771 A1 | 9/2011 | Cramer et al. |
| 2011/0225069 A1 | 9/2011 | Cramer et al. |
| 2011/0234631 A1 | 9/2011 | Kim et al. |
| 2011/0238751 A1 | 9/2011 | Belimpasakis et al. |
| 2011/0241976 A1 | 10/2011 | Boger et al. |
| 2011/0246064 A1 | 10/2011 | Nicholson |
| 2011/0246276 A1 | 10/2011 | Peters et al. |
| 2011/0249122 A1 | 10/2011 | Tricoukes et al. |
| 2011/0279445 A1 | 11/2011 | Murphy et al. |
| 2011/0282747 A1 | 11/2011 | Lavrov et al. |
| 2011/0316880 A1 | 12/2011 | Ojala et al. |
| 2011/0319148 A1 | 12/2011 | Kinnebrew et al. |
| 2012/0019557 A1 | 1/2012 | Aronsson et al. |
| 2012/0050144 A1 | 3/2012 | Morlock |
| 2012/0050503 A1 | 3/2012 | Kraft |
| 2012/0075342 A1* | 3/2012 | Choubassi .............. G06T 17/00 345/633 |
| 2012/0092328 A1 | 4/2012 | Flaks et al. |
| 2012/0098859 A1 | 4/2012 | Lee et al. |
| 2012/0105473 A1 | 5/2012 | Bar-Zeev et al. |
| 2012/0105474 A1 | 5/2012 | Cudalbu et al. |
| 2012/0105475 A1 | 5/2012 | Tseng et al. |
| 2012/0109773 A1 | 5/2012 | Sipper et al. |
| 2012/0110477 A1 | 5/2012 | Gaume |
| 2012/0113141 A1 | 5/2012 | Zimmerman et al. |
| 2012/0116920 A1 | 5/2012 | Adhikari et al. |
| 2012/0122570 A1 | 5/2012 | Baronoff |
| 2012/0127062 A1 | 5/2012 | Bar-Zeev et al. |
| 2012/0127201 A1 | 5/2012 | Kim et al. |
| 2012/0127284 A1 | 5/2012 | Bar-Zeev et al. |
| 2012/0139817 A1 | 6/2012 | Freeman |
| 2012/0150746 A1 | 6/2012 | Graham |
| 2012/0157210 A1 | 6/2012 | Hall |
| 2012/0162255 A1 | 6/2012 | Ganapathy et al. |
| 2012/0194547 A1 | 8/2012 | Johnson et al. |
| 2012/0206452 A1 | 8/2012 | Geisner et al. |
| 2012/0219181 A1 | 8/2012 | Tseng et al. |
| 2012/0226437 A1 | 9/2012 | Li et al. |
| 2012/0229625 A1 | 9/2012 | Calman et al. |
| 2012/0231424 A1 | 9/2012 | Calman et al. |
| 2012/0231891 A1 | 9/2012 | Watkins, Jr. et al. |
| 2012/0232968 A1 | 9/2012 | Calman et al. |
| 2012/0232976 A1 | 9/2012 | Calman et al. |
| 2012/0236025 A1 | 9/2012 | Jacobsen et al. |
| 2012/0244950 A1 | 9/2012 | Braun |
| 2012/0252359 A1 | 10/2012 | Adams et al. |
| 2012/0256917 A1 | 10/2012 | Lieberman et al. |
| 2012/0260538 A1 | 10/2012 | Schob et al. |
| 2012/0276997 A1 | 11/2012 | Chowdhary et al. |
| 2012/0287284 A1 | 11/2012 | Jacobsen et al. |
| 2012/0293506 A1 | 11/2012 | Vertucci et al. |
| 2012/0302129 A1 | 11/2012 | Persaud et al. |
| 2013/0021373 A1 | 1/2013 | Vaught et al. |
| 2013/0044042 A1 | 2/2013 | Olsson et al. |
| 2013/0044128 A1 | 2/2013 | Liu et al. |
| 2013/0050258 A1 | 2/2013 | Liu et al. |
| 2013/0050496 A1 | 2/2013 | Jeong |
| 2013/0064426 A1 | 3/2013 | Watkins, Jr. et al. |
| 2013/0073988 A1 | 3/2013 | Groten et al. |
| 2013/0076788 A1 | 3/2013 | Zvi |
| 2013/0124563 A1 | 5/2013 | CaveLie et al. |
| 2013/0128060 A1 | 5/2013 | Rhoads et al. |
| 2013/0141419 A1 | 6/2013 | Mount et al. |
| 2013/0147836 A1 | 6/2013 | Small et al. |
| 2013/0159096 A1 | 6/2013 | Santhanagopal et al. |
| 2013/0176202 A1 | 7/2013 | Gervautz |
| 2013/0178257 A1 | 7/2013 | Langseth |
| 2013/0236040 A1 | 9/2013 | Crawford et al. |
| 2013/0326364 A1 | 12/2013 | Latta et al. |
| 2013/0335405 A1 | 12/2013 | Scavezze et al. |
| 2013/0342572 A1 | 12/2013 | Poulos et al. |
| 2014/0002492 A1 | 1/2014 | Lamb et al. |
| 2014/0101608 A1 | 4/2014 | Ryskamp et al. |
| 2014/0161323 A1 | 6/2014 | Livyatan et al. |
| 2014/0168261 A1 | 6/2014 | Margolis et al. |
| 2014/0184749 A1 | 7/2014 | Hilliges et al. |
| 2014/0267234 A1* | 9/2014 | Hook .................. G06T 19/006 345/419 |
| 2014/0306866 A1 | 10/2014 | Miller et al. |
| 2015/0091941 A1 | 4/2015 | Das et al. |
| 2015/0172626 A1 | 6/2015 | Martini |
| 2015/0206349 A1 | 7/2015 | Rosenthal et al. |
| 2015/0288944 A1 | 10/2015 | Nistico et al. |
| 2016/0269712 A1 | 9/2016 | Ostrover et al. |
| 2016/0292924 A1 | 10/2016 | Balachandreswaran et al. |
| 2017/0045941 A1 | 2/2017 | Tokubo et al. |
| 2017/0087465 A1 | 3/2017 | Lyons et al. |
| 2017/0216099 A1 | 8/2017 | Saladino |
| 2018/0300822 A1 | 10/2018 | Papakipos et al. |
| 2020/0005547 A1 | 1/2020 | Soon-Shiong |
| 2020/0257721 A1 | 8/2020 | McKinnon et al. |
| 2021/0358223 A1 | 11/2021 | Soon-Shiong |
| 2022/0156314 A1 | 5/2022 | McKinnon et al. |
| 2023/0051746 A1 | 2/2023 | Soon-Shiong |
| 2024/0062236 A1 | 2/2024 | Soon-Shiong |
| 2024/0062486 A1 | 2/2024 | Soon-Shiong |
| 2024/0212297 A1 | 6/2024 | Soon-Shiong |
| 2025/0095303 A1 | 3/2025 | Soon-Shiong |

FOREIGN PATENT DOCUMENTS

| | | |
|---|---|---|
| CA | 2233047 C | 9/2000 |
| CN | 102436461 A | 5/2012 |
| CN | 102484730 A | 5/2012 |
| CN | 102509342 A | 6/2012 |
| CN | 102509348 A | 6/2012 |
| EP | 1 012 725 | 6/2000 |
| EP | 246 080 A2 | 10/2002 |
| EP | 1 354 260 | 10/2003 |
| EP | 119 798 B1 | 3/2005 |
| EP | 1 965 344 A1 | 9/2008 |
| EP | 2 207 113 A1 | 7/2010 |
| EP | 1 588 537 B1 | 8/2010 |
| GB | 2484384 A | 4/2012 |
| JP | 2001-286674 A | 10/2001 |
| JP | 2002-056163 A | 2/2002 |
| JP | 2002-282553 A | 10/2002 |
| JP | 2002-346226 A | 12/2002 |
| JP | 2003-305276 A | 10/2003 |
| JP | 2003-337903 A | 11/2003 |
| JP | 2004-64398 A | 2/2004 |
| JP | 2004-078385 A | 3/2004 |
| JP | 2005-196494 A | 7/2005 |
| JP | 2005-215922 A | 8/2005 |
| JP | 2005-316977 A | 11/2005 |
| JP | 2006-085518 A | 3/2006 |
| JP | 2006-190099 A | 7/2006 |
| JP | 2006-280480 A | 10/2006 |

(56) References Cited

FOREIGN PATENT DOCUMENTS

| | | |
|---|---|---|
| JP | 2007-222640 A | 9/2007 |
| JP | 2010-102588 A | 5/2010 |
| JP | 2010-118019 A | 5/2010 |
| JP | 2010-224884 A | 10/2010 |
| JP | 2011-60254 A | 3/2011 |
| JP | 2011-153324 A | 8/2011 |
| JP | 2011-253324 A | 12/2011 |
| JP | 2012-014220 A | 1/2012 |
| KR | 2010-0124947 A | 11/2010 |
| KR | 20120082672 A | 7/2012 |
| KR | 10-1171264 B1 | 8/2012 |
| WO | 95/09411 A1 | 4/1995 |
| WO | 97/44737 A1 | 11/1997 |
| WO | 98/50884 A3 | 11/1998 |
| WO | 99/42946 A2 | 8/1999 |
| WO | 99/42947 A2 | 8/1999 |
| WO | 00/20929 A1 | 4/2000 |
| WO | 01/63487 A1 | 8/2001 |
| WO | 01/71282 A1 | 9/2001 |
| WO | 01/88679 A2 | 11/2001 |
| WO | 02/03091 A2 | 1/2002 |
| WO | 02/42921 A1 | 5/2002 |
| WO | 02/059716 A2 | 8/2002 |
| WO | 02/073818 A1 | 9/2002 |
| WO | 2007/140155 A2 | 12/2007 |
| WO | 2010/079876 A1 | 7/2010 |
| WO | 2010/138344 A2 | 12/2010 |
| WO | 2011/028720 A1 | 3/2011 |
| WO | 2011/084720 A2 | 7/2011 |
| WO | 2011/163063 A2 | 12/2011 |
| WO | 2012/082807 A2 | 6/2012 |
| WO | 2012164155 A1 | 12/2012 |
| WO | 2013/023705 A1 | 2/2013 |
| WO | 2013095383 A1 | 6/2013 |
| WO | 2014/108799 A2 | 7/2014 |

OTHER PUBLICATIONS

Wauters, "Stanford Graduates Release Pulse, A Must-Have News App for the iPad," Techcrunch.com, techcrunch.com/2010/05/31/pulse-ipad/, 2010.
Hickins, "A License to Pry," The Wall Street Journal, http://blogs.wsj.com/digits/2011/03/10/a-license-to-pry/tab/print/, 2011.
Notice of Reasons for Rejection issued in Japanese Patent Application No. 2014-503962 dated Sep. 22, 2014.
Notice of Reasons for Rejection issued in Japanese Patent Application No. 2014-503962 dated Jun. 30, 2015.
European Search Report issued in European Patent Application No. 12767566.8 dated Mar. 20, 2015.
"3D Laser Mapping Launches Mobile Indoor Mapping System," 3D Laser Mapping, Dec. 3, 2012, 1 page.
Banwell et al., "Combining Absolute Positioning and Vision for Wide Area Augmented Reality," Proceedings of the International Conference on Computer Graphics Theory and Applications, 2010, 4 pages.
Li et al., "3-D Motion Estimation and Online Temporal Calibration for Camera-IMU Systems," Proceedings of the IEEE International Conference on Robotics and Automation (ICRA), 2013, 8 pages.
Li et al., "High-fidelity Sensor Modeling and Self-Calibration in Vision-aided Inertial Navigation," Proceedings of the IEEE International Conference on Robotics and Automation (ICRA), 2014, 8 pages.
Li et al., "Online Temporal Calibration for Camera-IMU Systems: Theory and Algorithms," International Journal of Robotics Research, vol. 33, Issue 7, 2014, 16 pages.
Li et al., "Real-time Motion Tracking on a Cellphone using Inertial Sensing and a Rolling-Shutter Camera," Proceedings of the IEEE International Conference on Robotics and Automation (ICRA), 2013, 8 pages.
Mourikis, "Method for Processing Feature Measurements in Vision-Aided Inertial Navigation," 3 pages, 2013.
Mourikis et al., "Methods for Motion Estimation With a Rolling-Shutter Camera," Proceedings of the IEEE International Conference on Robotics and Automation (ICRA), Karlsruhe, Germany May 6-10, 2013, 9 pages.
Panzarino, "What Exactly WiFiSlam Is, and Why Apple Acquired It," http://thenextweb.com/apple/2013/03/26/what-exactly-wifislam-is-and-why-apple-acquired-it, Mar. 26, 2013, 10 pages.
Vondrick et al., "HOGgles: Visualizing Object Detection Features," IEEE International Conference on Computer Vision (ICCV), 2013, 9 pages.
Vu et al., "High Accuracy and Visibility-Consistent Dense Multiview Stereo," IEEE Transactions on Pattern Analysis and Machine Intelligence, 2012, vol. 34, No. 5, 13 pages.
International Search Report and Written Opinion issued in International Application No. PCT/US2014/061283 dated Aug. 5, 2015, 11 pages.
Pang et al., "Development of a Process-Based Model for Dynamic Interaction in Spatio-Temporal GIS", GeoInformatica, 2002, vol. 6, No. 4, pp. 323-344.
Zhu et al., "The Geometrical Properties of Irregular 2D Voronoi Tessellations," Philosophical Magazine A, 2001, vol. 81, No. 12, pp. 2765-2783.
"S2 Cells," S2Geometry, https://s2geometry.io/devguide/s2cell_hierarchy, 27 pages, Oct. 10, 2019.
Bimber et al., "A Brief Introduction to Augmented Reality, in Spatial Augmented Reality," 2005, CRC Press, 23 pages.
Milgram et al., "A Taxonomy of Mixed Reality Visual Displays," Ieice Transactions on Information and Systems, 1994, vol. 77, No. 12, pp. 1321-1329.
Normand et al., "A new typology of augmented reality applications," Proceedings of the 3rd augmented human international conference, 2012, 9 pages.
Sutherland, "A head-mounted three dimensional display," Proceedings of the Dec. 9-11, 1968, Fall Joint Computer Conference, part I, 1968, pp. 757-764.
Maubon, "A little bit of history from 2006: Nokia's MARA project," https://www.augmented-reality.fr/2009/03/un-petit-peu-dhistoire-de-2006-projet-mara-de-nokia/, 7 pages, 2009.
Madden, "Professional Augmented Reality Browsers for Smartphones," 2011, John Wiley & Sons, 44 pages.
Raper et al., "Applications of location-based services: a selected review," Journal of Location Based Services, 2007, vol. 1, No. 2, pp. 89-111.
Savage, "Blazing gyros: The evolution of strapdown inertial navigation technology for aircraft," Journal of Guidance, Control, and Dynamics, 2013, vol. 36, No. 3, pp. 637-655.
Kim et al., "A Step, Stride and Heading Determination for the Pedestrian Navigation System," Journal of Global Positioning Systems, 2004, vol. 3, No. 1-2, pp. 273-279.
"Apple Reinvents the Phone with iPhone," Apple, dated Jan. 9, 2007, https://www.apple.com/newsroom/2007/01/09Apple-Reinvents-the-Phone-with-iPhone/, 5 pages.
Macedonia et al., "Exploiting reality with multicast groups: a network architecture for large-scale virtual environments," Proceedings Virtual Reality Annual International Symposium'95, 1995, pp. 2-10.
Magerkurth et al., "Pervasive Games: Bringing Computer Entertainment Back to the Real World," Computers in Entertainment (CIE), 2005, vol. 3, No. 3, 19 pages.
Thomas et al., "ARQuake: An Outdoor/Indoor Augmented Reality First Person Application," Digest of Papers. Fourth International Symposium on Wearable Computers, 2000, pp. 139-146.
Thomas et al., "First Person Indoor/Outdoor Augmented Reality Application: ARQuake," Personal and Ubiquitous Computing, 2002, vol. 6, No. 1, pp. 75-86.
Zyda, "From Visual Simulation to Virtual Reality to Games," IEEE Computer Society, 2005, vol. 38, No. 9, pp. 25-32.
Zyda, "Creating a Science of Games," Communications-ACM, 2007, vol. 50, No. 7, pp. 26-29.
"Microsoft Computer Dictionary," Microsoft, 2002, 10 pages.
"San Francisco street map," David Rumsey Historical Map Collection, 1953, https://www.davidrumsey.com/luna/servlet/s/or3ezx, 2 pages, last accessed 2021.

(56) References Cited

OTHER PUBLICATIONS

"Official Transportation Map (2010)," Florida Department of Transportation, https://www.fdot.gov/docs/default-source/geospatial/past_statemap/maps/FLStatemap2010.pdf, 2010, 2 pages.
Krogh, "GPS," American Society of Media Photographers, dated Mar. 22, 2010, 10 pages.
"Tigo: Smartphone, 2," Ads of the World, https://www.adsoftheworld.com/media/print/tigo_smartphone_2, 6 pages, dated Jan. 2012.
Ta et al., "SURFTrac: Efficient Tracking and Continuous Object Recognition using Local Feature Descriptors," 2009 IEEE Conference on Computer Vision and Pattern Recognition, 2009, pp. 2937-2944.
Office Action issued in Chinese Application No. 201710063195.8 dated Mar. 24, 2021, 9 pages.
U.S. Appl. No. 10/438,172 filed May 13, 2003.
U.S. Appl. No. 60/496,752, filed Aug. 21, 2003.
U.S. Appl. No. 60/499,810, filed Sep. 2, 2003.
U.S. Appl. No. 60/502,939, filed Sep. 16, 2003.
U.S. Appl. No. 60/628,475, filed Nov. 16, 2004.
U.S. Appl. No. 61/411,591, filed Nov. 9, 2010.
Vallino, "Interactive Augmented Reality," 1998, University of Rochester, 109 pages.
Jay et al., "Amplifying Head Movements with Head-Mounted Displays," 2003, Presence, Massachusetts Institute of Technology, 10 pages.
Julier et al., "Information Filtering for Mobile Augmented Reality," 2000, IEEE and ACM International Symposium on Augmented Reality , 10 pages.
Julier et al., "Information Filtering for Mobile Augmented Reality," Jul. 2, 2002, IEEE, 6 pages.
Kalwasky, "The Science of Virtual Reality and Virtual Environments," 1993, Addison-Wesley, 215 pages.
Kerr et al., "Wearable Mobile Augmented Reality: Evaluating Outdoor User Experience," 2011, ACM, 8 pages.
Kopper et al., "Towards an Understanding of the Effects of Amplified Head Rotations," 2011, IEEE, 6 pages.
MacIntyre et al., "Estimating and Adapting to Registration Errors in Augmented Reality Systems," 2002, Proceedings IEEE Virtual Reality 2002, 9 pages.
Feißt, "3D Virtual Reality on mobile devices," 2009, VDM Verlag Dr. Muller Aktiengesellschaft & Co. KG, 53 pages.
Chua et al., "MasterMotion: Full Body Wireless Virtual Reality for Tai Chi," Jul. 2002, ACM SIGGRAPH 2002 conference abstracts and applications, 1 page.
Melzer et al., "Head-Mounted Displays: Designing for the User," 2011, 85 pages.
Vorländer, "Auralization—Fundamentals of Acoustics, Modelling, Simulation, Algorithms and Acoustic Virtual Reality," 2008, Springer, 34 pages.
Miller et al., "The Virtual Museum: Interactive 3D Navigation of a Multimedia Database," Jul./Sep. 1992, John Wiley & Sons, Ltd., 3 pages.
Koenen, "MPEG-4 Multimedia for our time," 1999, IEEE Spectrum, 8 pages.
Navab et al., "Laparoscopic Virtual Mirror," 2007, IEEE Virtual Reality Conference, 8 pages.
Ochi et al., "HMD Viewing Spherical Video Streaming System," 2014, ACM, 2 pages.
Olson et al., "A Design for a Smartphone-Based Head Mounted Display," 2011, 2 pages.
Pagarkar et al., "MPEG-4 Tech Paper," 24 pages, 2002.
Pausch, "Virtual Reality on Five Dollars a Day," 1991, ACM, 6 pages.
Peternier et al., "Wearable Mixed Reality System in Less Than 1 Pound," 2006, The Eurographics Assoc. , 10 pages.
Piekarski et al., "ARQuake—Modifications and Hardware for Outdoor Augmented Reality Gaming," 9 pages, 2003.
Piekarski, "Interactive 3d modelling in outdoor augmented reality worlds," 2004, The University of South Australia, 264 pages.
Piekarski et al., "Tinmith-Metro: New Outdoor Techniques for Creating City Models with an Augmented Reality Wearable Computer," 2001, IEEE, 8 pages.
Piekarski et al., "The Tinmith System—Demonstrating New Techniques for Mobile Augmented Reality Modelling," 2002, 10 pages.
Piekarski et al., "ARQuake: The Outdoor Augmented Reality Gaming System," 2002, Communications of the ACM, 3 pages.
Piekarski et al., "Integrating Virtual and Augmented Realities in an Outdoor Application," 1999, 10 pages.
Pimentel et al., "Virtual Reality—Through the new looking glass," 1993, Windcrest McGraw-Hill , 45 pages.
Basu et al., "Poster: Evolution and Usability of Ubiquitous Immersive 3D Interfaces," 2013, IEEE, 2 pages.
Pouwelse et al., "A Feasible Low-Power Augmented—Reality Terminal," 1999, 10 pages.
Madden, "Professional Augmented Reality Browsers for Smartphones," 2011, John Wiley & Sons, 345 pages.
"Protecting Mobile Privacy: Your Smartphones, Tablets, Cell Phones and Your Privacy—Hearing," May 10, 2011, U.S. Government Printing Office, 508 pages.
Rashid et al., "Extending Cyberspace: Location Based Games Using Cellular Phones," 2006, ACM, 18 pages.
Reid et al., "Design for coincidence: Incorporating real world artifacts in location based games," 2008, ACM, 8 pages.
Rockwell et al., "Campus Mysteries: Serious Walking Around," 2013, Journal of the Canadian Studies Association, vol. 7(12): 1-18, 18 pages.
Shapiro, "Comparing User Experience in a Panoramic HMD vs. Projection Wall Virtual Reality System," 2006, Sensics, 12 pages.
Sestito et al., "Intelligent Filtering for Augmented Reality," 2000, 8 pages.
Sherman et al., "Understanding Virtual Reality," 2003, Elsevier, 89 pages.
Simcock et al., "Developing a Location Based Tourist Guide Application," 2003, Australian Computer Society, Inc., 7 pages.
"Sony—Head Mounted Display Reference Guide," 2011, Sony Corporation, 32 pages.
Hollister, "Sony HMZ-T1 Personal 3D Viewer Review—The Verge, "Nov. 10, 2011, The Verge, 25 pages.
Gutiérrez et al., "Stepping into Virtual Reality," 2008, Springer-Verlag, 33 pages.
"Summary of QuickTime for Java," 90 pages, 1999.
Sutherland, "A head-mounted three dimensional display," 1968, Fall Joint Computer Conference, 8 pages.
Sutherland, "The Ultimate Display," 1965, Proceedings of IFIP Congress, 2 pages.
Thomas et al., "ARQuake: An Outdoor/Indoor Augmented Reality First Person Application,"2000, IEEE, 8 pages.
Thomas et al., "First Person Indoor/Outdoor Augmented Reality Application: ARQuake," 2002, Springer-Verlag, 12 pages.
Wagner et al., "Towards Massively Multi-user Augmented Reality on Handheld Devices," May 2005, Lecture Notes in Computer Science, 13 pages.
Shin et al., "Unified Context-aware Augmented Reality Application Framework for User-Driven Tour Guides," 2010, IEEE, 5 pages.
Julier et al., "Chapter 6—Urban Terrain Modeling for Augmented Reality Applications," 2001, Springer, 20 pages.
"Adobe Flash Video File Format Specification Version 10.1," 2010, Adobe Systems Inc., 89 pages.
Arghire, "Glu Mobile's 1000: Find 'Em All! Game Available in the App Store," https://news.softpedia.com/news/Glu-Mobile-s-1000-Find-Em-All-Game-Available-in-the-App-Store-134126.shtml, 2 pages, 2010.
Buchanan, "1,000: Find 'Em All Preview," https://www.ign.com/articles/2009/10/16/1000-find-em-all-preview, 8 pages, 2009.
Hirst, "Glu Mobile Announces '1000 Find Em All'. Real World GPS-Based Adventure for iPhone," https://www.148apps.com/news/glu-mobile-announces-1000-find-em-all-real-world-gpsbased-adventure-iphone/, 8 pages, 2010.
Tschida, "You Can Now Find 1000: Find "Em All! In The App Store, https://appadvice.com/appnn/2010/02/you-can-now-find-1000-find-em-all-in-the-app-store, 3 pages, 2010.

(56) References Cited

OTHER PUBLICATIONS

Piekarski et al., "ARQuake: the outdoor augmented reality gaming system," Communications of the ACM, 2002, vol. 45, No., 1, pp. 36-38.
Piekarski et al., "ARQuake—Modifications and Hardware for Outdoor Augmented Reality Gaming," Linux Australia, 2003, 9 pages.
Randell, "Wearable Computing: A Review," 16 pages, 2005.
Thomas et al., "ARQuake: An Outdoor/Indoor Augmented Reality First Person Application," University of South Australia, 2000, 8 pages.
Thomas et al., "First Person Indoor/Outdoor Augmented Reality Application: ARQuake," Personal and Ubiquitous Computing, 2002, vol. 6, pp. 75-86.
Thomas et al., "Usability and Playability Issues for ARQuake," 2003, 8 pages.
Livingston et al., "An augmented reality system for military operations in urban terrain," Interservice/Industry Training, Simulation, and Education Conference, 2002, vol. 89, 9 pages.
Livingston et al., "Mobile Augmented Reality: Applications and Human Factors Evaluations," 2006, 16 pages.
Cutler, "Dekko Debuts an Augmented Reality Racing Game Playable From the iPad," Techcrunch, https://techcrunch.com/2013/06/09/dekko-2/, 8 pages, 2013.
"Dekko's TableTop Speed AR Proof of Concept," www.gametrender.net/2013/06/dekkos-tabletop-speed-ar-proof-of.html, 2 pages, 2013.
"Racing AR Together," https://augmented.org/2013/06/racing-ar-together/, 3 pages, 2013.
"Delorme PN-40," www.gpsreview.net/delorme-pn-40/, downloaded on Mar. 8, 2021, 37 pages.
Owings, "DeLorme Earthmate PN-40 review," https://gpstracklog.com/2009/02/delorme-earthmate-pn-40-review.html, 17 pages, 2009.
"Astro owner's manual," https://static.garmin.com/pumac//Astro_OwnersManual.pdf, 76 pages, 2009.
"Geko 201 Personal Navigator," https://static.garmin.com/pumac/Geko201_OwnersManual.pdf, 52 pages, 2003.
"GPS 60," https://static.garmincdn.com/pumac/GPS60_OwnersManual.pdf, 90 pages, 2006.
Butler, "How does Google Earth work?," https://www.nature.com/news/2006/060213/full/060213-7.html, 2 pages, 2006.
Castello, "How's the weather?," https://maps.googleblog.com/2007/11/hows-weather.html, 3 pages, 2007.
Friedman, "Google Earth for iPhone and iPad," https://www.macworld.com/article/1137794/googleearth_iphone.html, downloaded on Sep. 7, 2010, 3 pages.
"Google Earth," http://web.archive.org/web/20091213164811/http://earth.google.com/, 1 page, 2009.
Mellen, "Google Earth 2.0 for iPhone released," https://www.gearthblog.com/blog/archives/2009/11/google_earth_20_for_iphone_released.html, downloaded on Mar. 5, 2021, 5 pages.
"Google Earth iPhone," http://web.archive.org/web/20091025070614/http://www.google.com/mobile/products/earth.html, 1 page, 2009.
Schwartz, "Send in the Clouds: Google Earth Adds Weather Layer," https://searchengineland.com/send-in-the-clouds-google-earth-adds-weather-layer-12651, 5 pages, 2007.
Senoner, "Google Earth and Microsoft Virtual Earth two Geographic Information Systems," 2007, 44 pages.
Barth, "Official Google Blog: The bright side of sitting in traffic: Crowdsourcing road congestion data," https://googleblog.blogspot.com/2009/08/bright-side-of-sitting-in-traffic.html, 4 pages, 2009.
Soni, "Introducing Google Buzz for mobile: See buzz around you and tag posts with your location.," googlemobile.blogspot.com/2010/02/introducing-google-buzz-for-mobile-see.html, 15 pages, 2010.
Chu, "New magical blue circle on your map," https://googlemobile.blogspot.com/2007/11/new-magical-blue-circle-on-your-map.html, 20 pages, 2007.
"Google Maps for your phone," https://web.archive.org/web/20090315195718/http://www.google.com/mobile/default/maps.html, 2 pages, 2009.
"Get Google on your phone," http://web.archive.org/web/20091109190817/http://google.com/mobile/#p=default, 1 page, 2009.
Gundotra, "To 100 million and beyond with Google Maps for mobile," https://maps.googleblog.com/2010/08/to-100-million-and-beyond-with-google.html, 6 pages, 2010.
"Introducing Google Buzz for mobile: See buzz around you and tag posts with your location," https://maps.googleblog.com/2010/02/introducing-google-buzz-for-mobile-see.html, 16 pages, 2010.
"Google Maps Navigation (Beta)," http://web.archive.org/web/20091101030954/http://www.google.com:80/mobile/navigation/index.html#p=default, 3 pages, 2009.
Miller, "Googlepedia: the ultimate Google resource," 2008, Third Edition, 120 pages.
"Upgrade your phone with free Google products," http://web.archive.org/web/20090315205659/http://www.google.com/mobile/, 1 page, 2009.
"Google blogging in 2010," https://googleblog.blogspot.com/2010/, 50 pages, 2010.
Cheok et al., "Human Pacman: A Mobile Entertainment System with Ubiquitous Computing and Tangible Interaction over a Wide Outdoor Area," 2003, Human-Computer Interaction with Mobile Devices and Services: 5th International Symposium, Mobile HCI 2003, Udine, Italy, Sep. 2003. Proceedings 5, 17 pages.
Knight, "Human PacMan hits real city streets," https://www.newscientist.com/article/dn6689-human-pacman-hits-real-city-streets/, 5 pages, 2004.
Sandhana, "Pacman comes to life virtually," http://news.bbc.co.uk/2/hi/technology/4607449.stm, 3 pages, 2005.
Wolke, "Digital Wayfinding Apps," https://web.archive.org/web/20200927073039/https://segd.org/digital-wayfinding-apps, 5 pages, 2010.
"Nike+ GPS: There's an App for That," https://www.runnersworld.com/races-places/a20818818/nike-gps-theres-an-app-for-that/, 3 pages, 2010.
Biggs, "Going the Distance: Nike+ GPS Vs. RunKeeper," https://techcrunch.com/2010/10/09/going-the-distance-nike-gps-vs-runkeeper/, 4 pages, 2010.
Rainmaker, "Nike+ Sportwatch GPS in Depth Review," https://www.dcrainmaker.com/2011/04/nike-sportwatch-gps-in-depth-review.html, 118 pages, 2011.
Vince, "Introduction to Virtual Reality," 2004, Springer-Verlag, 97 pages.
Fuchs et al., "Virtual Reality: Concepts and Technologies," 2006, CRC Press, 56 pages.
Arieda, "A Virtual / Augmented Reality System with Kinaesthetic Feedback—Virtual Environment with Force Feedback System," 2012, LAP Lambert Academic Publishing, 31 pages.
Sperber et al., "Web-based mobile Augmented Reality: Developing with Layar (3D)," 2010, 7 pages.
"WXHMD—A Wireless Head-Mounted Display with embedded Linux," 2009, Pabr.org, 8 pages.
"XMP Adding Intelligence to Media—XMP Specification Part 3—Storage in Files," 2014, Adobe Systems Inc., 78 pages.
Zhao, "A survey on virtual reality," 2009, Springer, 54 pages.
Zipf et al., "Using Focus Maps to Ease Map Reading—Developing Smart Applications for Mobile Devices," 3 pages, 2002.
Gammeter et al., "Server-side object recognition and client-side object tracking for mobile augmented reality," 2010, IEEE, 8 pages.
Martedi et al., "Foldable Augmented Maps," 2012, IEEE, 11 pages.
Martedi et al., "Foldable Augmented Maps," 2010, IEEE, 8 pages.
Morrison et al., "Like Bees Around the Hive: A Comparative Study of a Mobile Augmented Reality Map," 2009, 10 pages.
Takacs et al., "Outdoors Augmented Reality on Mobile Phone using Loxel-Based Visual Feature Organization," 2008, ACM, 8 pages.
Livingston et al., "An Augmented Reality System for Military Operations in Urban Terrain," 2002, Proceedings of the Interservice/Industry Training, Simulation, & Education Conference , 9 pages.
Sappa et al., "Chapter 3—Stereo Vision Camera Pose Estimation for On-Board Applications," 2007, I-Tech Education and Publishing, 12 pages.
Light et al., "Chutney and Relish: Designing to Augment the Experience of Shopping at a Farmers' Market," 2010, ACM, 9 pages.
Bell et al., "View Management for Virtual and Augmented Reality," 2001, ACM, 11 pages.

(56) References Cited

OTHER PUBLICATIONS

Cyganek et al., "An Introduction to 3D Computer Vision Techniques and Algorithms," 2009, John Wiley & Sons, Ltd, 502 pages.
Lu et al., "Foreground and Shadow Occlusion Handling for Outdoor Augmented Reality," 2010, IEEE, 10 pages.
Lecocq-Botte et al., "Chapter 25—Image Processing Techniques for Unsupervised Pattern Classification," 2007, pp. 467-488.
Lombardo, "Hyper-NPSNET: embedded multimedia in a 3D virtual world," 1993, 83 pages.
Doignon, "Chapter 20—An Introduction to Model-Based Pose Estimation and 3-D Tracking Techniques," 2007, IEEE, I-Tech Education and Publishing, 26 pages
Forsyth et al., "Computer Vision a Modern Approach, Second Edition," 2012, Pearson Education, Inc., Prentice Hall, 793 pages.
Breen et al., "Interactive Occlusion and Collision of Real and Virtual Objects in Augmented Reality," 1995, ECRC, 22 pages.
Breen et al., "Interactive Occlusion and Automatic Object Placement for Augmented Reality," 1996, Eurographics (vol. 15, No. 3), 12 pages.
Pratt et al., "Insertion of an Articulated Human into a Networked Virtual Environment," 1994, Proceedings of the 1994 AI, Simulation and Planning in High Autonomy Systems Conference, 12 pages.
Schmalstieg et al., "Bridging Multiple User Interface Dimensions with Augmented Reality," 2000, IEEE, 10 pages.
Brutzman et al., "Virtual Reality Transfer Protocol (VRTP) Design Rationale," 1997, Proceedings of the IEEE Sixth International Workshop on Enabling Technologies, 10 pages.
Brutzman et al., "Internetwork Infrastructure Requirements for Virtual Environments," 1997, National Academy Press, 12 pages.
Han, "Chapter 1—Real-Time Object Segmentation of the Disparity Map Using Projection-Based Region Merging," 2007, I-Tech Education and Publishing, 20 pages.
George et al., "A Computer-Driven Astronomical Telescope Guidance and Control System with Superimposed Star Field and Celestial Coordinate Graphics Display," 1989, J. Roy. Astron. Soc. Can., The Royal Astronomical Society of Canada, 10 pages.
Marder-Eppstein et al., "The Office Marathon: Robust Navigation in an Indoor Office Environment," 2010, IEEE International Conference on Robotics and Automation, 8 pages.
Barba et al., "Lessons from a Class on Handheld Augmented Reality Game Design," 2009, ACM, 9 pages.
Reitmayr et al., "Collaborative Augmented Reality for Outdoor Navigation and Information Browsing," 2004, 12 pages.
Reitmayr et al., "Going out: Robust Model-based Tracking for Outdoor Augmented Reality," 2006, IEEE, 11 pages.
Regenbrecht et al., "Interaction in a Collaborative Augmented Reality Environment," 2002, CHI, 2 pages.
Herbst et al., "TimeWarp: Interactive Time Travel with a Mobile Mixed Reality Game," 2008, ACM, 11 pages.
Loomis et al., "Personal Guidance System for the Visually Impaired using GPS, GIS, and VR Technologies," 1993, VR Conference Proceedings , 8 pages.
Rekimoto, "Transvision: A hand-held augmented reality system for collaborative design,"1996, Research Gate, 7 pages.
Morse et al., "Multicast Grouping for Data Distribution Management," 2000, Proceedings of the Computer Simulation Methods and Applications Conference, 7 pages.
Morse et al., "Online Multicast Grouping for Dynamic Data Distribution Management," 2000, Proceedings of the Fall 2000 Simulation Interoperability Workshop, 11 pages.
Cheverst et al., "Developing a Context-aware Electronic Tourist Guide: Some Issues and Experiences," 2000, Proceedings of the Fall 2000 Simulation Interoperability Workshop, 9 pages.
Squire et al., "Mad City Mystery: Developing Scientific Argumentation Skills with a Place-based Augmented Reality Game on Handheld Computers," 2007, Springer, 25 pages.
Romero et al., "Chapter 10—A Tutorial on Parametric Image Registration," 2007, I-Tech Education and Publishing, 18 pages.
Rosenberg, "The Use of Virtual Fixtures as Perceptual Overlays to Enhance Operator Performance in Remote Environments," 1992, Air Force Material Command, 53 pages.
Livingston et al., "Mobile Augmented Reality: Applications and Human Factors Evaluations," 2006, Naval Research Laboratory, 32 pages.
Gabbard et al., "Resolving Multiple Occluded Layers in Augmented Reality," 2003, IEEE, 11 pages.
Wloka et al., "Resolving Occlusion in Augmented Reality," 1995, ACM, 7 pages.
Zyda, "Vrais Panel on Networked Virtual Environments," Proceedings of the 1995 IEEE Virtual Reality Annual Symposium, 2 pages, 1995.
Zyda et al., "NPSNET-HUMAN: Inserting the Human into the Networked Synthetic Environment," 1995, Proceedings of the 13th DIS Workshop, 5 pages.
International Search Report and Written Opinion issued in International Application No. PCT/US2013/034164 dated Aug. 27, 2013, 11 pages.
Office Action issued in Japanese Application No. 2014-558993 dated Sep. 24, 2015, 7 pages.
Office Action issued in Japanese Application No. 2014-542591 dated Feb. 23, 2016, 8 pages.
Office Action issued in Japanese Application No. 2014-542591 dated Jul. 7, 2015, 6 pages.
Supplementary European Search Report issued in European Application No. 13854232.9 dated Jul. 24, 2015, 8 pages.
Supplementary European Search Report issued in European Application No. 12852089.7 dated Mar. 13, 2015, 8 pages.
Zhu et al., "Design of the Promo Pad: an Automated Augmented Reality Shopping Assistant," 12th Americas Conference on Information Systems, Aug. 4-6, 2006, 16 pages.
International Search Report and Written Opinion issued in International Application No. PCT/US2012/066300 dated Feb. 19, 2013, 9 pages.
International Preliminary Report on Patentability issued in International Application No. PCT/US2012/066300 dated Feb. 19, 2014, 12 pages.
Hardawar, "Naratte's Zoosh enables NFC with just a speaker and microphone," Venture Beat News, https://venturebeat.com/2011/06/19/narattes-zoosh-enables-nfc-with-just-a-speaker-and-microphone/, 24 pages, 2011.
Monahan, "Apple iPhone EasyPay Mobile Payment Rollout May Delay NFC," Javelin Strategy & Research Blog, Nov. 15, 2011, 3 pages.
"Augmented GeoTravel—Support," https://web.archive.org/web/20110118072624/http://www.augmentedworks.com/en/augmented-geotravel/augmented-geotravel-support, 2 pages, 2010.
"Augmented GeoTravel," https://web.archive.org/web/20200924232145/https://en.wikipedia.org/wiki/Augmented_GeoTravel, 2 pages, 2020.
"AugmentedWorks—iPhone Apps Travel Guide with AR: Augmented Geo Travel 3.0.0!," https://web.archive.org/web/20110128180606/http://www.augmentedworks.com/, 3 pages, 2010.
Rockwell et al., "Campus Mysteries: Serious Walking Around," Loading . . . The Journal of the Canadian Game Studies Association, 2013, vol. 7, No. 12, 18 pages.
Honkamaa et al., "A Lightweight Approach for Augmented Reality on Camera Phones using 2D Images to Simulate 3D," Proceedings of the 6th international conference on Mobile and ubiquitous multimedia, 2007, pp. 155-159.
Höllerer et al., "Mobile Augmented Reality," Telegeoinformatics: Location-based computing and services, vol. 21, 2004, 39 pages.
Raskar et al., "The Office of the Future: A Unified Approach to Image-Based Modeling and Spatially Immersive Displays," Proceedings of the 25th annual conference on Computer graphics and interactive techniques, 1998, 10 pages.
Loomis et al., "Personal Guidance System for the Visually Impaired using GPS, GIS, and VR Technologies," Proceedings of the first annual ACM conference on Assistive technologies, 1994, 5 pages.
Feiner et al., "A Touring Machine: Prototyping 3D Mobile Augmented Reality Systems for Exploring the Urban Environment," Personal Technologies, vol. 1, 1997, 8 pages.

(56) References Cited

OTHER PUBLICATIONS

Screen captures from YouTube video clip entitled "LiveSight for Here Maps—Demo on Nokia Lumia 928," 1 page, uploaded on May 21, 2013 by user "Mark Guim". Retrieved from Internet: <https://www.youtube.com/watch?v=Wf59vblvGmA>.
Screen captures from YouTube video clip entitled "Parallel Kingdom Cartography Sneak Peek," 1 page, uploaded on Oct. 29, 2010 by user "PerBluelnc". Retrieved from Internet: <https://www.youtube.com/watch?v=LORdGh4aYis>.
Screen captures from YouTube video clip entitled "Parallel Kingdom—Video 4—Starting Your Territory.mp4," 1 page, uploaded on Aug. 24, 2010 by user "PerBluelnc". Retrieved from Internet: <https://www.youtube.com/watch?app=desktop&v=5zPXKo6yFzM>.
Screen captures from YouTube video clip entitled "Parallel Kingdom—Video 8—Basics of Trading.mp4," 1 page, uploaded on Aug. 24, 2010 by user "PerBluelnc". Retrieved from Internet: <https://www.youtube.com/watch?v=z6YCmMZvHbl>.
Screen captures from YouTube video clip entitled "Parallel Tracking and Mapping for Small AR Workspaces (PTAM)—extra," 1 page, uploaded on Nov. 28, 2007 by user "ActiveVision Oxford". Retrieved from Internet: <https://www.youtube.com/watch?v=Y9HMn6bd-v8>.
Screen captures from Vimeo video clip entitled "Tabletop Speed Trailer," 1 page, uploaded on Jun. 5, 2013 by user "Dekko". Retrieved from Internet: <https://vimeo.com/67737843>.
Screen captures from YouTube video clip entitled "Delorme PN-40: Viewing maps and Imagery," 1 page, uploaded on Jan. 21, 2011 by user "Take a Hike GPS". Retrieved from Internet: <https://www.youtube.com/watch?v=cMoKKfGDw4s>.
Screen captures from YouTube video clip entitled "Delorme Earthmate PN-40: Creating Waypoints," 1 page, uploaded on Nov. 22, 2010 by user "Take a Hike GPS". Retrieved from Internet: <https://www.youtube.com/watch?v=rGz-nFdAO9Y>.
Screen captures from YouTube video clip entitled "Google Maps Navigation (Beta)," 1 page, uploaded on Oct. 27, 2009 by user "Google". Retrieved from Internet: <https://www.youtube.com/watch?v=tGXK4jKN_jY>.
Screen captures from YouTube video clip entitled "Google Maps for mobile Layers," 1 page, uploaded on Oct. 5, 2009 by user "Google". Retrieved from Internet: <https://www.youtube.com/watch?v=1W90u0Y1HGI>.
Screen captures from YouTube video clip entitled "Introduction of Sekai Camera," 1 page, uploaded on Nov. 7, 2010 by user "tonchidot". Retrieved from Internet: <https://www.youtube.com/watch?v=oxnKOQkWwF8>.
Screen captures from YouTube video clip entitled "Sekai Camera for iPad," 1 page, uploaded on Aug. 17, 2010 by user "tonchidot". Retrieved from Internet: <https://www.youtube.com/watch?v=YGwyhEK8mV8>.
Screen captures from YouTube video clip entitled "TechCrunch 50 Presentation "SekaiCamera" by TonchiDot," 1 page, uploaded on Oct. 18, 2008 by user "tonchidot". Retrieved from Internet: <https://www.youtube.com/watch?v=FKgJTJojVEw>.
Screen captures from YouTube video clip entitled "Ville Vesterinen—Shadow Cities," 1 page, uploaded on Feb. 4, 2011 by user "momoams". Retrieved from Internet: <https://www.youtube.com/watch?v=QJ1BsgoKYew>.
Screen captures from YouTube video clip entitled ""Subway": Star Wars Arcade: Falcon Gunner Trailer #1," 1 page, uploaded on Nov. 3, 2010 by user "Im/nl Studios". Retrieved from Internet: <https://www.youtube.com/watch?v=CFSMXk8Dw10>.
Screen captures from YouTube video clip entitled "Star Wars Augmented Reality: TIE Fighters Attack NYC!," 1 page, uploaded on Nov. 3, 2010 by user "Im/nl Studios". Retrieved from Internet: <https://www.youtube.com/watch?v=LoodrUC05r0>.
Screen captures from YouTube video clip entitled "Streetmuseum," 1 page, uploaded on Dec. 1, 2010 by user "Jack Kerruish". Retrieved from Internet: <https://www.youtube.com/watch?v=qSfATEZiUYo>.
Screen captures from YouTube video clip entitled "UFO on Tape iPhone Gameplay Review—AppSpy.com," 1 page, uploaded on Oct. 5, 2010 by user "Pocket Gamer". Retrieved from Internet: <https://www.youtube.com/watch?v=Zv4J3ucwyJg>.
U.S. Appl. No. 18/378,977, filed Oct. 11, 2023.
U.S. Appl. No. 18/385,889, filed Oct. 31, 2023.
Macedonia et al., "A Taxonomy for Networked Virtual Environments," 1997, IEEE Muultimedia, 20 pages.
Macedonia, "A Network Software Architecture for Large Scale Virtual Environments," 1995, 31 pages.
Macedonia et al., "NPSNET: A Network Software Architecture for Large Scale Virtual Environments," 1994, Proceeding of the 19th Army Science Conference, 24 pages.
Macedonia et al., "NPSNET: A Multi-Player 3D Virtual Environment Over the Internet," 1995, ACM, 3 pages.
Macedonia et al., "Exploiting Reality with Multicast Groups: A Network Architecture for Large-scale Virtual Environments," Proceedings of the 1995 IEEE Virtual Reality Annual Symposium, 14 pages, 1995.
Paterson et al., "Design, Implementation and Evaluation of Audio for a Location Aware Augmented Reality Game," 2010, ACM, 9 pages.
Organisciak et al., "Pico Safari: Active Gaming in Integrated Environments," Jul. 19, 2016, 22 pages.
Raskar et al., "Spatially Augmented Reality," 1998, 8 pages.
Raskar et al., "The Office of the Future: A Unified Approach to Image-Based Modeling and Spatially Immersive Displays," 1998, Computer Graphics Proceedings, Annual Conference Series, 10 pages.
Grasset et al., "MARE: Multiuser Augmented Reality Environment on table setup," 2002, 2 pages.
Behringer et al., "A Wearable Augmented Reality Testbed for Navigation and Control, Built Solely with Commercial-Off-The-Shelf (COTS) Hardware," International Symposium in Augmented Reality (ISAR 2000) in München (Munich), Oct. 5-6, 2000, 9 pages.
Behringer et al., "Two Wearable Testbeds for Augmented Reality: itWARNS and WIMMIS," International Symposium on Wearable Computing (ISWC 2000), Atlanta, Oct. 16-17, 2000, 3 pages.
Hartley et al., "Multiple View Geometry in Computer Vision, Second Edition," Cambridge University Press , 673 pages, 2004.
Wetzel et al., "Guidelines for Designing Augmented Reality Games," 2008, ACM, 9 pages.
Kasahara et al., "Second Surface: Multi-user Spatial Collaboration System based on Augmented Reality," 2012, Research Gate, 5 pages.
Diverdi et al., "Envisor: Online Environment Map Construction for Mixed Reality," 8 pages, 2008.
Benford et al., "Understanding and Constructing Shared Spaces with Mixed-Reality Boundaries," 1998, ACM Transactions on Computer-Human Interaction, vol. 5, No. 3, 40 pages.
Mann, "Humanistic Computing: "WearComp" as a New Framework and Application for Intelligent Signal Processing," 1998, IEEE, 29 pages.
Feiner et al., "Knowledge-Based Augmented Reality," 1993, Communications of the ACM , 68 pages.
Bible et al., "Using Spread-Spectrum Ranging Techniques for Position Tracking in a Virtual Environment," 1995, Proceedings of Network Realities, 16 pages.
Starner et al., "Mind-Warping: Towards Creating a Compelling Collaborative Augmented Reality Game," 2000, ACM, 4 pages.
Höllerer et al., "Chapter Nine—Mobile Augmented Reality," 2004, Taylor & Francis Books Ltd. , 39 pages.
Langlotz et al., "Online Creation of Panoramic Augmented-Reality Annotations on Mobile Phones," 2012, IEEE, 9 pages.
Kuroda et al., "Shared Augmented Reality for Remote Work Support," 2000, IFAC Manufacturing, 5 pages.
Ramirez et al., "Chapter 5—Soft Computing Applications in Robotic Vision Systems," 2007, I-Tech Education and Publishing, 27 pages.
Lepetit et al., "Handling Occlusion in Augmented Reality Systems: A Semi-Automatic Method," 2000, IEEE, 11 pages.
Zhu et al., "Personalized In-store E-Commerce with the PromoPad: an Augmented Reality Shopping Assistant," 2004, Electronic Journal for E-commerce Tools, 20 pages.
Broll et al., "Toward Next-Gen Mobile AR Games," 2008, IEEE, 10 pages.

(56) References Cited

OTHER PUBLICATIONS

Lee et al., "Exploiting Context-awareness in Augmented Reality Applications," International Symposium on Ubiquitous Virtual Reality, 4 pages, 2008.
Tian et al., "Real-Time Occlusion Handling in Augmented Reality Based on an Object Tracking Approach," www.mdpi.com/journal/sensors, 16 pages, 2010.
Szalavári et al., "Collaborative Gaming in Augmented Reality," 1998, ACM, 20 pages.
Sheng et al., "A Spatially Augmented Reality Sketching Interface for Architectural Daylighting Design," 2011, IEEE, 13 pages.
Szeliski et al., "Computer Vision: Algorithms and Applications," 2010, Springer, 874 pages.
Avery et al., "Improving Spatial Perception for Augmented Reality X-Ray Vision," 2009, IEEE, 4 pages.
Brutzman et al., "Internetwork Infrastructure Requirements for Virtual Environments," 1995, Proceedings of the Virtual Reality Modeling Language (VRML) Symposium, 11 pages.
Selman, "Java 3D Programming," 2002, Manning Publications, 352 pages.
Bradski et al., "Learning OpenCV," 2008, O'Reilly Media, 572 pages.
Schmeil et al., "MARA—Mobile Augmented Reality-Based Virtual Assistant," 2007, IEEE Virtual Reality Conference 2007 , 5 pages.
Macedonia et al., "NPSNET: A Network Software Architecture for Large Scale Virtual Environments,"1994, Presence, Massachusetts Institute of Technology, 30 pages.
Guan et al., "Spherical Image processing for Immersive Visualisation and View Generation," 2011, Thesis submitted to the University of Lancashire, 133 pages.
Sowizral et al., "The Java 3D API Specification—Second Edition," 2000, Sun Microsystems, Inc., 664 pages.
Moore, "A Tangible Augmented Reality Interface to Tiled Street Maps and its Usability Testing," 2006, Springer-Verlag, 18 pages.
Ismail et al., "Multi-user Interaction in Collaborative Augmented Reality for Urban Simulation," 2009, IEEE Computer Society, 10 pages.
Organisciak et al., "Pico Safari—Active Gaming in Integrated Environments,"2011, SDH-SEMI (available at https://www.slideshare.net/PeterOrganisciakpico-safari-sdsemi-2011).
Davison, "Chapter 7 Walking Around the Models," Pro Java™ 6 3D Game Development Java 3D, 23 pages, 2007.
"Archive for the 'Layers' Category," May 29, 2019, Layar.
Neider et al., "The Official Guide to Learning OpenGL, Version 1.1," Addison Wesley Publishing Company, 616 pages, 1997.
Singhal et al., "Netwoked Virtual Environments—Design and Implementation", ACM PRESS, Addison Wesley, 1999, 368 pages.
Neider et al., "OpenGL programming guide," 1993, vol. 478, 438 pages.
Julier et al., "BARS: Battlefield Augmented Reality System," Advanced Information Technology (Code 5580), Naval Research Laboratory, 2000, 7 pages.
Baillot et al., "Authoring of Physical Models Using Mobile Computers," Naval Research Laboratory, 2001, IEEE, 8 Pages.
Cheok et al., "Human Pacman: a mobile, wide-area entertainment system based on physical, social, and ubiquitous computing," Springer-Verlag London Limited 2004, 11 pages.
Davidson, "Pro Java™ 6 3D Game Development Java 3D Jogl, Jinput, and JOAL APIs," APRESS, 508 pages, 2007.
Boger, "Are Existing Head-Mounted Displays 'Good Enough'?," Sensics, Inc., 2007, 11 pages.
Boger, "The 2008 HMD Survey: Are We There Yet?" Sensics, Inc., 2008, 14 pages.
Boger, "Cutting the Cord: the 2010 Survey on using Wireless Video with Head-Mounted Displays," Sensics, Inc., 2008, 10 pages.
Bateman, "The Essential Guide to 3D in Flash," 2010, Friends of Ed—an Apress Company, 275 pages.
Guan, "Spherical Image Processing for Immersive Visualisation and View Generation," Thesis Submitted to the University of Central Lancashire, 133 pages, 2011.
Magerkurth, "Proceedings of PerGames—Second International Workshop on Gaming Applications in Pervasive Computing Environments," www.pergames.de., 2005, 119 pages.
Avery, "Outdoor Augmented Reality Gaming on Five Dollars a Day," www.pergames.de., 2005, 10 pages.
Ivanov, "Away 3D 3.6 Cookbook," 2011, Pakt Publishing, 480 pages.
Azuma et al., "Recent Advances in Augmented Reality," IEEE Computer Graphics and Applications, 14 pages, 2001.
Azuma, "A Survey of Augmented Reality," Presence: Teleoperators and Virtual Environments, 48 pages, 1997.
Azuma, "The Challenge of Making Augmented Reality Work Outdoors," In Mixed Reality: Merging Real and Virtual Worlds. Yuichi Ohta and Hideyuki Tamura (ed.), Springer-Verlag, 1999. Chp 21 pp. 379-390, 10 pages.
Bell et al., "Interweaving Mobile Games With Everyday Life," Proc. ACM CHI, 2006, 10 pages.
Bonamico, "A Java-based MPEG-4 Facial Animation Player," Proc Int Conf Augmented Virtual Reality& 3D Imaging, 4 pages, 2001.
Broll, "Meeting Technology Challenges of Pervasive Augmented Reality Games," ACM, 2006, 13 pages.
Brooks, "What's Real About Virtual Reality?," IEEE, Nov./Dec. 1999, 12 pages.
Julier et al., "The Need for AI: Intuitive User Interfaces for Mobile Augmented Reality Systems," 2001, ITT Advanced Engineering Sytems, 5 pages.
Burdea et al., "Virtual Reality Technology: Second Edition," 2003, John Wiley & Sons, Inc., 134 pages.
Butterworth et al., "3DM: A Three Dimensional Modeler Using a Head-Mounted Display," ACM, 1992, 5 pages.
Lee et al., "CAMAR 2.0: Future Direction of Context-Aware Mobile Augmented Reality," 2009, IEEE, 5 pages.
Cheok et al., "Human Pacman: A Mobile Entertainment System with Ubiquitous Computing and Tangible Interaction over a Wide Outdoor Area," 2003, Springer-Verlag, 16 pages.
Hezel et al., "Head Mounted Displays for Virtual Reality," Feb. 1993, MITRE, 5 pages.
McQuaid, "Everquest Shadows of Luclin Game Manual,"2001, Sony Computer Entertainment America, Inc. , 15 pages, 2001.
"Everquest Trilogy Manual," 2001, Sony Computer Entertainment America, Inc., 65 pages.
Kellner et al., "Geometric Calibration of Head-Mounted Displays and its Effects on Distance Estimation," Apr. 2012, IEEE Transactions on Visualization and Computer Graphics, vol. 18, No. 4, IEEE Computer Scociety, 8 pages.
L. Gutierrez et al., "Far-Play: a framework to develop Augmented/Alternate Reality Games," Second IEEE Workshop on Pervasive Collaboration and Social Networking, 2011, 6 pages.
Feiner et al., "A Touring Machine: Prototyping 3D Mobile Augmented Reality Systems for Exploring the Urban Environment," InProc ISWC '97 (Int. Symp. on Wearable Computing), Cambridge, MA, Oct. 13-14, 1997, pp. 74-81, 8 pages.
Fisher et al., "Virtual Environment Display System," Oct. 23-24, 1986, ACM, 12 pages.
Fuchs et al., "Virtual Reality: Concepts and Technologies," 2011, CRC Press, 132 pages.
Gabbard et al., "Usability Engineering: Domain Analysis Activities for Augmented Reality Systems," 2002, The Engineering Reality of Virtual Reality, Proceedings SPIE Volume 4660, Stereoscopic Displays and Virtual Reality Systems IX, 13 pages.
Gledhill et al., "Panoramic imaging—a review," 2003, Elsevier Science Ltd., 11 pages.
Gotow et al., "Addressing Challenges with Augmented Reality Applications on Smartphones," Institute for Computer Sciences, Social Informatics and Telecommunications Engineering, 2010, 14 pages.
"GPS accuracy and Layar usability testing," 2010, mediaLABamsterdam, 7 pages.
Gradecki, "The Virtual Reality Construction Kit," 1994, Wiley & Sons Inc, 100 pages.
Heymann et al., "Representation, Coding and Interactive Rendering of High-Resolution Panoramic Images and Video Using MPEG-4," 2005, 5 pages.

(56) References Cited

OTHER PUBLICATIONS

Hollands, "The Virtual Reality Homebrewer's Handbook," 1996, John Wiley & Sons, 213 pages.
Hollerer et al., "User Interface Management Techniques for Collaborative Mobile Augmented Reality," Computers and Graphics 25(5), Elsevier Science Ltd, Oct. 2001, pp. 799-810, 9 pages.
Holloway et al., "Virtual Environments: A Survey of the Technology," Sep. 1993, 59 pages.
Strickland, "How Virtual Reality Gear Works," Jun. 7, 2009, How Stuff Works, Inc., 3 pages.
Hurst et al., "Mobile 3D Graphics and Virtual Reality Interaction," 2011, ACM, 8 pages.
"Human Pacman-Wired NextFest," 2005, Wired.
Cheok et al., "Human Pacman: A Sensing-based Mobile Entertainment System with Ubiquitous Computing and Tangible Interaction," 2000, ACM, 12 pages.
Basu et al., "Immersive Virtual Reality On-The-Go," 2013, IEEE Virtual Reality, 2 pages.
"Inside QuickTime—The QuickTime Technical Reference Library—QuickTime VR," 2002, Apple Computer Inc., 272 pages.
Bayer et al., "Chapter 3: Introduction to Helmet-Mounted Displays," 62 pages, 2009.
Iovine, "Step Into Virtual Reality", 1995, Windcrest/McGraw-Hill , 106 pages.
Jacobson et al., "Garage Virtual Reality," 1994, Sams Publishing, 134 pages.
Lin, "How is Nike+ Heat Map Calculated?," howtonike.blogspot.com/2012/06/how-is-nike-heat-map-calculated.html, 4 pages, 2012.
"Map your run with new Nike+ GPS App," Nike News, Sep. 7, 2010, 3 pages.
Savov, "App review: Nike+ GPS," https://www.engadget.com/2010-09-07-app-review-nike-gps.html, 4 pages, 2010.
Lutz, "Nokia reveals new City Lens augmented reality app for Windows Phone 8 lineup," https://www.engadget.com/2012-09-11-nokia-reveals-new-city-lens-for-windows-phone-8.html, 3 pages, 2012.
Nayan, "Bytes: Livesight update integrates "City Lens" to Here Maps !! Nokia announces partnership with "Man of steel", releases promo," https://nokiapoweruser.com/bytes-livesight-update-integrates-city-lens-to-here-maps-nokia-announces-partnership-with-man-of-steel-release-promo-video/, 4 pages, 2013.
Webster, "Nokia's City Lens augmented reality app for Lumia Windows Phones comes out of beta," https://www.theverge.com/2012/9/2/3287420/nokias-city-lens-ar-app-launch, 2 pages, 2012.
"Nokia Image Space on video," https://blogs.windows.com/devices/2008/09/24/nokia-image-space-on-video/, 4 pages, 2008.
Montola et al., "Applying Game Achievement Systems to Enhance User Experience in a Photo Sharing Service," Proceedings of the 13th International MindTrek Conference: Everyday Life in the Ubiquitous Era, 2009, pp. 94-97.
Arghire, "Nokia Image Space Now Available for Download," https://news.softpedia.com/news/Nokia-Image-Space-Now-Available-for-Download-130523.shtml, 2 pages, 2009.
Then, "Nokia Image Space adds Augmented Reality for S60," https://www.slashgear.com/nokia-image-space-adds-augmented-reality-for-s60-3067185/, 6 pages, 2009.
Uusitalo et al., "A Solution for Navigating User-Generated Content," 2009 8th IEEE International Symposium on Mixed and Augmented Reality, 2009, pp. 219-220.
Bhushan, "Nokia Rolls out Livesight to Here Maps," https://www.digit.in/news/apps/nokia-rolls-out-livesight-to-here-maps-14740.html, 2 pages, 2013.
Blandford, "Here Maps adds LiveSight integration to let you "see" your destination," http://allaboutwindowsphone.com/news/item/17563_HERE_Maps_adds_LiveSight_integ.php, 16 pages, 2013.
Bonetti, "Here brings sight recognition to Maps," https://web.archive.org/web/20130608025413/http://conversations.nokia.com/2013/05/21/here-brings-sight-recognition-to-maps/, 5 pages, 2013.
Burns, "Nokia City Lens released from Beta for Lumia devices," https://www.slashgear.com/nokia-city-lens-released-from-beta-for-lumia-devices-1%20246841/, 9 pages, 2012.

Viswav, "Nokia Details the New LiveSight Experience on Here Maps," https://mspoweruser.com/nokia-details-the-new-livesight-experience-on-here-maps/, 19 pages, 2013.
Viswav, "Nokia Announces LiveSight, An Augmented Reality Technology," https://mspoweruser.com/nokia-announces-livesight-an-augmented-reality-technology/, 19 pages, 2012.
Varma, "Nokia Here Map gets integrated with LiveSight Augmented Reality feature," https://www.datareign.com/nokia-here-map-integrate-livesight-augmented-reality-feature/, 5 pages, 2013.
Bosma, "Nokia works on mobile Augmented Reality (AR)," https://www.extendlimits.nl/en/article/nokia-works-on-mobile-augmented-reality-ar, 6 pages, 2006.
Greene, "Hyperlinking Reality via Phones," https://www.technologyreview.com/2006/11/20/273250/hyperlinking-reality-via-phones/, 11 pages, 2006.
Knight, "Mapping the world on your phone," https://www.cnn.com/2007/TECH/science/05/23/Virtualmobile 1/, 2 pages, 2007.
"MARA," https://web.archive.org/web/20100531083640/http://www.research.nokia.com:80/research/projects/mara, 3 pages, 2010.
Maubon, "A little bit of history from 2006: Nokia MARA project," https://www.augmented-reality.fr/2009/03/un-petit-peu-dhistoire-de-2006-projet-mara-de-nokia/, 7 pages, 2009.
"Nokia's MARA Connects The Physical World Via Mobile," https://theponderingprimate.blogspot.com/2006/11/nokias-mara-connects-physical-world.html, 14 pages, 2006.
Patro et al., "The anatomy of a large mobile massively multiplayer online game," Proceedings of the first ACM international workshop on Mobile gaming, 2012, 6 pages.
Schumann et al., "Mobile Gaming Communities: State of the Art Analysis and Business Implications," Central European Conference on Information and Intelligent Systems, 2011, 8 pages.
Organisciak, "Pico Safari: Active Gaming in Integrated Environments," https://organisciak.wordpress.com/2016/07 /19/pico-safari-active-gaming-in-integrated-environments/, 21 pages, 2016.
"Plundr," https://web.archive.org/web/20110110032105/areacodeinc.com/projects/plundr/, 3 pages, 2007.
Caoili et al., "Plundr: Dangerous Shores' location-based gaming weighs anchor on the Nintendo DS," https://www.engadget.com/2007-06-03-plundr-dangerous-shores-location-based-gaming-weighs-anchor-on-the-nintendi-ds.html, 2 pages, 2007.
Miller, "Plundr, first location-based DS game, debuts at Where 2.0," https://www.engadget.com/2007-06-04-plundr-first-location-based-ds-game-debuts-at-where-2-0.html, 4 pages, 2007.
Blösch et al., "Vision Based MAV Navigation in Unknown and Unstructured Environments," 2010 IEEE International Conference on Robotics and Automation, 2010, 9 pages.
Castle et al., "Video-rate Localization in Multiple Maps for Wearable Augmented Reality," 2008 12th IEEE International Symposium on Wearable Computers, 8 pages, 2008.
Klein et al. "Parallel Tracking and Mapping for Small AR Workspaces," 2007 6th IEEE and ACM international symposium on mixed and augmented reality, 2007, 10 pages.
Klein et al. "Parallel tracking and mapping on a camera phone," 2009 8th IEEE International Symposium on Mixed and Augmented Reality, 2009, 4 pages.
Van Den Hengel et al., "In Situ Image-based Modeling," 2009 8th IEEE International Symposium on Mixed and Augmented Reality, 2009, 4 pages.
Hughes, "Taking social games to the next level," https://www.japantimes.co.jp/culture/2010/08/04/general/taking-social-games-to-the-next-level/, 1 page, 2010.
Kincaid, "TC50 Star Tonchidot Releases Its Augmented Reality Sekai Camera Worldwide," https://techcrunch.com/2009/12/21/sekai-camera/, 9 pages, 2009.
Martin, "Sekai Camera's new reality," https://www.japantimes.co.jp/life/2009/10/14/digital/sekai-cameras-new-reality/, 3 pages, 2009.
Nakamura et al., "Control of Augmented Reality Information Volume by Glabellar Fader," Proceedings of the 1st Augmented Human international Conference, 2010, 3 pages.
"Anime×Tsutaya×Sekai Camera," https://japanesevw.blogspot.com/2010/08/animetsutayasekai-camera.html#links, 4 pages, 2010.
"AR-RPG(ARPG) "Sekai Hero"," https://japanesevw.blogspot.com/2010/08/ar-rpgarpg-sekai-hero.html#links, 5 pages, 2010.

(56) References Cited

OTHER PUBLICATIONS

Toto, "Augmented Reality App Sekai Camera Goes Multi-Platform. Adds API and Social Gaming," https://techcrunch.com/2010/07/14/augmented-reality-app-sekai-camera-goes-multi-platform-adds-api-and-social-gaming/, 4 pages, 2010.
Hämäläinen, "[Job] Location Based MMORPG server engineers—Grey Area & Shadow Cities," https://erlang.org/pipermail/erlang-questions/2010-November/054788.html, 2 pages, 2010.
Jordan, "Grey Area CEO Ville Vesterinen on building out the success of location-based Finnish hit Shadow Cities," https://www.pocketgamer.com/grey-area-news/grey-area-ceo-ville-vesterinen-on-building-out-the-success-of-location-based-fin/, 4 pages, 2010.
"Shadow Cities," https://web.archive.org/web/20101114162700/http://www.shadowcities.com/, 7 pages, 2010.
Buchanan, "Star Wars: Falcon Gunner iPhone Review," https://www.ign.com/articles/2010/11/18/star-wars-falcon-gunner-iphone-review, 13 pages, 2010.
"THQ Wireless Launches Star Wars Arcade: Falcon Gunner," https://web.archive.org/web/20101129010405/http:/starwars.com/games/videogames/swarcade_falcongunner/index.html, 5 pages, 2010.
Firth, "Play Star Wars over the city: The incredible new game for iPhone that uses camera lens as backdrop for spaceship dogfights," https://www.dailymail.co.uk/sciencetech/article-1326564/Star-Wars-Arcade-Falcon-Gunner-iPhone-game-uses-camera-lens-backdrop.html, 24 pages, 2010.
Grundman, "Star Wars Arcade: Falcon Gunner Review," https://www.148apps.com/reviews/star-wars-arcade-falcon-gunner-review/, 11 pages, 2010.
"Star Wars Arcade: Falcon Gunner," https://www.macupdate.com/app/mac/35949/star-wars-arcade-falcon-gunner, downloaded on Feb. 9, 2021, 5 pages.
Nelson, "THQ Announces 'Star Wars: Falcon Gunner' Augmented Reality Shooter," https://toucharcade.com/2010/11/04/thq-announces-star-wars-falcon-gunner-augmented-reality-shooter/, 6 pages, 2010.
Rogers, "Review: Star Wars Arcade: Falcon Gunner," isource.com/2010/12/04/review-star-wars-arcade-falcon-gunner/, downloaded on Feb. 9, 2021, 14 pages, 2010.
Schonfeld, "The First Augmented Reality Star Wars Game, Falcon Gunner, Hits The App Store," https://techcrunch.com/2010/11/17/star-wars-iphone-falcon-gunner/, 15 pages, 2010.
"How it Works," https://web.archive.org/web/20130922212452/http://www.strava.com/how-it-works, 4 pages, 2013.
"Tour," https://web.archive.org/web/20110317045223/http://www.strava.com/tour, 9 pages, 2011.
Eccleston-Brown, "Old London seen with new eyes thanks to mobile apps," http://news.bbc.co.uk/local/london/hi/things_to_do/newsid_8700000/8700410.stm, 3 pages, 2010.
"Streetmuseum' Museum of London App Offers a New Perspective on the Old," https://www.trendhunter.com/trends/streetmuseum-museum-of-london-app, 6 pages, 2021.
"Museum of London 'StreetMuseum' by Brothers and Sisters," https://www.campaignlive.co.uk/article/museum-london-streetmuseum-brothers-sisters/1003074, 11 pages, 2010.
Zhang, "Museum of London Releases Augmented Reality App for Historical Photos," https://petapixel.com/2010/05/24/museum-of-london-releases-augmented-reality-app-for-historical-photos/, 11 pages, 2010.
Lister, "Turf Wars and Fandango among this week's free iPhone apps," https://www.newsreports.com/turf-wars-and-fandango-among-this-week-s-free-iphone-apps/, 6 pages, 2010.
McCavitt, "Turf Wars iPhone Game Review," https://web.archive.org/web/20100227030259/http://www.thegamereviews.com:80/article-1627-Turf-Wars-iPhone-Game-Review.html, 2 pages, 2010.
"Turf Wars Captures Apple's iPad," old.gamegrin.com/game/news/2010/turf-wars-captures-apples-ipad, downloaded on Feb. 5, 2021, 2 pages, 2010.
James, "Turf Wars (iPhone GPS Game) Guide and Walkthrough," https://web.archive.org/web/20120114125609/http://gameolosophy.com/games/turf-wars-iphone-gps-game-guide-and-walkthrough, 3 pages, 2011.

Rachel et al., "Turf Wars' Nick Baicoianu—Exclusive Interview," https://web.archive.org/web/20110101031555/http://www.gamingangels.com/2009/12/turf-wars-nick-baicoianu-exclusive-interview/, 7 pages, 2009.
Gharrity, "Turf Wars Q&A," https://web.archive.org/web/20110822135221/http://blastmagazine.com/the-magazine/gaming/gaming-news/turf-wars-qa/, 11 pages, 2010.
"Introducing Turf Wars, the Free, GPS based Crime Game for Apple iPhone," https://www.ign.com/articles/2009/12/07/introducing-turf-wars-the-free-gps-based-crime-game-for-apple-iphone, 11 pages, 2009.
"Turf Wars," https://web.archive.org/web/20100328171725/http://itunes.apple.com:80/app/turf-wars/id332185049?mt=8, 3 pages, 2010.
Zungre, "Turf Wars Uses GPS to Control Real World Territory," https://web.archive.org/web/20110810235149/http://www.slidetoplay.com/story/turf-wars-uses-gps-to-control-real-world-territory, 1 page, 2009.
"Turf Wars," https://web.archive.org/web/20101220170329/http://turfwarsapp.com/, 1 page, 2010.
"Turf Wars News," https://web.archive.org/web/20101204075000/hltp://turfwarsapp.com/news/, 5 pages, 2010.
"Turf Wars Screenshots," https://web.archive.org/web/20101204075000/http://turfwarsapp.com/news/, 5 pages, 2010.
Broida, "UFO on Tape: The game of close encounters," https://www.cnet.com/news/ufo-on-tape-the-game-of-close-encounters/, 7 pages, 2010.
Buchanan, "UFO on Tape Review," https://www.ign.com/articles/2010/09/30/ufo-on-tape-review, 7 pages, 2010.
Nesvadba, "UFO on Tape Review," https://www.appspy.com/review/4610/ufo-on-tape, 3 pages, 2010.
Barry, "Waze Combines Crowdsourced GPS and Pac-Man," https://www.wired.com/2010/11/waze-combines-crowdsourced-gps-and-pac-man/, 2 pages, 2010.
Dempsey, "Waze: Crowdsourcing traffic and roads," https://www.gislounge.com/crowdsourcing-traffic-and-roads/, 10 pages, 2010.
Forrest, "Waze: Make Your Own Maps in Realtime," http://radar.oreilly.com/2009/08/waze-make-your-own-maps-in-rea.html, 4 pages, 2009.
Forrest, "Waze: Using groups and gaming to get geodata," http://radar.oreilly.com/2010/08/waze-using-groups-and-gaming-t.html, 3 pages, 2010.
Furchgott, "The Blog; App Warns Drivers of the Mayhem Ahead," https://archive.nytimes.com/query.nytimes.com/gst/fullpage-9B07EFDC1E3BF930A25751C0A967908B63.html, downloaded on Feb. 17, 2021, 2 pages.
Ha, "Driving app Waze turns the highway into a Pac-Man game with 'Road Goodies'," https://venturebeat.com/social/driving-app-waze-turns-the-highway-into-a-pac-man-style-game-with-road-goodies/, 4 pages, 2009.
Rogers, "Review: Waze for the iPhone," isource.com/2010/08/30/review-waze-for-the-iphone/, downloaded on Feb. 17, 2021, 22 page.
Fox, "What is Wherigo?," https://forums.geocaching.com/GC/index.php?/topic/241452-what-is-wherigo/, 4 pages, 2010.
Lenahan, "Create Exciting GPS Adventure Games With Wherigo," https://www.makeuseof.com/tag/create-gps-adventure-games-wherigo/?utm_source=twitterfeed&utm_medium=twitter, 15 pages, 2010.
"Developers—Download Wikitude API," https://web.archive.org/web/20110702200814/http://www.wikitude.com/en/developers, 8 pages, 2010.
Hauser, "Wikitude World Browser," https://web.archive.org/web/20110722165744/http:/www.wikitude.com/en/wikitude-world-browser-augmented-reality, 5 pages, 2010.
Madden, "Professional augmented reality browsers for smartphones: programming for junaio, layar and wikitude," 2011, 345 pages.
Chen, "Yelp Sneaks Augmented Reality Into iPhone App," https://www.wired.com/2009/08/yelp-ar/, 2 pages, 2009.
Herrman, "Augmented Reality Yelp Will Murder All Other iPhone Restaurant Apps, My Health," https://gizmodo.com/augmented-reality-yelp-will-murder-all-other-iphone-res-5347194, 5 pages, 2009.
"Easter Egg: Yelp Is the iPhone's First Augmented Reality App," https://mashable.com/2009/08/27/yelp-augmented-reality/, downloaded Feb. 5, 2021, 10 pages.

(56) References Cited

OTHER PUBLICATIONS

Metz, "'Augmented reality' comes to mobile phones," https://www.nbcnews.com/id/wbna33165050, 10 pages, 2009.
Mortensen, "New Yelp App Has Hidden Augmented Reality Mode," https://www.cultofmac.com/15247/new-yelp-app-has-hidden-augmented-reality-mode, 5 pages, 2009.
Schramm, "Voices that Matter iPhone: How Ben Newhouse created Yelp Monocle, and the future of AR," https://www.engadget.com/2010-04-26-voices-that-matter-iphone-how-ben-newhouse-created-yelp-monocle.html, 7 pages, 2010.
Hand, "NYC Nearest Subway AR App for iPhone 3GS," https://vizworld.com/2009/07/nyc-nearest-subway-ar-app-for-iphone-3gs/, 7 pages, 2009.
"Acrossair Augmented Reality Browser," https://appadvice.com/app/acrossair-augmented-reality/348209004, 3 pages, 2009.
Schwartz, "Lost in the Subway? Use AcrossAir's Augmented Reality iPhone App," https://www.fastcompany.com/1311181/lost-subway-use-acrossairs-augmented-reality-iphone-app?itm_source=parsely-api, 8 pages, 2009.
Hartsock, "Acrossair: Getting There Is Half the Fun," https://www.technewsworld.com/story/70502.html, downloaded on Mar. 12, 2021, 5 pages.
"AugmentedWorks—iPhone Apps Travel Guide with AR: Augmented GeoTravel 3.0.0," https://web.archive.org/web/20110128180606/http://augmentedworks.com/, 3 pages, 2010.
"Augmented GeoTravel—Features," https://web.archive.org/web/20100909163937/http://www.augmentedworks.com/en/augmented-geotravel/features, 2 pages, 2010.

Varshney, Upkar. "Location Management for Mobile Commerce Applications in Wireless Internet Environment." ACM transactions on Internet technology 3.3 (2003): 236-255. Web. (Year: 2003).
Hühn, Arief Ernst et al. "On the Use of Virtual Environments for the Evaluation of Location-Based Applications.". Proceedings of the SIGCHI Conference on Human Factors in Computing Systems. ACM, 2012. 2569-2578. Web. (Year: 2012).
Jackson, Emily. "Shopper Marketing Techs up; From Geo-Targeting to Augmented Reality Shopping Apps, Brands and Retailers Get Digital." Strategy (2012): 18-. Print. (Year: 2012).
Warner, Chris. Augmented Reality Helps Retailers Get Personal: Sensors Are First in Line at the Point of Sale. Vol. 56. Advantage Business Media, 2012. Print. (Year: 2012).
"Geko 301," http://www.garmin.com/en-US/p/221, Mar. 16, 2021, 3 pages.
"Introducing myNav: Peter Cooper Village/Stuyvesant Town," http://mynav-peter-cooper-villagestuyvesant-town-appstor,io/zh, Mar. 16, 2021, 2 pages.
"myNav: Peter Cooper Village/Stuyvesant Town," https://appadvice.com/app/mynav-peter-cooper-village/383793988, Mar. 16, 2021, 3 pages.
Harris, "How Does the Nike Plue Wrok?," http://web.archive.org/web/20111104034832/http://ww.livesdtron.com80/article533191-how-does-the-nike-plus-work/, Sep. 2, 2011, 2 pages
"Louvre DNP Museum Lab," http.web.archive.org/web/20130317055849fhttp://wvwv.museumlab.eu/exhibition/10/index.html, Mar. 17, 2013, 2 pages.
"Wherigo Advanced Concepts," http:web_archive.org/web/20080605161049/https:www.wherigo.com/tutorial/advanced.html, Jun. 5, 2008, 8 pages.

* cited by examiner

WIDE AREA AUGMENTED REALITY LOCATION-BASED SERVICES

This application is a continuation of U.S. application Ser. No. 17/587,183, filed Jan. 28, 2022, which is a continuation of U.S. application Ser. No. 16/864,075, filed Apr. 30, 2020, which is a continuation of U.S. application Ser. No. 16/168,419, filed Oct. 23, 2018, which is a continuation of U.S. application Ser. No. 15/794,993, filed Oct. 26, 2017, which is a continuation of U.S. application Ser. No. 15/406,146, filed Jan. 13, 2017, which is a continuation of U.S. application Ser. No. 14/517,728, filed Oct. 17, 2014, which claims priority to U.S. Provisional Application No. 61/892,238, filed Oct. 17, 2013. These and all other extrinsic references referenced herein are incorporated by reference in their entirety.

FIELD OF THE INVENTION

The field of the invention is augmented reality service technologies.

BACKGROUND

The following description includes information that may be useful in understanding the present invention. It is not an admission that any of the information provided herein is prior art or relevant to the presently claimed invention, or that any publication specifically or implicitly referenced is prior art.

As advances in technology continue to be developed, the utilization of Augmented Reality (AR) to enhance experiences is becoming increasingly popular. Various entities have attempted to capitalize on this increasing popularity by providing AR content to users based on specific types of object recognition or location tracking.

For example, U.S. Pat. No. 8,519,844 to Richey et al., filed on Jun. 30, 2010 contemplates accessing first and second location data, wherein the second location data has increased accuracy regarding the location of a device, and communicating augmented data to the device based on the location data.

The '844 patent and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Another example of location based content services, while not directed to AR content, can be found in U.S. Pat. No. 8,321,527 to Martin, et al, filed on Sep. 10, 2009, which describes a system for scheduling content distribution to a mobile device by storing different locations, collecting user location data over a period of time, collecting wireless signal strength data, and scheduling pre-caching of content to the device if the user is predicted to be at a location with poor signal strength.

Still further, various other examples of systems and methods for providing content to a user based on a location or other parameters can be found in International Patent Application Publication Number WO 2013/023705 to Hoffman, et al, filed on Aug. 18, 2011, International Patent Application Publication Number WO 2007/140155 to Leonard, et al, filed on May 21, 2007, U.S. Patent Application Publication Number 2013/0003708 to Ko, et al, filed on Jun. 28, 2011, U.S. Patent Application Publication Number 2013/0073988 to Groten, et al, filed on Jun. 1, 2011, and U.S. Patent Application Publication Number 2013/0124326 to Huang, et al, filed on Nov. 15, 2011.

While some of the known references contemplate refining location identification or pre-caching content based on location information, they fail to consider that areas have various views of interest, and fail to differentiate between sub-areas based on AR content densities. Viewed from another perspective, known location based systems fail to contemplate segmenting an area into clusters based on what is viewable or what AR content is available.

Thus, there is still a need for improved AR service technologies, and especially location based AR service technologies.

SUMMARY OF THE INVENTION

The inventive subject matter provides apparatuses, systems and methods in which AR content is provided to one or more user devices based on at least one of location identification and object recognition. In some contemplated aspects, the user device could be auto-populated with AR content objects based on a location, and the AR content objects could be instantiated based on object recognition within the location.

One aspect of the inventive subject matter includes a content management system comprising a content management engine coupled with an area database and a content database. The content management engine can be configured to communicate with the databases and perform various steps in order to provide content objects to a device for modification or instantiation.

The area database could be configured to store area data related to an area of interest. This area data could comprise image data, video image data, real-time image data, still image data, signal data (e.g., Compressive Sensing of Signals (CSS) data, Received Signal Strength (RSS), WiFi signal data, beacon signal data, etc.), audio data, an initial map (e.g., CAD drawing, 3-dimensional model, blueprint, etc.), or any other suitable data related to a layout of an area.

The content database could be configured to store augmented reality or other digital content objects of various modalities, including for example, image content objects, video content objects, or audio content objects. It is contemplated that the content objects could be associated with one or more real world objects viewable from an area of interest.

Viewed from another perspective, a content management engine of the inventive subject matter could comprise an AR management engine that is configured to obtain an initial map of an area of interest from the area data within the area database. The step of obtaining the initial map could comprise obtaining a CAD, blueprint, 3-D model, a robot or drone created map, or other representation from the area database itself, or could comprise obtaining area data such as image data, signal data, video data, audio data, views data, viewable object data, points of interest data, field of view data, etc. to generate the initial map.

The AR management engine could then derive a set of views of interest from at least one of the initial map and other area data. The views of interest are preferably representative of where people would, should, or could be looking while navigating through various portions of the area of interest. The views of interest could be derived by the map generation engine, or via recommendations, requests or other inputs of one or more users (e.g., potential viewer, advertiser, manager, developer, etc.), could be created manually by a systems manager or other user, or could be modeled based on some or all of the area data. The views of interest could comprise, among other things, a view-point origin, a field of interest, an owner, metadata, a direction (e.g., a vector, an angle, etc.), an orientation (e.g., pitch, yaw, roll, etc.), a cost, a search attribute, a descriptor set, an object of interest, or any combination or multiples thereof. For example, a view of interest could comprise a view-point origin (i.e., point of view origin), at least one field of interest, and a viewable object of interest. Another view of interest could comprise a view-point origin, at least two fields of interest, and a viewable object of interest.

Once the views of interest have been derived, the AR management engine could obtain a set of AR content objects (e.g., a virtual object, chroma key content, digital image, digital video, audio data, application, script, promotion, advertisement, game, workflow, kinesthetic, tactile, lesson plan, etc.) from the AR content database. Each of the AR content objects will preferably be related to one or more of the derived views of interest. The AR content objects could be selected for obtaining based on one or more of the following: a search query, an assignment of content objects to a view of interest or object of interest within the view, one or more characteristics of the initial map, a context of an intended user of a user (e.g., a potential viewer, advertiser, manager, developer, etc.), or a recommendation, selection or request of a user.

The AR management engine could then establish AR experience clusters within the initial map as a function of the AR content objects obtained and views of interest derived. These clusters will preferably represent a combination of the views of interest and related information, and a density or other characteristic of AR content objects related to the views of interest. Viewed from another perspective, each cluster could represent a subset of the derived views of interest and associated AR content objects.

Based on the AR experience clusters or information related thereto, the AR management engine could generate a tile map comprising tessellated tiles (e.g., regular or non-regular (e.g., semi-regular, aperiodic, etc.), Voronoi tessellation, penrose tessellation, K-means cluster, etc.) that cover at least a portion of the area of interest. Some or all of the tiles could advantageously be individually bound to a subset of the obtained AR content objects, which can comprise overlapping or completely distinct subsets. Additionally or alternatively, the tiles could be associated with one or more of an identification, an owner, an object of interest, a set of descriptors, an advertiser, a cost, or a time. Still further, it is contemplated that the tiles could be dynamic in nature such that the tessellation of the area could change based on an event or a time. Contemplated events include, among other things, a sale, a news event, a publication, a change in inventory, a disaster, a change in advertiser, or any other suitable event. It is also contemplated that a view-point origin, a field of interest, a view or an object of interest could be dynamic in nature.

The AR management engine could further configure a device (e.g., a mobile device, a kiosk, a tablet, a cell phone, a laptop, a watch, a vehicle, a server, a computer, etc.) to obtain at least a portion of the subset based on the tile map (e.g., based on the device's location in relation to the tiles of a tile map, etc.), and present at least a portion of the AR content objects on a display of the device (e.g., instantiate the object, etc.). It is contemplated that the device could compose a data center and be coupled with a cloud server.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
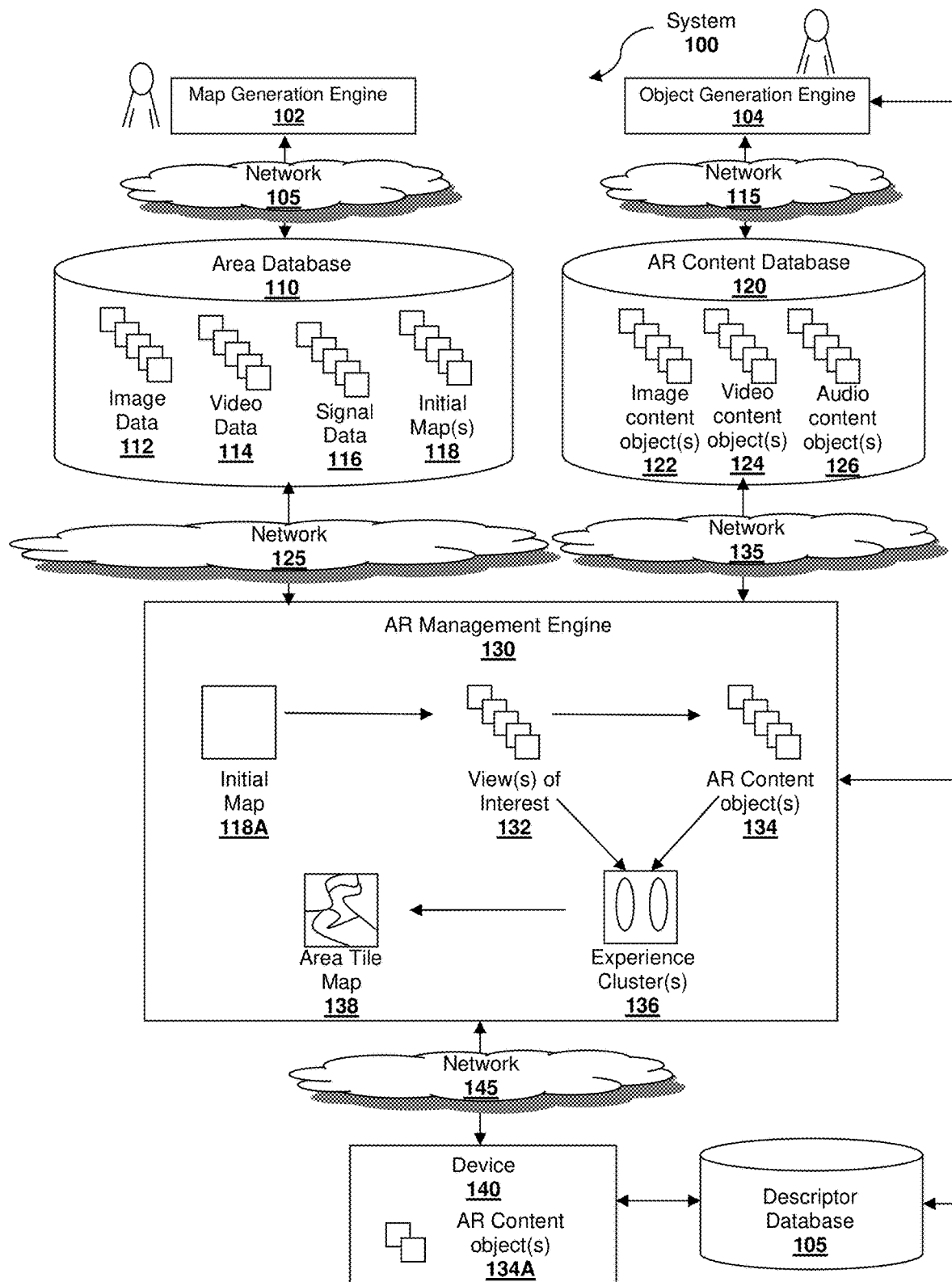
FIG. 1 is a schematic of a system of the inventive subject matter.

It should be noted that while the following description is drawn to a computer/server based device interaction system, various alternative configurations are also deemed suitable and may employ various computing devices including servers, workstations, clients, peers, interfaces, systems, databases, agents, peers, engines, controllers, modules, or other types of computing devices operating individually or collectively. One should appreciate the use of such terms are deemed to represent computing devices comprising at least one processor configured or programmed to execute software instructions stored on a tangible, non-transitory computer readable storage medium (e.g., hard drive, FPGA, solid state drive, RAM, flash, ROM, memory, distributed memory, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

One should appreciate that the disclosed techniques provide many advantageous technical effects including providing augmented reality content to a user device based on a precise location of the user device relative to one or more tiles of a tessellated area associated with view(s) of interest.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A system of the inventive subject matter could advantageously identify a location of a device at or near a tile of a tessellated area of interest and auto-populate the device with pre-selected content objects based upon the identified location. Exemplary systems and methods for identifying a location of a user or device within or near a tile can be found in U.S. pre-grant publication number 2014/0011518 Valaee, et al, entitled "System, Method And Computer Program For Dynamic Generation Of A Radio Map" and U.S. pre-grant publication 2012/0149415, to Valaee, et al entitled "System, Method and Computer Program for Anonymous Localization."

Where the device is configured or programmed to capture image or other sensor data (e.g., orientation data, position data, etc.) that indicates that an object is viewable by a user of the device, the system can cause the device to instantiate some or all of the content objects based on an association between the viewable object(s) and the content object(s) (e.g., based on at least one of object recognition, orientation, location, etc.). The instantiated AR content object could be presented in any suitable manner, including for example, as an occlusion mask, behind one or more objects, behind an object and in front of a different object, or as a moving object across an object of interest.

FIG. 1 is a schematic of an exemplary system 100 of the inventive subject matter. System 100 comprises a map generation engine 102, which can be leveraged by one or more users to capture, generate, or otherwise obtain area data related to an area of interest. Among other suitable data, area data could comprise image data 112 (e.g., still image data, real-time image data, etc.), video data 114, signal data 116 (e.g., CSS data, RSS data, WiFi signal data, beacon signal data, etc.), and/or initial maps 118 that could be transmitted to and stored in area database 110 via network 105. AR management engine 130, coupled with area database 110 via network 125, can be configured to obtain an initial map 118A related to an area of interest from area database 110, or could be configured to obtain other area data and generate initial map 118A based on the obtained data.

An area of interest can be considered generally to be a real-world space, area or setting selected within which the processes and functions of the inventive subject matter will be carried out. The area of interest can be an a priori, user-defined area or an ad-hoc area generated by the system.

For a priori defined areas, an area of interest can correspond to existing, predefined boundaries that can be physical (e.g., the physical boundaries of a road or a beachfront up to the water, the structural boundaries of a building, etc.), non-physical (e.g., a geographical boundary, geo-political boundary (e.g., a country border, an embassy's territory, etc.), geofence, territorial boundary (e.g. real-estate property boundaries, etc.), jurisdictional boundary (city, state, town, county, etc.), or other boundary defined by limits or borders not constrained to a physical demarcation) or a combination of both (e.g., a section of a room inside a building defined by some of the walls in the room and also a user-defined boundary bisecting the room, a subway station platform area defined by user-set boundaries and the subway tracks, a park's boundaries having state-defined boundaries over land on some of the sides and a natural boundary such as a river on the remaining side, a landmark whose boundaries are defined by the structural borders of the landmark itself on some sides and by surrounding gardens or walkways on remaining sides, etc.). Thus, it is contemplated that areas of interest can be as large as a state, city, county, town, national park, etc., or as small as a section of a room inside a building or house.

In embodiments, a user can set an area of interest by selecting a pre-existing area from a map, blueprint, etc. For example, selecting a landmark as the area of interest would incorporate the boundaries of the landmark as denoted on a map. Likewise, selecting a floor of a building as the area of interest would include the floor as denoted in the official floor plan or blueprints for the building. The user can also set an area of interest by manually setting and/or adjusting the desired boundaries of the area of interest on a graphical user interface. In one example, the user can select a point or coordinate on a rendered digital map and extend the area of interest radially outward from the point. In another example, the user could denote the area of interest on a map, blueprint, floor plan, etc., by manually drawing the line segments corresponding to the boundary or as a bounding box. A user can access map generation engine 102 via a user interface that allows the user to manually generate, via the graphical user interface, and/or adjust the area of interest. Suitable user interfaces include computing devices (e.g., smartphones, tablets, desktop computers, servers, laptop computers, gaming consoles, thin clients, fat clients, etc.) communicatively coupled to the map generation engine 102 and other system components. These user interfaces can include user input devices such a keyboard, mouse, stylus, touchscreen, microphone, etc. to input data into the user interface and output devices such as screens, audio output, sensory feedback devices, etc. to present output data to the user.

Contemplated areas of interest include all suitable interior and outdoor settings. Examples of indoor settings can include a casino, an office space, a retail space, an arena, a school, an indoor shopping center, a department store, a healthcare facility, a library, a home, a castle, a building, a temporary shelter, a tent, an airport terminal, a submarine, or any other interior setting. Examples of outdoor settings can include a stadium, a park, a wilderness area, an arena, a road, a field, a route, a highway, a garden, a zoo, an amusement park, the outside of an airport, the outside of a cruise-ship, a sightseeing tour, a rooftop or any other outdoor setting.

In embodiments, the map generation engine 102 of system 100 can generate an ad-hoc area of interest based on a number of devices detected in a particular area at a particular time. To do so, the map generation engine 102 can receive position data corresponding to a plurality of user devices, via clustering or other statistical algorithms, determine that a threshold number of devices are within a certain distance of one another and/or within or passing through a monitored space or point within a designated area (e.g., a train platform, a point in an airport terminal hallway, etc.). If the threshold is met, the map generation engine 102 can then generate the area of interest such that the area encompasses the cluster and, optionally, an additional distance from the cluster. In a variation of these embodiments, the ad-hoc area of interest can be an a priori area of interest modified according to the number of devices present as well as other factors such as modifications to the real-world area or structure, modifications to traffic patterns, etc. For example, for a train platform corresponding to an a priori defined area of interest, the map generation engine 102 can be programmed to modify the boundaries of the defined area of interest based on the length of the next train (since people are not going to gather around to enter cars beyond the last car in a particular train). One should appreciate that although the area of interest corresponds to a physical location, within the disclosed system the area of interest comprises a data structure that includes attributes and values that digitally describe the area of interest. Thus, the area of interest can be considered a digital model or object of the area of interest in a form processable by the disclosed computing devices.

One should appreciate that where area data obtained of different modalities are available, especially where there is a vast amount of area data available, a system of the inventive subject matter could operate with an increased level of accuracy (e.g., accuracy with respect to map dimensions, point of view origins, field of views, views, objects within a view of interest, locations, measurements of six degrees of freedom, etc.). Thus, and viewed from another perspective, the AR management engine 130 could be configured to obtain or otherwise utilize area data comprising different modalities and different views of every portion of the area of interest. This data could be used to obtain an initial map having increased accuracy, and to generate a tile map having increased accuracy such that a user's device could be configured to obtain AR content objects 134 and instantiate those objects at the precise moment (e.g., precise location, precise positioning of the device, etc.) they are intended to be presented.

AR content objects 134 can be data objects including content that is to be presented via a suitable computing device (e.g., smartphone, AR goggles, tablet, etc.) to generate an augmented-reality or mixed-reality environment. This can involve overlaying the content on real-world imagery (preferably in real-time) via the computing device, such that the user of the computing device sees a combination of the real-world imagery with the AR content seamlessly. Contemplated AR content objects can include a virtual object, chroma key content, digital image, digital video, audio data, application, script, promotion, advertisements, games, workflows, kinesthetic, tactile, lesson plan, etc. AR content objects can include graphic sprites and animations, can range from an HTML window and anything contained therein to 3D sprites rendered either in scripted animation or for an interactive game experience. Rendered sprites can be made to appear to interact with the physical elements of the space whose geometry has been reconstructed either in advance, or in real-time in the background of the AR experience.

In some embodiments, AR content objects 134 could be instantiated based on object recognition and motion estimation within an area or interest or movement to or from areas of interest. In such embodiments, it is contemplated that the device configured to obtain AR content objects 134 could comprise at least a camera and a gyroscope. Suitable techniques for image recognition can be found in, among other things, co-owned U.S. Pat. Nos. 7,016,532, 8,224,077, 8,224,078, and 8,218,873, each of which are incorporated by reference herein. Suitable techniques for motion estimation can be found in, among other things, "3-D Motion Estimation and Online Temporal Calibration For Camera-IMU Systems" by Li, Mingyang, et al; "Method For Motion Estimation With A Rolling-Shutter Camera" by Mourikis, Anastasios, et al; and "Method For Processing Feature Measurements In Vision-Aided Inertial Navigation" by Mourikis, Anastasios; each published by the Department of Electrical Engineering, University of California, Riverside and all of which are incorporated by reference in their entirety.

One should also appreciate that there could be a hierarchy of modalities with respect to precision and error tracking, and that this hierarchy could be determined by one or more users, or by the system. Thus, a system manager recognizing that one modality is more reliable than others could cause the map generation engine to prioritize data according to their modality where there is a conflict. For example, audio data in area database 110 could describe a layout of a record store (e.g., distances, signs, merchandise, etc.), while video data in area database 110 could include footage of the record store that conflicts with the audio data. It is contemplated that the audio data could be prioritized over the video data (e.g., based on a time the data was captured, etc.), or that the video data could be prioritized over the audio data (e.g., based on a general increased level of reliability against human error, etc.). The initial map or other map could be generated based on both of the audio and video data, except that the audio data, for example, could be ignored to the extent that it conflicts with the video data.

One possible technology that could be utilized by a system of the inventive subject matter is fingerprint-based techniques using an existing infrastructure. For example, as a user navigates an area of interest with a device having one or more sensors, the device could identify access points throughout various portions of the area, and determine available networks (e.g., wireless networks, etc.), a received or detected signal strength (e.g., WiFi signal, cellular network signal, etc.) at a particular time, or to obtain information related to what a user could observe, hear or otherwise experience in the portions at various times.

It is also contemplated that a series of initial maps could be generated for an area of interest, wherein the initial maps use different portions of the available area data. In such embodiments, the initial map that is obtained by a given AR management engine 130 could be determined based on the sensor(s) being used by the device configured to obtain and instantiate AR content objects. For example, where a user of a record store specific application is navigating the record store using a mobile phone capturing voice inputs of the user, it is contemplated that the initial map obtained by the AR management engine is one generated using more audio data relative to other initial maps of the area. As another example, where the user is navigating the record store using a mobile phone capturing video or image inputs captured by the user, it is contemplated that the initial map obtained by the AR management engine is one generated using less audio data relative to other initial maps of the area.

Initial map 118 can comprise a CAD drawing, a digital blueprint, a three-dimensional digital model, a two-dimensional digital model or any other suitable digital representation of a layout of an area of interest. In some embodiments, the initial map 118 could comprise a digital or virtual construct in memory that is generated by the map generation engine 102 of system 100, by combining some or all of the image data, video data, signal data, orientation data, existing map data (e.g., a directory map of a shopping center already operating, etc.) and other data.

Figure 2:
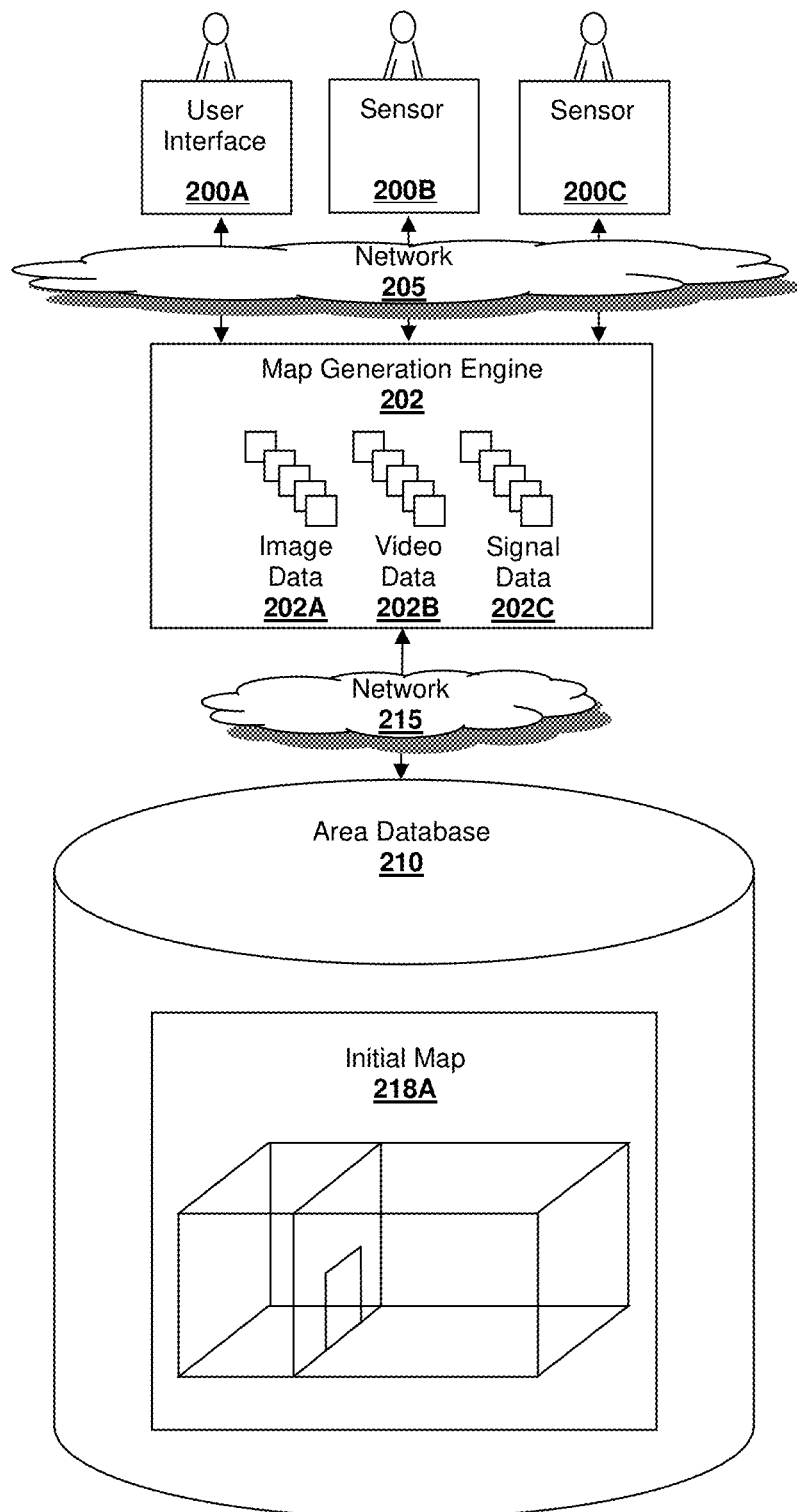
FIG. 2 is a schematic showing a generation of an initial map of an area of interest.

FIG. 2 is a schematic showing a generation of an initial map 118 of an area of interest. As mentioned above, an initial map 118 of an area can comprise a digital or virtual construct, and can be generated via map generation engine 102. In the example shown, map generation engine 202 (corresponding to map generation engine 102 of FIG. 1) is coupled with user interface 200A, sensor 200B (i.e., device comprising a sensor), and sensor 200C via network 205, and configured to generate an initial map based on data (e.g., image data 200A, video data 202B, signal data 202C, etc.) acquired from one or more of user interface 200A, and sensors 200B and 200C.

User interface 200A could be used by one or more users to transmit data related to an area of interest to map generation engine 202. The following use case provides an example of how various users could cause area data to be transmitted to map generation engine 202. Abigail, Bryan and Catherine have each posted various images and videos of the Los Angeles Airport (LAX) on various social networking websites (e.g., Facebook®, MySpace®, Twitter®, Bebo®, Tagged®, Flixster®, Netlog®, etc.). Abigail, visiting from Australia, posted several videos on her Twitter® page arriving and departing from the Tom Bradley International Terminal of LAX. Bryan, visiting New Mexico, posted several images on Facebook® taken from Terminal 1 of LAX. Catherine, picking Bryan up from the airport, posted a video captured while she circled LAX waiting for Bryan to arrive, as well as several photographs taken with Bryan in the parking structure of LAX. David, a system manager responsible for creating a mobile app targeting LAX visitors, obtains the images and videos from Abigail, Bryan and Catherine's profiles, and transmits them to map generation engine 202 via user interface 200A. It should also be appreciated that map generation engine 202 could be coupled with various social networking websites or other sources and automatically obtain area data from those sources, for example, using an Internet bot.

David has also set up various devices throughout LAX having sensors (e.g., 200B and 200C) that captured image data and video data throughout LAX, as well as activity information to determine, or allow a determination of areas having high, medium or low traffic. Area data is transmitted from these devices to map generation engine 202 via network 205. Once the map generation engine 202 receives adequate data, it is contemplated that an initial map 218 of LAX could be generated. The initial map 218 could be generated manually (e.g., a user could utilize the area data to create the initial map, etc.), or by the map generation module 202 itself. For example, the map generation engine 202 can comprise a data compiling module that sorts the area data into groupings (e.g., based on location, based on popularity, etc.), and a mapping module that uses the sorted area data to automatically generate an initial map 218. In some embodiments, it is contemplated that the initial map could provide information not only related to a layout, but also to traffic, popularity, time, or other characteristic related to behavior. Once the initial map is finalized, the map generation engine 202 could transmit the initial map 218 to area database 210 for storage via network 215.

In another example, the sensors (e.g, sensors 200B, 200C) can be placed on a drone or remote-controlled robot that can be programmed to travel within the area of interest to gather the data, and transmit it to map generation engine 202.

To generate the initial map 218, the mapping module of map generation engine 202 can employ a "structure from motion" module capable of generating a 3D map of the geometry depicted in images and thus construct a 3D model of the area of interest. To create a 2D blueprint or floor plan, the map generation engine 202 can "flatten" the constructed 3D model.

During the flattening, the map generation engine 202 can label certain geometric features of interest within the 3D model (e.g., doors, windows, multi-level spaces or structures, overpasses and/or underpasses in a building, etc.) via classifiers trained offline in advance of the flattening process. These classifiers can be mapped to corresponding geometric features of interest via a recognition of these features in the 3D model and/or the image data used to generate the 3D model using image recognition techniques.

Examples of suitable "structure from motion" and other techniques usable in generating the initial map (and/or gathering the data to be used in the generation of the initial map) can include those discussed in U.S. pre-grant publication number 2013/0265387 to Jin, entitled "Opt-Keyframe Reconstruction From Robust Video-Based Structure From Motion" and published Oct. 10, 2013; U.S. pre-grant publication number 2014/0184749 to Hilliges, et al, entitled "Using Photometric Stereo For 3D Environment Modeling" and published Jul. 3, 2014; U.S. pre-grant publication number 2012/0229607 to Baker, et al, entitled "Systems and Methods for Persistent Surveillance And Large Volume Data Streaming" and published Sep. 13, 2012; all of which are incorporated herein by reference in their entirety.

In embodiments, the initial map 218 can be generated using depth sensing, perhaps through LiDAR techniques combined with image recognition techniques. Suitable LiDAR techniques include those employed by the Zebedee indoor mapper developed by CSIRO and GeoSLAM. Depth sensing can also be achieved through image-based analysis such as those disclosed in U.S. pre-grant publication number 2012/0163672 to McKinnon, entitled "Depth Estimate Determination, System and Methods" and published Jun. 28, 2012, which is incorporated by reference in its entirety, as well as the references discussed above.

These techniques allow for the generation of initial map 118 based on data gathered from a single pass through of the area of interest, such as the aforementioned drone or remote-controlled robot or drone.

In embodiments, it is contemplated that an initial map 118 can be generated or modified manually via a user interface. For example, one or more users can view a plurality of images showing different portions of an area of interest and manually create a CAD drawing based upon the various images. As another example, it is contemplated that one or more users could utilize software that associates different images and generates area maps using portions of some or all of the images and possibly other sensor data (e.g., audio, notes, etc.).

Based on an applicable initial map 118A (applicable to a selected area of interest) and optional ancillary area data (e.g., image, video, audio, sensor, signal or other data, etc.), the AR management engine 130 can derive a set of views of interest 132 related to the area of interest.

A view of interest 132 is a digital representation of a physical location in real-world space that is to be enabled with AR content. Thus, the view of interest 132 can be considered to be a view or perspective of a view representative of where users would, should, or could be looking while navigating through various portions of the area of interest, for the presentation of AR content.

A view of interest 132 can comprise one or more individual views within an area of interest, from a set of defined perspectives (e.g., from areas near defined points of origin and/or area with a tile, as discussed in further detail below) within the area of interest. The view of interest 132 can include a set of contiguous views within the area of interest, or a set of discontiguous views. Thus, for example, a view of interest 132 in an area of interest can include a view of a section of the area of interest that is in front of a user (and thus, visible to the user at that particular point in time), and another view that is behind the user, across from the first view (and thus, only visible to the user when the user turns around).

The view of interest 132 can be a data construct that typically includes, among other things, one or more point of view origins, at least one field(s) of interest leading to a view, objects of interest within a view, and descriptors associated with objects of interest. The view of interest 132 can also include data associated with one or more of an owner, metadata, a direction (e.g., a vector, an angle, etc.), an orientation (e.g., pitch, yaw, roll, etc.), a cost, a search attribute, or any combination or multiples thereof.

Figure 3:
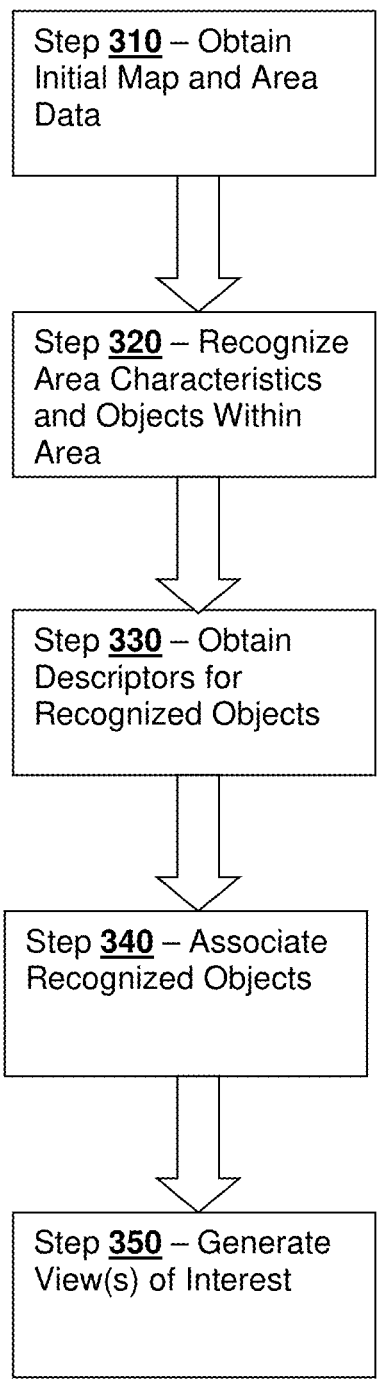
FIG. 3 provides an example overview of the derivation of views of interest.

In embodiments, views of interest 132 within an area of interest can be selected and derived entirely by AR management engine 130. FIG. 3 is an illustrative example of an exemplary process of these embodiments.

At step 310, the AR management engine 130 obtains the initial map 118A and area data associated with the area of interest. As described above, this area data can be image data, video data, audio data, sensor data, signal data, and any other data associated with the area of interest.

At step 320, the AR management engine 130 can employ one or more data analysis and recognition techniques on the area data to assess the characteristics of the area of interest environment and recognize objects in the area of interest environment, as appropriate for the modalities of the area data.

For example, for image or video data, the AR management engine 130 can employ image recognition techniques, such as those mentioned herein, to recognize and identify real-world objects within the area of interest.

For audio data (either audio-only, or accompanying video data), the AR management engine 130 can employ audio recognition and analysis techniques to identify the acoustic characteristics of the environment, locations of sources of sound (e.g., locations of speakers or other audio output devices, sources of environmental noise, etc.), and/or identification of audio (e.g., for music, identify songs, genres, etc.; for sounds, identify the type of sounds, the source producing the sound, etc.).

Sensor data can include temperature sensor data, air pressure sensor data, light sensor data, location-sensor data (e.g., GPS or other location- or position-determination system data), anemometer data, olfactometer data, etc. Correspondingly, the AR management engine 130 can determine the temperature, air flow characteristics, lighting characteristics, smell characteristics and other environmental characteristics for various locations within the area of interest.

Signal data can correspond to data within and also about signals from routers, signals from cellular transmitters, signals from computing devices (e.g., desktop computers, laptop computers, smartphones, tablets, gaming consoles, remote controls, etc.), broadcast signals (e.g., over-the-air television or radio broadcasts), near-field communication devices, or other emitters of wireless data carrier signals. Types of signals can include WiFi signals, cellular signals, mobile hotspot signals, infrared signals, Bluetooth® signals, NFC signals, ultrasound signals, RFID signals, or any other detectable data carrier signal. The signal data itself can include information such as identification of emitting device, identification of standard(s)/protocol(s), network location information (IP address, etc.), physical location information of emitter, etc. The AR management engine 130 can analyze the signal data (corresponding to the signals themselves and/or the information carried by the signal) to determine the location(s) of various signal emitters with the area of interest, the signal strength of the various signals within the various parts of the area of interest, potential sources of interference, relatively strong/weak areas of various signals, data transmission speeds, etc.

The recognized objects and characteristics of the environment can be associated with particular locations within the area of interest by correlating the area data with the initial map 118A based on one or more of the location information (e.g., GPS or other location-sensor information) and location information associated with image data (e.g., depth map information or other information indicative of depth in image).

At step 330, the AR management engine 130 can obtain descriptors for the recognized objects within the area of interest. The descriptors can be SIFT descriptors, FAST descriptors, BRISK descriptors, FREAK descriptors, SURF descriptors, GLOH descriptors, HOG descriptors, LESH descriptors, etc. In embodiments, the AR management engine 130 can obtain the descriptors from a descriptor database corresponding to various objects capable of being recognized. In embodiments, the AR management engine 130 can derive the descriptors itself, according to known techniques.

At step 340, the AR management engine 130 can associate at least some of the recognized objects within the area of interest with AR content types or categories. These recognized objects can be considered to be potential "attachment points" for AR content. These attachment points can be identified as potential objects to which AR content objects can be associated within the area of interest to varying levels of specificity or granularity. In other words, the "type" of AR content object identified as applicable to the attachment point can be of a variety of levels of generality or granularity. Certain attachment points can be theme- or topic-independent, merely identified as suitable object to which content can be attached or associated. Examples of these types of attachment points can be recognized billboards, large sections of wall, plants, floor patterns, signage, logos, structural supports, etc. Other attachment points can be topic- or theme-specific to various levels of specificity. For example, if a car is recognized within the area of interest, the AR management engine 130 is programmed to associate the recognized "car" to AR content object categories associated with cars. However, the "car" category can have further subcategories of "sports car", "SUV", "luxury car", etc. Thus, the "car" can be associated with AR content object(s) from one or more applicable sub-categories. In embodiments, the association of step 340 can be based on the descriptors obtained in step 330. In embodiments, the descriptors of step 330 can correspond to categories of recognized objects on their own, and thus steps 330 and 340 are effectively merged into a single step.

In embodiments, the associations made by the AR management engine 130 can be based on the categorization of the recognized object according to the recognition technique employed.

In embodiments, the associations can be a pre-set association set by system administrators. Thus, the associations can be such that when a "car" is recognized, the AR management engine 130 associates the "car" with AR content objects of the "car" type. This can include associating the recognized "car" only with "car"-type AR content objects, thus ignoring other potential AR content objects that would otherwise be similarly associated with the car.

At step 350, the AR management engine 130 generates the one or more views of interest 132 for the area of interest based on the initial map 118A and the area data. To determine what part of the area of interest (reflected in the initial map 118A) will constitute a view of interest 132, the AR management engine 130 analyzes the distribution (e.g., density, layout, etc.) of recognized or recognizable objects within the initial map 118A, including the recognized objects from the perspective of possible point of view origins. The analysis can correspond to a cluster analysis of recognized objects within a particular spatial relationship of one another, and also to possible point-of-view origins. The point-of-view origins correspond to various points within the area of interest from which a user will view a view of interest 132 or part of a view of interest 132. Thus, the location, size and shape of a view of interest can be determined based on having a certain amount (minimum or maximum) of recognized objects within the view of interest, a certain density of recognized objects, a certain layout, etc. For example, the system could assign a point in space for each recognizable object. The point in space might be the centroid of all the image descriptors associated with the recognized object as represented in 3-space. The system can then use clusters of centroids to measure density. In embodiments, the point-of-view origin can correspond to the point of origin of the area data such as image keyframe data was captured during the initial map-making process.

In embodiments, the views of interest 132 can be based on area data of one or more modalities of the area data as applied to the initial map 118A. For example, candidate views of interest 132 for an area of interest can be limited to those sections of the area that were captured by visual data (i.e., image or video data). In further embodiments, candidate views of interest can be based on one or more of the area data as applied to initial map 118A and modified by additional area data. For example, a candidate view of interest 132 for an area can be initially defined by image or video data gathered (that directly show potential views of interest 132 captured visually), which can be expanded or constricted or even eliminated as a candidate based on sound, temperature or other sensor data. In this example, sound data could indicate that there is consistent background audio noise in the particular section of the area of interest being considered, thus being a less desirable candidate for certain AR content objects having audio and also indicative of the fact that people passing through might move quickly and be less inclined to stop and consume presented content.

Based on the initial map 118A as well as the area data, the AR management engine 130 can determine potential fields of interest for each view of interest 132. A field of interest can be considered to be the perspective or field of view that leads to a view of a part of or all of a view of interest 132. In other words, the field of interest can be considered to be a potential field of view of a user (i.e., the user's visible area as seen through a display device on a smartphone or other computing device that displays a live video feed, via AR goggles or glasses, etc.) that would cause the user to see a particular view within a larger view of interest 132 at any given time. Thus, if a view of interest 132 includes a section of the area of interest in front of the user as well as behind the user, the view of interest 132 is considered to have at least two fields of interest—one that captures the view of interest 132 portion in front of the user (which would be considered a first view within view of interest 132), and another that corresponds to the field of view of the portion of the view of interest 132 behind the user, requiring the user to turn around to see it (which would be considered a second view within view of interest 132). Additionally, the fields of interest can account for obstructions and other obstacles that would interfere with the user's view of some or all of a view of interest 132.

It should be appreciated that the area data gathered to generate views of interest 132 could be derived in any commercially suitable manner (e.g., crowd sourced using ambient collection, GoPro® or other suitable technologies, using available image, video or other data, customized through paid-for data, automated drones, etc.). The following use case illustrates one method in which view(s) of interest could be derived in a customized manner. A system manager hires various shoppers (Martin, Nick, Mei and Bob) at The Grove® shopping mall to videotape their shopping experience. Each shopper is to wear a video capturing device (e.g., attached to the shopper's hat, shirt, etc.) while they go about their usual shopping experience. In some embodiments the shoppers could be selected based on a similarity in interests or other characteristics (e.g., age, gender, income, demographic, psychographic, employment, sexual orientation, etc.). This could be advantageous where a system wishes to cater to a selected group of people (e.g., high school kids from affluent neighborhoods, etc.) In this example, Martin, Nick, Mei and Bob are selected because of the dissimilarity in interests, age and gender. This could be advantageous where a system wishes to cater to a wide range of people regardless of their interests.

Martin and Nick each wear their video cameras on their hat as they navigate The Grove® together. Because their interests are widely varied, the field of views and objects that are captured from the same or substantially similar point of view origin could be very different. For example, while Martin and Nick could each be standing two feet apart from each other next to the fountain at the Grove®, Martin could be capturing video data including the sky and the movie theatre, while Nick could be capturing video data including the Nordstrom®, the Farm® restaurant, and Crate and Barrel®. Meanwhile, Bob could be sitting at the Coffee Bean® capturing video data including various portions of the farmer's market neighboring the Grove®, while Mei could be inside The Children's Place® shopping for her kids and capturing video data including various portions of the store.

Based on the initial map 118A and the video data captured by Martin, Nick, Bob and Mei, the AR management engine 130 could derive a set of views of interest 132. It is contemplated that some or all of the view of interest information could be derived by the AR management engine 130. Alternatively or additionally, some or all of the view of interest information could be derived elsewhere and obtained by the AR management engine 130 (e.g., descriptor information, etc.).

While the above example focuses on obtaining views of interest 132 from specifically selected individuals, it should be appreciated that views of interest 132 could be obtained using any suitable method. For example, images could be taken from one or more specifically adapted vehicles, robots or other devices and stitched together to produce a segmented panorama or high resolution image. Each device could be configured to obtain image data from various angles at different heights. Additionally or alternatively, the devices could include 3G, 4G, GSM, WiFi or other antennas for scanning 3G, 4G, GSM, WiFi or other signals and hotspots. As another example, the system could leverage asset tracking (e.g., RFIDs, etc.) or crowd sourcing technologies to obtain area data from users who do not have a specific goal of providing area data for purposes of generating initial and tessellated maps.

In embodiments, views of interest 132 can be selected by human users (e.g., a system administrator, advertiser, merchant, etc.) for derivation by the AR management engine 130. In these embodiments, the area data (such as the image data corresponding to the views) can be presented to users from which the human user(s) can select a corresponding view of interest 132. For example, an advertiser can be shown image data of various sections of the area of interest. From these images, the advertiser can select one or more images showing a particular section of the area of interest that the advertiser wishes to use to present advertisements to users. The AR management engine 130 can then generate the view of interest 132 corresponding to the selected section based on the initial map 118A and the area data associated with the selected section of the area of interest.

System 100 can also comprise an object generation engine 104, which could obtain a plurality of content objects (e.g., image content objects 122, video content objects 124, audio content objects 126, etc.) from one or more users or devices, and transmit the objects to AR content database 120 via network 115. For example, a system manager could upload AR content obtained from various advertisers who wish to advertise a good or service to people visiting or residing in an area of interest (such as a shopping mall). The system manager could also include ancillary information such as advertiser preferences, costs, fees, priority or any other suitable information. The AR content objects and the ancillary information could be stored in the database, and could be associated with various descriptors (e.g., SIFT, FAST, BRISK, FREAK, SURF, GLOH, HOG, LESH, TILT, etc.) stored in database 105 by one or both of the object generation engine 104 or the AR management engine 130.

Once the views of interest 132 have been derived, and AR content objects have been generated, AR management engine 130 could obtain a set of AR content objects 134 (e.g., from the AR content database 120 via network 135) related to the derived set of views of interest 132. It should be appreciated that the set of AR content objects 134 could be obtained in any suitable manner, including for example, based on a search query of AR content database 120 (e.g., a search for AR content objects 134 in database 120 that are associated with one or more descriptors that are associated with one or more views of interest 132, etc.), based on a characteristic of the initial map 118A (e.g., dimensions, layout, an indication of the type of area, etc.), based on a user selection, recommendation or request (e.g., by an advertiser, merchant, etc.), or based on a context of an intended use of a user (e.g., based on what activities a user wishes to capture (e.g., shopping, educational, sightseeing, directing, traveling, gaming, etc.).

As a function of at least one of the AR content objects 134 and the set of views of interest 132, AR management engine 130 establishes AR experience clusters 136 within initial map 118A or as a new map.

For example, AR experience clusters 136 can be established to include one or more point of view origins from which objects of interest could be viewed based on a density of AR content objects 134 associated with the point of view origins of the various views of interest 132. Viewed from another perspective, each experience cluster 136 can include point of view origins such that the point of view origin(s) in each cluster correspond to a substantially equal percentage (e.g., deviations of ≤5%, ≤3%, ≤1%, etc. from each of the other clusters) of the total AR content objects 134. As another example, each experience cluster could include point of view origins such that the point of view origin(s) in each cluster correspond to a substantially equal percentage (e.g., deviations of ≤5%, ≤3%, ≤1%, etc. from each of the other clusters) of at least one of the following: video content objects 124, image content objects 122, and audio content objects 126. As yet another example, one or more of the experience clusters could include point of view origin(s) that are associated with only a few AR content objects (e.g., less than 10, less than 5, less than 3, 1, etc.), for example where an advertiser has paid a premium to obtain the exclusivity, whereas the remaining experience clusters could include point of view origins that are associated with more AR content objects 134 (e.g., at least 50% more, at least 100% more, at least 200% more, at least 300% more, at least 400% more, at least 500% more, etc.). One should appreciate that a cluster could be established based on any suitable parameter(s), which could be established manually by one or more users, or automatically by a system of the inventive subject matter.

It should be appreciated that, for point of view origins of various distances, a same section of the area of interest can have multiple views of interest 132 and/or multiple experience clusters 136. For example, an area of interest has a wall with a number of advertisement poster objects that have been recognized and potentially can be linked to AR content objects. As a user gets closer to the wall, there will be less posters appearing in the user's field of view. Conversely, as the user gets farther away from the wall, there will be more posters appearing within the user's field of view. In this example, multiple view of interest 132 can be derived to account for the differences in the amount of potential recognized attachment points (the recognized poster objects) at different view point-of-origin distances.

Based on the established AR experience clusters 136, the AR management engine 130 could generate an area tile map 138 of the area of interest. The tile map 138 could comprise a plurality of tessellated tiles covering the area of interest or portion(s) thereof. Depending on the parameters used to establish the AR experience clusters 136, the area tile map 138 could comprise a regular tessellation, a semi-regular tessellation, an aperiodic tessellation, a Voronoi tessellation, a Penrose tessellation, or any other suitable tessellation. The concepts of establishing experience clusters and generating tile maps are discussed in further detail below with FIGS. 5 and 6.

The AR management engine 130 in some embodiments could be coupled with a device 140 (e.g., cell phone, tablet, kiosk, laptop computer, watch, vehicle, etc.) via network 145, and configure the device to obtain at least a portion of the subset of the AR content objects depending on at least one of the following: the location of the device within an area of interest (e.g., within a location represented within a tile of area tile map 138, etc.), and the objects viewable by the device or a user of the device. For example, it is contemplated that an area tile map 138 could comprise a first tile that is representative of portions of the area map corresponding to point of view origins located next to the fountain and next to Crate and Barrel® at the Grove®. The area tile map 138 could also comprise a second tile bordering a portion of the first tile, which is representative of portions of the area map corresponding to point of view origins located next to the Coffee Bean® and next to the Children's Place® at the Grove®. As a user carrying device 140 comes closer to the portion of the Grove® represented by first tile of the map from a portion represented by the second tile of the map, the user device 140 can be auto-populated with a subset of AR content objects 134A associated with the first tile map. When the user walks to or near a point of view origin and captures image data related to an object of interest within a view of interest, system 100 could associate the object of interest with one or more of the subset 134A (e.g., based on a descriptor or other identification, etc.) and instantiate them for presentation to the user.

Figure 4:
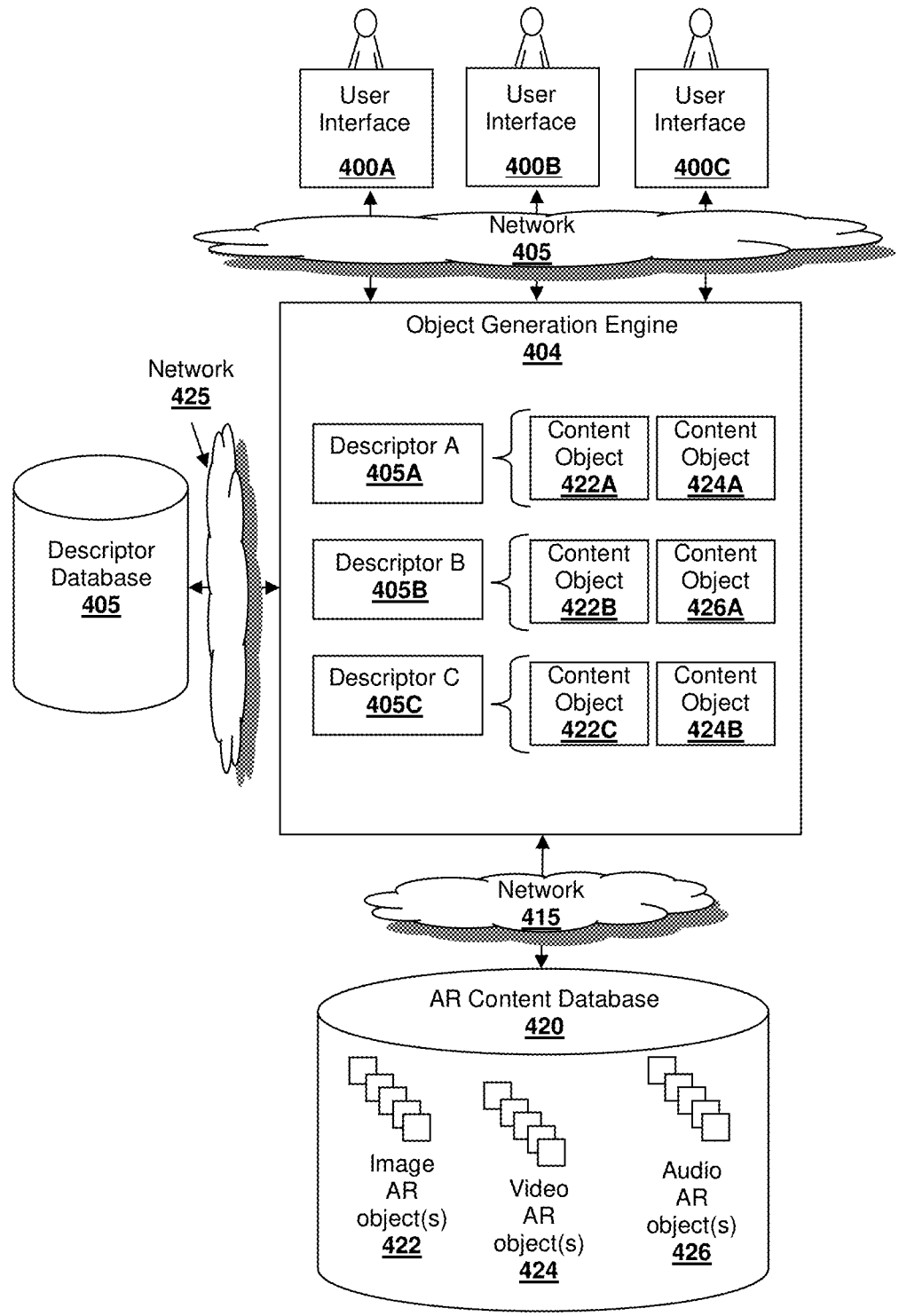
FIG. 4 is a schematic showing a generation of an AR content database.

FIG. 4 is a schematic showing the generation of an AR content database 420. Object generation engine 404 is coupled with descriptor database 405, AR content database 420, and user interfaces 400A, 400B, and 400C via networks 425, 415 and 405, respectively. The following use case provides an example of how AR content objects can be associated with one or more descriptors related to objects viewable from an area of interest, and stored in an AR content database 420 for use by an AR management engine of the inventive subject matter.

In the example shown in FIG. 4, descriptor database 405 comprises information related to various objects viewable from within the Aria® Hotel and Casino in Las Vegas (the area of interest). Descriptor database 405 could comprise, among other things, object image data, descriptors associated with the image data, and information relating to the device capturing the object image data (e.g., translation data (heaving, swaying, surging), rotation data (e.g., pitching, yawing, rolling), distance, clarity, brightness, location, etc.). While this example is generally related to associating a descriptor with an object generally (without consideration for a specific portion of the object or the device capturing data related to the object, etc.), it should be appreciated that obtaining information related to the data capturing device at the time of capture could be valuable in providing an increased level of accuracy as an object captured from one position, view or angle could be associated with AR content objects that are different from the same object when captured from a different position, view or angle.

For example, descriptor database 405 could comprise descriptor set A (405A) including SIFT descriptors associated with an image of the host desk of the Aria® poker room, descriptor set B (405B) including SIFT descriptors associated with an image of the host desk of the Aria® buffet, and descriptor C (405C) including SIFT descriptors associated with an image of the Aria® concierge desk.

Alex, the general manager of Aria® could use user interface 400A to transmit content object 422C, content object 424A and content object 426A to object generation engine 404. Object 422A comprises an image of Phil Ivey playing Texas Hold'em in the Aria® poker room to generate interest in the poker room, object 424A comprises a video of a model getting a massage at the hotel to advertise the hotel amenities, and object 426A comprises an audio of the lunch menu to assist the visually impaired. Brandi, an advertising executive could use user interface 400B to transmit content object 422B to object generation engine 404. Content object 422B comprises an image of an advertisement for skydiving classes located right off the Las Vegas strip. Carina, a system manager responsible for creating a mobile app for Aria® visitors, could transmit content object 422C, an image of a map of the Aria® hotel, to object generation engine 404, and could also associate the various descriptors 405A, B and C with one or more content objects. In the example provided, Carina associates content objects 422A and 424A with descriptor 405A, content objects 422B and 426A with descriptor 405B, and content objects 422C and 424B with descriptor 405C. This association could be based on any suitable parameters as determined by one or more users or the object generation engine itself.

Object generation engine 404 could transmit the image AR content objects 422, video AR content objects 424, audio AR content objects 426, and optionally the associated descriptors to AR content database 420 via network 415.

In embodiments, suitable content objects AR content objects 422 can additionally be identified via the content types associated with the recognized objects at step 340. Thus, for a particular recognized object, the AR content objects 422 can be selected based on the descriptor of the object itself, as well as according to the categorization or other classification associated with the object.

Figure 5:
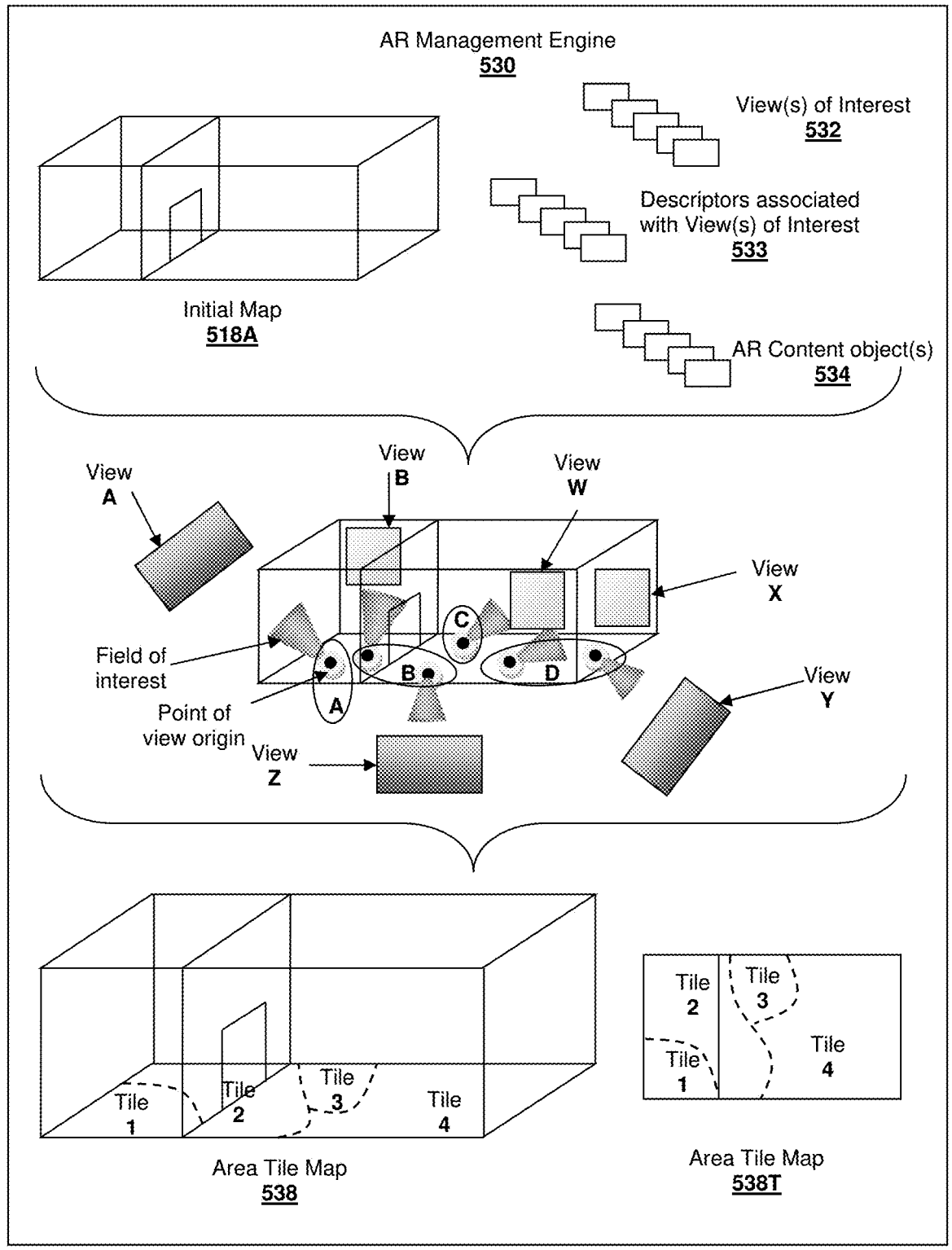
FIG. 5 is a schematic showing a generation of a tessellated area map.

FIG. 5 is a schematic of an AR management engine 530 generating area tile maps 538 and 538T. AR Management engine 530 comprises, among other things, an initial map 518A, view(s) of interest 532 (e.g., point of view origin data, field of interest data, etc.), descriptors associated with view(s) of interest 533, and AR content object(s) 534. Based on the aforementioned area data and optional other data (e.g., signal data, etc.), AR management engine 430 establishes AR experience clusters A, B, C and D within the initial map 518A as a function of the set of AR content objects 534 and the views of interest 532. In the example shown in FIG. 5, Cluster A comprises a first point of view origin (e.g., a coordinate) having a first field of interest leading to view A. View A could comprise various objects of interest to which descriptors could be associated. Continuing on the example from FIG. 4, the point of view origin associated with view A could comprise the Aria® poker room along with the Aria® poker room host desk to which descriptor 405A is associated. Thus, when a user uses a mobile device to scan view A (or portion thereof) from the related point of view, the user could be presented with content objects 422A and 424A described above.

Furthermore, Cluster B comprises the point of view origins having fields of interest leading to views B and Z; Cluster C comprises the point of view origin having the field of interest leading to view W; and Cluster D comprises the point of view origins having fields of interest leading to views X and Y. Each of clusters B, C and D could include point of view origin(s) having corresponding fields of interest and views including objects of interest. The establishing of clusters could be based on any suitable parameter(s), including for example, the number of objects of interests viewable from a point of view origin, field of view or view, a number of AR content objects associated with objects of interests within a view of interest, a file size of AR content objects of interest within a view of interest, a AR content object type (e.g., image, video, audio, etc.), a number of views of interests viewable from point of view origins within an area of interest, or any other suitable parameter(s). Moreover, any suitable algorithm(s) or method(s) of clustering can be utilized to establish experience clusters, including for example, centroid-based clustering (e.g., k-means clustering, etc.), hierarchical clustering, distribution-based clustering, density-based clustering, or any other suitable algorithms or methods.

Based at least in part on the AR experience clusters established above, area tile maps 438 and 538T (perspective view and top view) could be generated. The area tile maps could comprise a plurality of tessellated tiles covering at least some of the area of interest (e.g., a portion of the Aria® Hotel and Casino, etc.), and one or more of the tiles could be bound to a subset of the AR content objects 534. In the example of FIG. 4, the tessellation comprises an aperiodic tessellation, and is based at least in part on the density of AR content objects associated with each point of view origin. Viewed from another perspective, the number of different AR content objects that could be populated onto a user device and instantiated by a user device in each tile is substantially similar (i.e., within 25% (more preferably within 10%, within 8%, within 5%, within 3%, or within 1%) by number of AR content objects). For example, the point of view origin in Tile 1 is associated with 25 AR content objects, the point of view origins in Tile 2 are associated with 23 AR content objects (15 in view Z, 8 in view B), the point of view origin in Tile 3 is associated with 25 AR content objects, and the point of view origins in tile 4 are associated with 26 AR content objects (1 in view X, 25 in view Y).

It should also be appreciated that a tessellated map could have more than two dimensions of relevance (e.g., at least 3 dimensions, at least 5 dimensions, at least 10 dimensions, at least 25 or even more dimensions of relevance, etc.). Viewed from another perspective, the tessellation could be based not only on a spatial dimension, but could additionally or alternatively be based on a signal strength (e.g., RSS, CSS, WiFi signal strength, cellular signal strength, demographic, etc.) or any other suitable dimension(s).

One should appreciate that a cluster, a view of interest or any portion thereof (e.g., point of view origin, a field of interest, a view associated with a point of view origin, etc.) could be owned and managed by one or more entities. For example, Card Player® magazine could purchase or rent the view of interest comprising view A, and determine what AR content objects are associated with objects viewable from the point of view origin in Cluster A. Moreover, because Card Player® magazine would own and manage the point of view origin, the magazine could modify the field of interest and location or scope of view A if desired. For example, the field of interest could be dynamic in nature, and could include the Aria® poker room host desk during busy hours (e.g., where the room has reached 50%, 70% or even 90% or more of the allowed occupancy), but include a TV screen in the poker room during slow hours in place of the host desk. Thus, a user scanning the host desk during busy hours could be presented with AR content, while a user scanning the host desk during slow hours could be presented with no AR content (or different AR content). Similarly, a user scanning the TV screen during busy hours could be presented with no AR content, while a user scanning the TV screen during slow hours could be presented with AR content.

Figure 6:
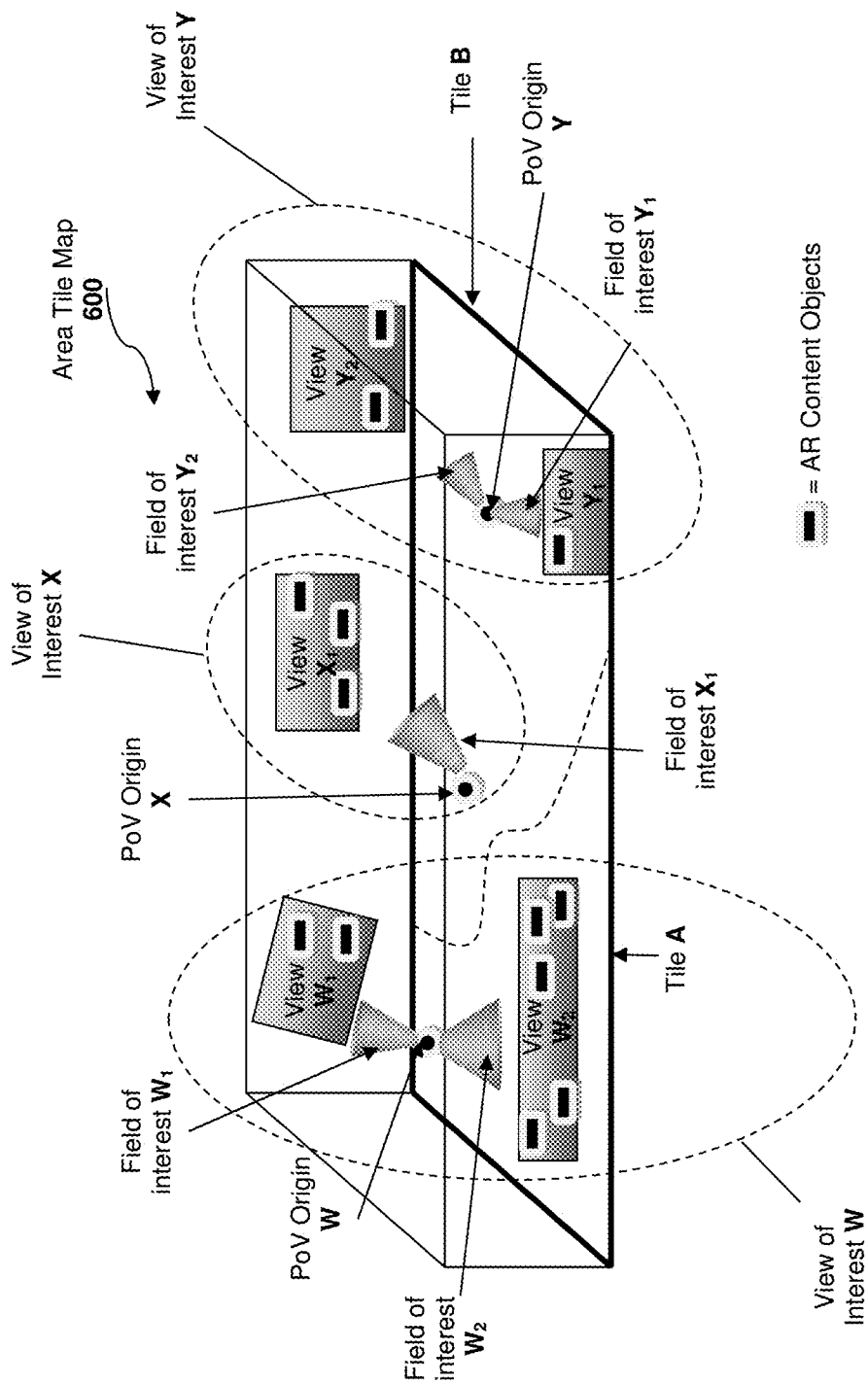
FIG. 6 is a schematic showing an area tile map based on view of interest clusters.

FIG. 6 is a schematic showing an area tile map 600 having been generated based on experience clusters. In the example shown, a portion of an area of interest is divided into tiles A and B, which were generated based on experience clusters established based on the number of AR content objects associated with each view of interest in the portion. View of interest W includes a point of view or view-point origin W having two fields of interest (fields of interest $W_1$ and $W_2$) facing two different views (views $W_1$ and $W_2$). Views $W_1$ and $W_2$ each include objects of interest tied to AR content objects (2 content objects and 5 content objects, respectively). View of interest Y includes a point of view origin X having a field of interest $X_1$ facing view $X_1$. View $X_1$ includes objects of interests tied to three AR content objects. View of interest Y includes a point of view or view-point origin Y having two fields of interest (fields of interest $Y_1$ and $Y_2$) facing two different views (views $Y_1$ and $Y_2$). Views $Y_1$ and $Y_2$ each include objects of interest tied to AR content objects (1 content objects and 2 content objects, respectively).

Based on the number of AR content objects tied to each point of view origin of views of interest, experience clusters are generated. Here, the first experience cluster includes point of view origin W, while the second includes point of view origins X and Y, such that the experience clusters of an area of interest (or portion thereof) include substantially the same density of AR content objects by number. Based on these clusters, Tile A is generated including point of view origin W, and Tile B is generated bordering at least a portion of Tile A and including point of view origins X and Y.

When a user navigating the real world area of interest gets close enough to a portion represented by Tile A (e.g., within 50 feet, within 25 feet, within 10 feet, within two feet, within one foot, etc. of any portion of tile A), it is contemplated that the user's device could be auto-populated with the 7 AR content objects bound to view of interest W. When the user scans view $W_1$ with a device having a sensor (e.g., camera, etc.), it is contemplated that a system of the inventive subject matter could utilize object recognition techniques to recognize objects of interest within view $W_1$ and instantiate one or more of the AR content objects associated with the objects of interest. Similarly, when the user scans view $W_2$, the system could recognize objects of interest within view $W_2$ and instantiate one or more of the AR content objects associated therewith. When the user navigates closer to Tile B, it is contemplated that the user device will be auto-populated with the AR content objects associated with that tile (e.g., associated with Views $W_1$, $W_1$, and $W_1$, etc.). Additionally or alternatively, it is contemplated that as the user navigates close to Tile B (or any other tile other than Tile A), or as the user navigates away from Tile A (e.g., within 50 feet, within 25 feet, within 10 feet, within two feet, within one foot, etc. of any portion of tile A), the populated AR content objects associated with Tile A could be deleted from the user device automatically or manually.

Viewed from another perspective, a user device in an area of interest could obtain and store AR content objects associated with one or more tiles corresponding to the area of interest. For example, it is contemplated that any time a user device is within 5 feet of a location corresponding with a tile or an area map, the user device will store AR content objects associated with that tile. Thus, if the user device is at a location within 5 feet of two or more tiles, the user device could store AR content objects associated with two or more tiles simultaneously. Moreover, it is also contemplated that the user device, even when located within 5 feet of two or more tiles, could store AR content objects only associated with one of the tiles (e.g., based on a hierarchy, etc.).

It should be noted that while the tiles shown in FIGS. 5-6 show separate, adjacent tiles, it is also contemplated that tiles can overlap within an area of interest. In these embodiments, the AR content objects to be presented can include AR content objects associated with both tiles, either together or with filtering (according to priority, size, etc.). Alternatively, the AR content objects to be presented to the user can (i.e., which tile's AR content objects to show) be determined based on the user's device, a user identification, information about the user (e.g., interests, context, preferences, etc.). Thus, the inventive subject matter is considered to include management of tile overlaps and associated rules for presenting AR content from overlapping tiles. For example, AR content can be prioritized for presentation or rendering based on the fees paid by content providers; a high fee could increase the prioritization of the AR content for example. Other factors that could influence prioritization or placement of AR content from overlapping tiles include personal preferences, demographics, movement of consumer toward or away from tiles, news events, or other factors.

Tiles can be constructed at varying levels of fidelity and resolution to accommodate the various capabilities of several device classes, and tile size can be tuned based on device memory capabilities, network capacity, etc.

It should be appreciated that a point of view origin could comprise any suitable space shape or size, perhaps even geofenced areas or, for example, 10 square feet of a floor, 5 square feet of a floor, 2 square feet of a floor, 1 square foot of a floor, etc. Similarly, a field of interest and/or view of interest could comprise any suitable shape or size.

One should also appreciate that a view of interest could comprise more than a point of view origin, a field of interest, a view associated with a point of view interest, an object of interest, a descriptor set or combinations or multiples thereof. Among other things, a view of interest could comprise an owner (as discussed above), metadata, a direction, an orientation, a cost, a search attribute, or combinations or multiples thereof.

As used herein, a "search attribute" could comprise an object or description that could be used to select a field of view (or narrow the possible fields of views) to which a user would like to associate content objects with respect to. For example, where an area of interest comprises Magic Mountain®, one possible view of interest could comprise, among other things: the entry point of the line for Batman® the ride as a point of view origin; a field of interest facing 35 degrees above eye level from four feet above the ground, and leading to a view that is ten feet wide (horizontal distance) and four feet long (vertical distance). The view of interest could also comprise a concession stand, a sign pointing to the Green Lantern® ride, and a bench on a hill, each of which could be viewable from the entry point of the Batman® line. In this example, the view of interest could comprise search terms that would assist a provider of AR content objects (or other users) in differentiating this view of interest from others within Magic Mountain, or even from other areas of interests. Exemplary search terms could include, for example, "Batman," "Green," "DC®," "comic," "superhero," "rest," "food," "drink," or any other term that describes a characteristic of the view of interest, the area of interest, or the AR content objects that are suitable (or even preferred) for presentation in the view of interest. It is also contemplated that search attributes could be included in a view of interest, which could describe a characteristic of a user experience with respect to the view of interest. For example, a search attribute could comprise an average length of stay of a user within a specified radius of the point of view origin. With respect to the Batman® line entry point, a search attribute could include 20 minutes as the average length of stay of a user within ten feet of the entry point due to the slow pace at which roller coaster ride lines tend to move.

In some embodiments, it is contemplated that a behavior of a user (or user device) could determine some or all of the content that is provided to the user via the user device. For example, and continuing on the example above, a user having a user device in his pocket at Magic Mountain® may stand at a relatively still position for seconds or even minutes at a time. Where the user device scans audio data of announcements over loud-speakers (e.g., safety warnings, etc.) for a pre-determined period of time (e.g., one minute, etc.), this could trigger the user being presented with audio content via the user device advertising Flash® passes, which allow a user to hold his or her place in line electronically. Other examples of behaviors or events that could trigger a provision of content could include, among other things, an interaction with AR content, a comment, a speed of movement, a type of movement, a gesture, a height, or any other suitable behavior or event.

It should also be appreciated that in some embodiments, a system could be configured to allow a user to interact with AR content presented by commenting, tagging, editing, ranking or otherwise modifying or adding to the AR content. This modification or addition could be viewable to all users of the system, a subset of users (e.g., those subscribing to a specific app, friends of the user providing the modification or addition, etc.), or only to be user providing the modification or addition as a reference point.

A contemplated use of a system of the inventive subject matter is to build a scavenger hunt to guide consumers into portions of an area of interest (e.g., a portion of a mall, etc.). Such a system could provide incentives for users to navigate a specific portion of the area, for example, by providing a prize, a reward, a promotion, a coupon, or other virtual item upon an event. The requisite event could comprise simply being located in the portion at any time, or could be more interactive, for example, being located in the portion for a minimum time or a specific time, capturing an image of an object viewable from the portion, making a gesture with the user device in the portion, or any other suitable event.

Location-based services generally rely on one or more sources of information to determine a location of a device. Typical sources include GPS data, Wi-Fi signal strength, or even image features as used in SLAM technologies. However, such techniques often fail in various scenarios. For example, within buildings, GPS signals could be weak or Wi-Fi signals might not be present. Further, in remote locations or natural settings, signals could also be weak or not present. With respect to SLAM-based location technologies, some locations lack sufficient differentiating image features that allow for tracking location of a device. Consider a scenario where a device (e.g., cell phone) is located within a warehouse that has no distinguishing image-based features. That is, there is little distinction from one location to another. Such settings make is very difficult to anchor augmented reality (AR) content within images of the real-world settings.

Another issue with current location-based AR services, especially those based on SLAM, is that they require a user to hold their imaging device (e.g., cell phone, tablet, etc.) up in front of the user. Such a stance can become uncomfortable after a short time for the user. Further, such a stance places the device between the real-world and the user, which restricts the user's interactions with the real-world. A better approach would allow a user to naturally interact with the real-world while their location tracking device is held in a more natural setting.

To address these issues, some embodiments can include encoding a wide area with location information. The location information can take on many different forms including covering surfaces (e.g., walls, floors, ceilings, etc.) with one or more patterns that can be visually observed via an electronic device (e.g., captured via a digital representation of the pattern in the environment such as via image data or video data). The pattern preferably comprises sufficient structure that, when imaged, a location device can observe one or more trackable features within the pattern. The features can also be bound to locations or used as AR content anchor points. Based on the location information (e.g., feature position, device orientation, etc.), the device is able to determine its location within the wide area.

The pattern can take on many different forms. In some embodiments, the pattern is truly random. For example, the wide area (e.g., warehouse, floors, etc.) can be randomly coated with paint, perhaps infra-red reflective paint. In such a case, the random pattern can then be scanned into a mapping module (e.g., a set of computer-executable instructions stored on non-transitory storage media that, when executed by one or more processors, carry out its described functions) that identifiers features in the random paint pattern via one or more image processing algorithms (e.g., SIFT, FAST, etc.) and binds the features to location information. The resulting map can then be deployed in other devices so that they can determine their locations in the environment based on observed features derived from images of the random pattern. The paint pattern can be deployed via a robot, through a suitably configured paint roller, or other means. Further, such a random pattern could be integrated within wall paper, floor tiles, ceiling tiles, or other surface cover at manufacturing time.

Further the pattern could be a natural, existing pattern or texture on a surface. For example, the pattern could comprise wood grain in floor boards (e.g., oak, bamboo, etc.), or concrete. When the setting has acceptable natural textures, a capturing device can be used to map out the area by scanning the all relevant surfaces to build a panoramic map of the locations. Further, the device can be configured to generate a confidence score indicating the acceptability of the natural texture, or other pattern for that matter, on a location-by-location basis.

In other embodiments, the pattern can comprise a generated, pseudo random pattern that covers the wide area. Consider a scenario where a warehouse wishes to encode their warehouse floor with location information. A mapping module can create a pseudo random pattern that creates a feature pattern for the entire space. Perhaps the pattern can be generated from a mapping function based on an initial known seed, which is then concatenated with location information (e.g., X, Y coordinates). The mapping function generates the necessary pattern that should be placed at corresponding X, Y coordinates in the warehouse. For example, each floor tile could be printed with the pattern for that tiles location. The advantageous of such an approach is that the pattern is procedurally generated, which allows devices to derive its location procedurally, assuming it has the initial seed, rather than storing a large, wide area map database.

As more concrete example, consider a case where SIFT is used for deriving features that are then used to determine location of a device. SIFT can have a 128-byte descriptor that represents a feature in an image. In such a case, the pseudo random pattern can be generated by applying an initial seed that is unique to the location to an MD5 hash algorithm (MD5 can generate 128-bit hash values). Once the function is primed with the seed, the X, Y coordinate of a floor tile can be concatenated with the original seed hash multiple times, four times for X and four times for Y. The result of each hash is a 128-bit number. The four hashes for X can be concatenated to form the first 64 bytes of a descriptor and the four hashes for Y can be concatenated to form the last 64 bytes of the descriptor, where the full 128-bytes represents a descriptor corresponding to the floor tile. The 128-byte number can then be considered a SIFT descriptor. For example, if the seed for a location is S and a coordinate is (X, Y), the 128-byte descriptor could be generated as follows:

Descriptor bytes 0-15: X1=MD5(Seed+X)
Descriptor bytes 16-31: X2=MD5(X1)
Descriptor bytes 32-47: X3=MD5(X2)
Descriptor bytes 48-63: X4=MD5(X3)
Descriptor bytes 64-79: Y1=MD5(Seed+Y)
Descriptor bytes 80-95: Y2=MD5(Y1)
Descriptor bytes 96-111: Y3=MD5(Y2)
Descriptor bytes 112-127: Y4=MD5(Y3)

If the hash function is SHA-512, which generates 512 bits of output, then the descriptor could be:

Descriptor bytes 0-63: SHA512(Seed+X)
Descriptor bytes 64-127: SHA512(Seed+Y)

The mapping module uses the 128-bytes descriptor to generate an image pattern that would generate the same descriptor (or a nearest neighbor descriptor for the space) when processed by SIFT. This approach allows for generation of a large number of address spaces. Location can be determined by initially calibrating the device in the local area and using accelerometry to generate a location window. The device can then use the hash mapping functions to generate the descriptors that should be present or observable within the location window.

In some embodiments, a paired dictionary learning process can be used to produce a method of "inverting" any type of image descriptors (SIFT, SURF, HOG, etc.). This can be achieved by keeping original source image patches for all descriptors used to build a dictionary via clustering approaches (K-means, hierarchical K-means, agglomerative clustering, vector quantization, etc.). Once the dictionary is built, it gives a bidirectional mapping from image patch space to descriptor space. From each cluster of descriptors representing a dictionary element, we can obtain an average image patch that would generate a descriptor belonging to that cluster. The chosen size of the dictionary determines the resolution of the mapping between image patches and descriptors, and therefore the size of the available address space of image patches to use when marking up a location. The "inverted" image patterns obtained by this process can be applied to ensure a unique descriptor configuration at each (X,Y) location in a space.

In alternative embodiments, the mapping module can use a mapping function that is bidirectional in the sense that coordinates generate a desired pseudo random pattern (e.g., a descriptor, feature, keypoint, etc.), and that a descriptor generates a corresponding coordinate. For example, one possible two-way mapping function might include use of a log value. For example, a log (e.g., ln(x)) of the X coordinate of a map location can be taken to generate a value. The value can be the first part of a descriptor (e.g., the first 64 bytes of an SIFT descriptor). The second part of the descriptor could be ln(Y) after suitable conversion to a 64 byte value. When the descriptor is detected in the field (or a nearest neighbor), the descriptor can be separated into its X and Y parts. The X and Y coordinates can be found by applying an exp( ) function to the parts. In some embodiments, X and Y can have only integer values, perhaps as grid locations. Thus, when the exp( ) function is applied to observed descriptor values, the resulting nearest integer is likely the proper coordinate.

Yet another possible type of pattern includes a fractal pattern. The pattern can include fractal features that aid in determining location or anchor points at different scales, depth of field, or distances. For example, the pattern could comprise multiple layers where each layer comprises a different color. A first color can be used to generate a fine grained pattern that corresponds to specific location scale (e.g., millimeter, centimeter, etc.). A second pattern having mid-level grained features that provide location scales in an intermediate range (e.g., about 10 cm, 1 foot, etc.). Yet another pattern in a third color having very course grained feature might provide location information at a more course grain level (e.g., 1 meter, 10 feet, etc.).

Deploying disclosed patterns on a floor surface also provides additional advantages. Users are able to track their location by pointing the image sensors of their devices toward the floor rather than holding the device up. This approach represents a more natural arm position which reduces user fatigue. Further, the user is able to interact with the real-world setting without having the device interposed between the setting the user, thus giving rise to a more natural interaction.

It should be further appreciated that the pattern can be deployed on other surfaces besides the floor. The patterns can be deployed on the walls so that forward facing cameras are able to determine locations of foreground objects (e.g., people, obstacles, machines, etc.) relative to background (i.e., walls) locations. Further, ceilings can also be encoded with patterns (e.g., ceiling tiles, girders, pipes, etc.). In such a case, imaging devices that have a back facing camera, a camera that faces the user, could image the ceiling while also imaging the floor. Thus, the device would be able to derive location information from the ceiling, or both the floor and ceiling. In view that such cameras could have different image capturing resolutions, it is possible that the floor and ceiling patterns could be asymmetric with respect to the location resolving power.

These techniques can be employed to determine a user's position within an area of interest. More specifically, the user's computing device capture a digital representation of a pattern on a surface (e.g., wall, ceiling, floor) within the area of interest, and can determine what tile (for example, Tiles 1-4 of FIG. 5 or Tiles A and B of FIG. 6) a user is currently in by determining the user's position within the area of interest and correlating it to tile information obtained from the system. Then, as described above, the AR content objects can be managed and presented to the user based on their presence within the tile.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device capable of rendering augmented reality (AR), the device comprising:
   at least one sensor, including a location sensor;
   a display;
   a non-transitory computer-readable memory storing software instructions; and
   at least one processor coupled with the non-transitory computer-readable memory, the at least one sensor, and the display; and, upon execution of the software instructions, is configurable to:
   obtain sensor data from the at least one sensor wherein the sensor data includes a device location obtained from the location sensor;
   obtain an area of interest via an area database based on at least the device location within the sensor data;
   access an area tile map of the area of interest, the area tile map represented by a set of tile subareas that includes one or more tessellated tiles from a tessellated tile map;
   identify a tile subarea from the set of tile subareas based at least in part on the device location relative to one or more locations of tile subareas from the set of tile subareas, wherein the identified tile subarea covers at least a portion of the area of interest, and wherein one or more tessellated tiles within the identified tile subarea are associated with one or more AR content objects;

populate the non-transitory computer-readable memory with at least one of the one or more AR content objects associated with the one or more tessellated tiles within the identified tile subarea to thereby accommodate capabilities of the non-transitory computer-readable memory via more accurately instantiating the at least one of the one or more AR content objects in the non-transitory computer-readable memory when the device is at or near the one or more tessellated tiles within the identified tile subarea; and render the at least one of the one or more AR content objects that is associated with the identified tile subarea on the display based on a view of interest.

2. The device of claim 1, wherein the location sensor comprises at least one of the following location sensors: a global positioning system (GPS) sensor, an image sensor, and a wireless sensor.

3. The device of claim 1, wherein the device location includes at least one of the following: a global positioning system (GPS) location, a wireless signal location, a depth of field location, and an image-based simultaneous location and mapping (SLAM) location.

4. The device of claim 1, wherein the at least one sensor further includes one or more of the following: a camera, an accelerometer, and a gyroscope.

5. The device of claim 1, wherein the sensor data further includes at least one of device position data and device orientation data.

6. The device of claim 5, wherein the at least one of the one or more AR content objects is rendered based on the view of interest, wherein the view of interest is derived from at least one of the device position data and the device orientation data.

7. The device of claim 1, wherein the at least one of the one or more AR content objects is rendered on the display as an overlay of an image related to a real-world scene.

8. The device of claim 1, wherein the area of interest comprises one of the following: a landmark, user-defined boundaries, state-defined boundaries, natural boundaries, a city, a country, a business, a shopping center, a warehouse, a stadium, a wilderness area, a road, a garden, a zoo, an amusement park, a beach and a building.

9. The device of claim 1, wherein the area of interest comprises a restaurant.

10. The device of claim 1, wherein the area of interest comprises a coffee shop.

11. The device of claim 1, wherein the area of interest comprises an outdoor setting.

12. The device of claim 1, wherein the device communicatively couples with the area database over a network.

13. The device of claim 1, wherein the at least one of the one or more AR content objects is obtained from an AR content database.

14. The device of claim 13, wherein the device is communicatively coupled with the AR content database over a network.

15. The device of claim 1, wherein the at least one of the one or more AR content objects is rendered relative to a recognized object.

16. The device of claim 15, wherein the recognized object represents an attachment point for the at least one of the one or more AR content objects.

17. The device of claim 16, wherein the attachment point includes at least one of the following: a billboard, a wall, a floor, a plant, a sign, a logo, a landmark, a building, and a car.

18. The device of claim 1, wherein the at least one of the one or more AR content objects comprises a game object.

19. The device of claim 18, wherein the at least one of the one or more AR content objects comprises an interactive game experience.

20. The device of claim 1, wherein the at least one of the one or more AR content objects comprises at least one of the following: a virtual object, a digital image, a digital video, audio data, an application, a script, a promotion, an advertisement, a graphic, a sprite, and an animation.

21. The device of claim 1, wherein the at least one of the one or more AR content objects comprises an exclusive content related to the identified tile subarea.

22. The device of claim 21, wherein the exclusive content related to the identified tile subarea is rendered based on a paid fee.

23. The device of claim 1, wherein the non-transitory computer-readable memory, the at least one processor, the at least one sensor, and the display comprise at least one of the following: a smart phone, augmented reality goggles, a watch, a tablet, a drone, a vehicle, a wearable augmented reality device, and a robot.

24. The device of claim 1, wherein the at least one of the one or more AR content objects is determined based on movement of the device relative to the area of interest or the identified tile subarea.

25. The device of claim 24, wherein the at least one of the one or more AR content objects is auto-populated in the non-transitory computer-readable memory and rendered based on the movement of the device relative to the area of interest or the identified tile subarea.

26. The device of claim 1, wherein the identified tile subarea or the at least one of the one or more AR content objects is identified based on time.

27. The device of claim 1, wherein a modification of the at least one of the one or more AR content objects by a first user is viewable by a subset of users.

28. The device of claim 1, wherein a virtual item is made available to a user when the user executes a navigation event with respect to the area of interest or the identified tile subarea.

29. The device of claim 28, wherein the navigation event comprises at least one of the following: the user being located in the area of interest at any time, the user being located in the area of interest for a predetermined minimum amount of time, the user being located in the area of interest at a predetermined time, or the user being located in the area of interest and capturing an image viewable from the area of interest.

30. The device of claim 1, wherein a virtual item is provided to a first user and a second user when the first user and the second user execute a navigation event with respect to the area of interest or the identified tile subarea.

31. The device of claim 30, wherein the navigation event comprises the first user and the second user each performing at least one of the following: being located in the area of interest at any time, being located in the area of interest for a predetermined minimum amount of time, being located in the area of interest at a predetermined time, or being located in the area of interest and capturing an image viewable from the area of interest.

32. The device of claim 1, wherein the at least one processor, upon execution of the software instructions, is further configurable to obtain the area tile map of the area of interest.

33. The device of claim 1, wherein the at least one processor, upon execution of the software instructions, is further configurable to generate the area tile map of the area of interest.

34. A method of presenting augmented reality (AR) with a computing device, the method comprising:
    obtaining sensor data from at least one sensor, the at least one sensor including a location sensor, wherein the sensor data includes a device location of the computing device obtained from the location sensor;
    obtaining an area of interest via an area database based on at least the device location within the sensor data;
    accessing an area tile map of the area of interest, the area tile map represented by a set of tile subareas that includes one or more tessellated tiles from a tessellated tile map;
    identifying a tile subarea from the set of tile subareas based at least in part on the device location relative to one or more locations of tile subareas from the set of tile subareas, wherein the identified tile subarea covers at least a portion of the area of interest, and wherein one or more tessellated tiles within the identified tile subarea are associated with one or more AR content objects;
    populating a non-transitory computer-readable memory of the computing device with at least one of the one or more AR content objects associated with the one or more tessellated tiles within the identified tile subarea to thereby accommodate capabilities of the non-transitory computer-readable memory via more accurately instantiating the at least one of the one or more AR content objects in the non-transitory computer-readable memory when the computing device is at or near the one or more tessellated tiles within the identified tile subarea; and
    rendering the at least one of the one or more AR content objects that is associated with the identified tile subarea on a display of the computing device based on a view of interest.

35. The method of claim 34, wherein the location sensor comprises at least one of the following location sensors: a global positioning system (GPS) sensor, an image sensor, and a wireless sensor.

36. The method of claim 34, wherein the device location includes at least one of the following: a global positioning system (GPS) location, a wireless signal location, a depth of field location, and an image-based simultaneous location and mapping (SLAM) location.

37. A computer program product embedded in at least one non-transitory computer-readable medium comprising software instructions for rendering augmented reality (AR) content on a computing device, which, when executed, configure one or more computer processors to perform a method comprising:
    obtaining sensor data from at least one sensor, the at least one sensor including a location sensor, wherein the sensor data includes a device location of the computing device obtained from the location sensor;
    obtaining an area of interest via an area database based on at least the device location within the sensor data;
    accessing an area tile map of the area of interest, the area tile map represented by a set of tile subareas that includes one or more tessellated tiles from a tessellated tile map;
    identifying a tile subarea from the set of tile subareas based at least in part on the device location relative to one or more locations of tile subareas from the set of tile subareas, wherein the identified tile subarea covers at least a portion of the area of interest, and wherein one or more tessellated tiles within the identified tile subarea are associated with one or more AR content objects;
    populating a non-transitory computer-readable memory of the computing device with at least one of the one or more AR content objects associated with the one or more tessellated tiles within the identified tile subarea to thereby accommodate capabilities of the non-transitory computer-readable memory via more accurately instantiating the at least one of the one or more AR content objects in the non-transitory computer-readable memory when the computing device is at or near the one or more tessellated tiles within the identified tile subarea; and
    rendering the at least one of the one or more AR content objects that is associated with the identified tile subarea on a display of the computing device based on a view of interest.

38. The computer program product of claim 37, wherein the location sensor comprises at least one of the following location sensors: a global positioning system (GPS) sensor, an image sensor, and a wireless sensor.

39. The computer program product of claim 37, wherein the device location includes at least one of the following: a global positioning system (GPS) location, a wireless signal location, a depth of field location, and an image-based simultaneous location and mapping (SLAM) location.

* * * * *